United States Patent [19]
Yamada et al.

[11] Patent Number: 6,150,794
[45] Date of Patent: Nov. 21, 2000

[54] CHARGING SYSTEM FOR MOTOR-DRIVEN VEHICLE

[75] Inventors: Makoto Yamada, Sumoto; Hiroshi Kutsuyama, Hirakata; Hideaki Aoki, Kyoto; Seigou Torita, Nishinomiya; Kazushige Kakutani, Moriguchi; Seiji Murakami, Osaka; Keiji Kishimoto; Masahiro Maekawa, both of Hirakata, all of Japan

[73] Assignee: Sanyo Electric Co., Ltd., Osaka, Japan

[21] Appl. No.: 09/147,065

[22] PCT Filed: May 23, 1997

[86] PCT No.: PCT/JP97/01760

§ 371 Date: Sep. 29, 1998

§ 102(e) Date: Sep. 29, 1998

[87] PCT Pub. No.: WO97/45913

PCT Pub. Date: Dec. 4, 1997

[30] Foreign Application Priority Data

| May 27, 1996 | [JP] | Japan | 8-132188 |
| Jun. 13, 1996 | [JP] | Japan | 8-152506 |
| Jun. 27, 1996 | [JP] | Japan | 8-167421 |
| Sep. 25, 1996 | [JP] | Japan | 8-253375 |
| Mar. 17, 1997 | [JP] | Japan | 9-62924 |

[51] Int. Cl.$^7$ ............................................ H02J 7/00
[52] U.S. Cl. .................................... 320/108; 320/107
[58] Field of Search .............................. 320/108, 107; 336/60, 182, 185

[56] References Cited

U.S. PATENT DOCUMENTS

| 5,680,028 | 10/1997 | McEachern | 320/108 |
| 5,710,502 | 1/1998 | Poumey | 320/108 |
| 5,821,731 | 10/1998 | Kuki et al. | 320/108 |

*Primary Examiner*—Peter S. Wong
*Assistant Examiner*—Lawrence Luk
*Attorney, Agent, or Firm*—Arent Fox Kintner Plotkin & Kahn

[57] ABSTRACT

The charging system of the invention comprises a primary charging device 4 disposed at a predetermined location, and a secondary charging device 6 mounted on the body 1 of a bicycle. The secondary charging device 6 comprises a secondary coil unit 50, rectifying circuit and charging control circuit which are housed in a casing 610. The secondary coil unit 50 is connected to a battery 20 mounted on the bicycle body 1 by a cord, and comprises a secondary coil 502 provided around an iron core 501. On the other hand, the primary charging device 4 comprises a primary coil unit 30 and charging circuit which are housed in a casing 410. The primary coil unit 30 comprises a primary coil 302 provided around an iron core 301. When the secondary coil unit 50 is positioned close to the primary coil unit 30, the battery 20 can be charged by the charging system.

14 Claims, 42 Drawing Sheets

FIG. 1
FIG. 2
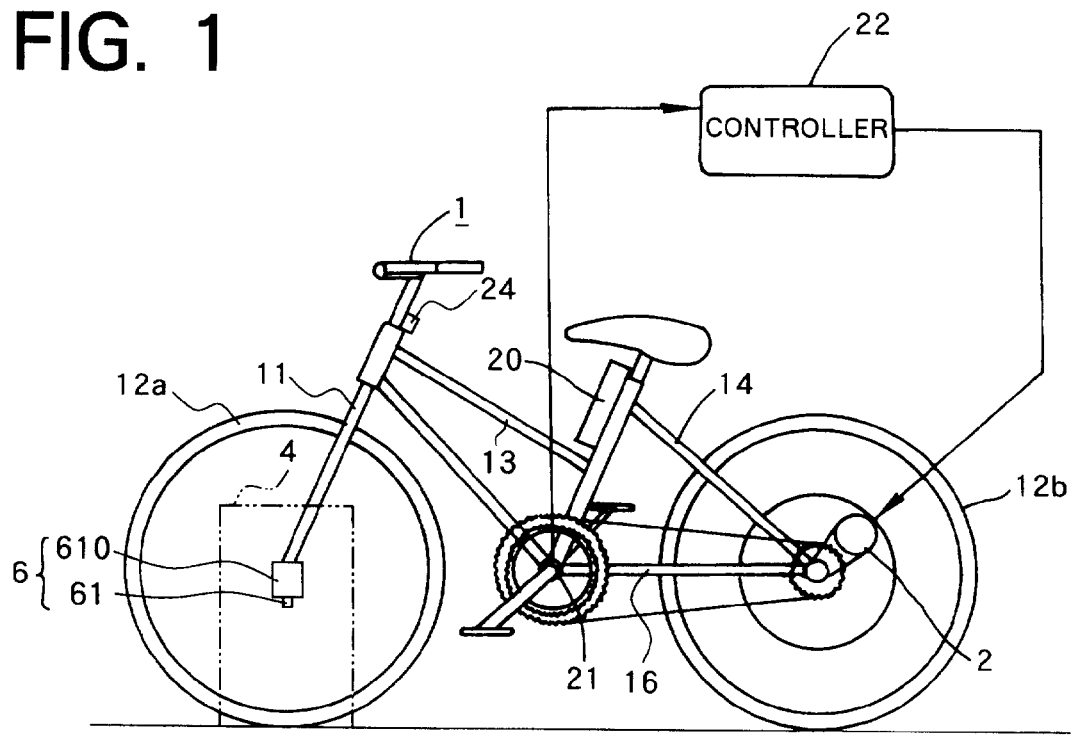
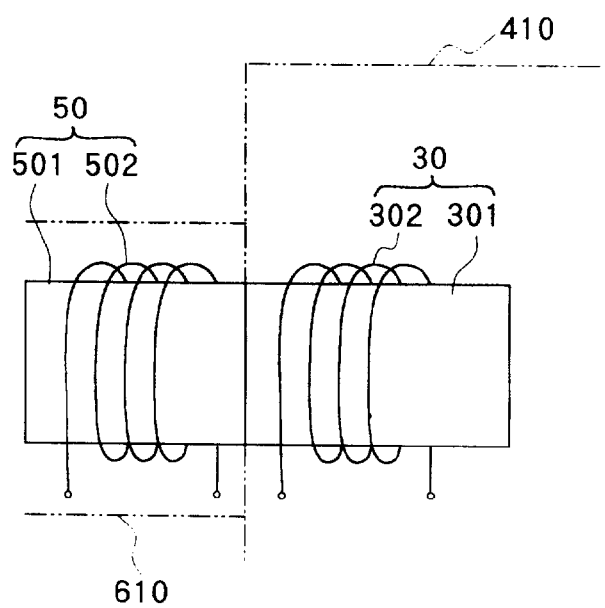

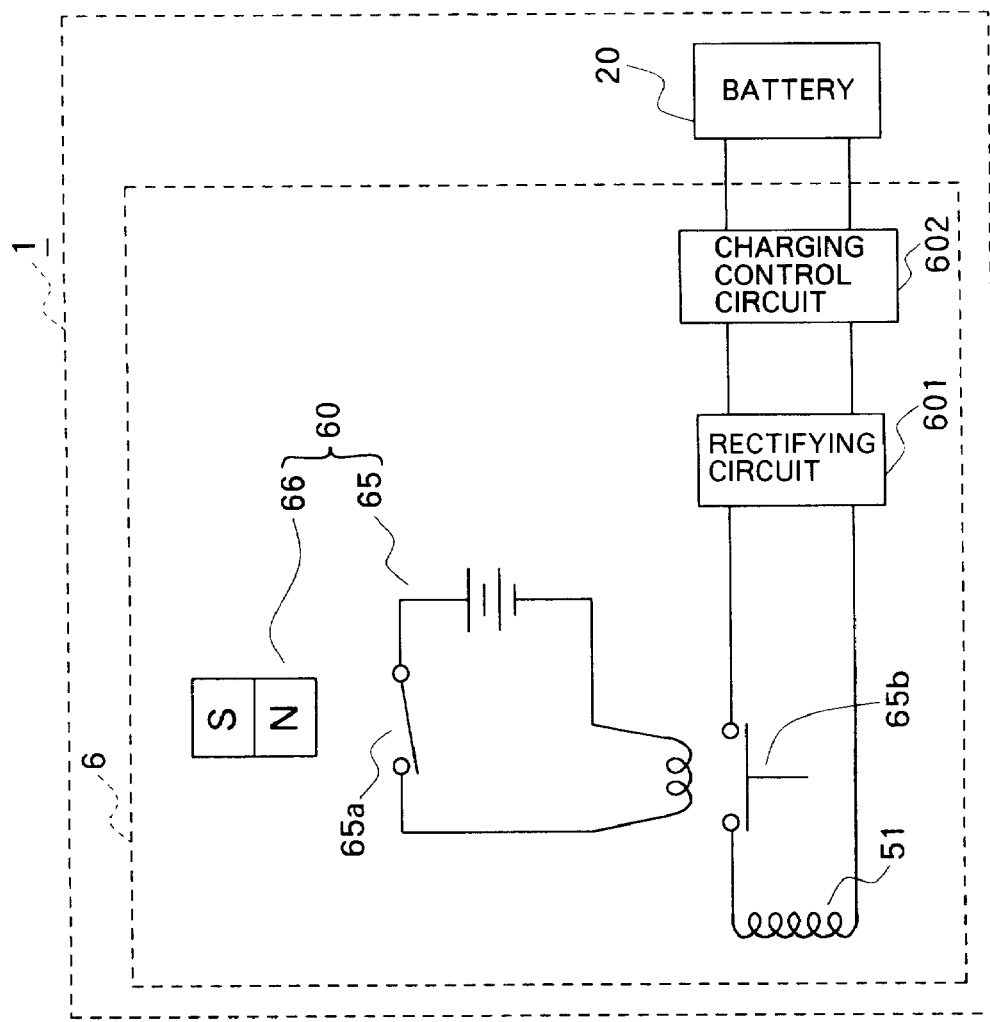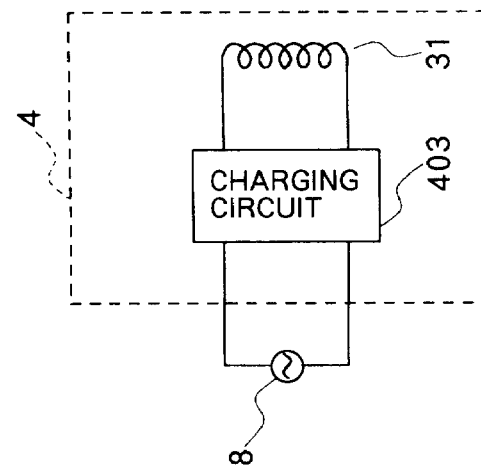
FIG. 9

CHARGING SYSTEM FOR MOTOR-DRIVEN VEHICLE

FIELD OF THE INVENTION

The present invention relates to systems for charging batteries mounted on electrically movable vehicles such as bicycles equipped with an electric motor and electric motor vehicles.

BACKGROUND OF THE INVENTION

In recent years, progress has been made in developing electrically assisted bicycles having an electric motor mounted on the body of the bicycle which can be driven by human power and adapted to assist in the human drive force.

With reference to FIG. 49 schematically showing the construction of a bicycle equipped with an electric motor 2, the torque generated by stepping on pedals on the body 1 of the bicycle is detected by a torque sensor 21, which in turn feeds a detection signal to a controller 22. In response to the torque detection signal input, the controller 22 prepares a torque command in accordance with the signal, giving the command to the motor 2. Consequently, the bicycle body 1, which is given human torque, is further supplied with torque delivered by the motor according to the input torque value to supplement the human drive force.

The bicycle body 1 has mounted thereon a battery 20 serving as the power supply for the motor 2. When the output voltage of the battery 20 has dropped, the battery 20 is removed from the bicycle body 1 and charged by a device specifically designed for the bicycle.

However, the above charging method requires the procedure of connecting the output terminals of the charging device to the charging terminals of the battery 20 by a cable, hence the problem that this procedure is cumbersome.

Accordingly an object of the present invention is to provide a charging system adapted to charge the battery without necessitating a procedure for connecting the system to the battery with a cable.

SUMMARY OF THE INVENTION

The present invention provides a system for charging a battery serving as the power source for an electric motor mounted on an electrically movable vehicle. The battery charging system comprises a primary charging device and a secondary charging device. The primary charging device has an energy output portion adapted to emit magnetic wave energy and disposed in the vicinity of a predetermined position where the vehicle is to be stopped. On the other hand, the secondary charging device has an energy input portion adapted to receive the emitted electromagnetic wave energy and provided on the body of the vehicle, converts the input energy to a charging current and supplies the current to the battery. The electromagnetic wave energy is, for example, microwaves, magnetic energy or rays.

When the battery on the electrically movable vehicle is to be charged by the system of the invention, the vehicle is moved to and stopped at the predetermined position to position the energy input portion of the secondary charging device close to the energy output portion of the primary charging device, whereby the electromagnetic wave energy emitted by the energy output portion of the primary charging device is delivered to the energy input portion of the secondary charging device and converted to a charging current. The current is supplied to the battery to charge the battery.

Stated more specifically, the electromagnetic wave energy is magnetic energy, the energy output portion of the primary charging device is a primary coil unit comprising a primary coil provided around an iron core, and the energy input portion of the secondary charging device is a secondary coil unit comprising a secondary coil provided around an iron core. With this charging system thus specifically constructed, the secondary coil unit is brought close to the primary coil unit, causing the lines of magnetic force emanating from the core of the primary coil to impinge on the core of the secondary coil and penetrate through the secondary coil, whereby the primary coil and the secondary coil are electromagnetically coupled to each other. Consequently, the secondary coil affords a current, which is supplied to the battery to charge the battery.

Specifically stated, the electrically movable vehicle is an electrically assisted bicycle, and the secondary coil unit of the secondary charging device is attached to the axle of front wheel or rear wheel of the bicycle. When the battery is to be charged by the system thus specifically constructed, the secondary coil unit on the front or rear wheel is brought close to the primary coil unit of the primary charging device, whereupon the bicycle is halted.

Alternatively, the secondary coil unit of the secondary charging device is attached to a pedal of the electrically assisted bicycle. When the battery is to be charged in this specific case, the bicycle is halted with the secondary coil unit on the pedal brought close to the primary coil unit of the primary charging device.

Further alternatively, the secondary coil unit of the secondary charging device is attached to a stand for supporting the body of the bicycle in an upright position. When the battery is to be charged by the system thus specifically constructed, the secondary coil unit on the stand is brought close to the primary coil unit of the primary charging device, whereupon the bicycle is halted.

Stated more specifically, the secondary coil unit of the secondary charging device is attached to the stand at a position away from a ground contact portion thereof. With the charging system thus specifically constructed, the secondary coil unit is attached to the stand at a position away from the ground contact portion thereof and therefore unlikely to come into direct striking contact with the ground when the bicycle body is supported by the stand, and the impact acting on the secondary coil unit is slight. Accordingly, there is no need to provide special means for protecting the secondary coil unit, with the secondary coil unit engaged in the recessed portion of the primary charging device. When the secondary coil unit is engaged in the recessed portion of the primary charging device in the charging system thus specifically constructed, opposite ends of the iron core of the primary coil unit are positioned in proximity to or in contact with respective opposite ends of the iron core of the secondary coil unit, so that the lines of magnetic force emanating from the core of the primary coil unit almost wholly impinge on the core of the secondary coil unit, consequently making it possible to charge the battery efficiently.

Stated more specifically, the primary charging device comprises a positioning mechanism for placing thereon the rear wheel of the bicycle as stopped at the predetermined position. The secondary coil unit of the secondary charging device engages in the recessed portion of the primary charging device with the rear wheel placed on the positioning mechanism. In the charging system thus specifically constructed, the electrically assisted bicycle is stopped with its rear wheel placed on the positioning mechanism, whereby the secondary coil unit is engaged in the recessed portion of the primary charging device. This accurately secondary charging device from impact, rendering the device compact and lightweight.

Stated more specifically, the primary charging device has a casing housing the primary coil unit therein and formed with a recessed portion for the secondary coil unit of the secondary charging device to engage in. The primary coil unit and the secondary coil unit are opposed to each other and can be magnetically coupled together, with the secondary coil unit engaged in the recessed portion. With this charging system thus specifically constructed, the secondary coil unit, when engaged in the recessed portion, can be accurately positioned in place, with the result that the primary and secondary coil units are electromagnetically coupled to each other reliably to efficiently charge the battery. With this construction, the secondary coil unit can be easily positioned in place when the battery is to be charged.

Stated more specifically, the iron core of the primary coil unit is C-shaped or L-shaped, and the iron core of the secondary coil unit is in the form of a bar. Opposite ends of the iron core of the primary coil unit are positioned in proximity to or in contact with respective opposite ends of the iron core of the positions the secondary coil unit in place, electromagnetically coupling the primary and secondary coil units to each other reliably to efficiently charge the battery. With this construction, the secondary coil unit can be positioned in place with ease when the battery is to be charged.

More specifically stated, the primary charging device comprises a switch for energizing or deenergizing the primary coil unit. The secondary charging device comprises on/off means for turning on or off the switch with the movement of the secondary coil unit toward or away from the primary coil unit. When the battery is to be charged by the system thus specifically constructed, the secondary coil unit is brought close to the primary coil unit, whereby the switch is automatically turned on to supply current to the primary coil unit. On the other hand, when the secondary coil unit is moved away from the primary coil unit as when riding the bicycle, the switch is automatically turned off to suspend the supply of current to the primary coil unit. The switch of the primary charging device is thus turned on to supply current to the primary coil unit only when the two coil units are brought close to each other. This assures safety and diminishes power consumption.

More specifically stated, the stand is provided with a lock mechanism for locking the stand in an upright position, and the secondary charging device comprises a switch for effecting or suspending passage of current through the battery and on/off means operatively connected to the lock mechanism for turning on the switch when the lock mechanism is in a locked state or turning off the switch when the lock mechanism is in an unlocked state. When the lock mechanism of the system thus specifically constructed is locked with the stand in its upright position, the switch is turned on in operative relation with the lock mechanism. When the secondary coil unit is brought close to the primary coil unit in this state, current is supplied to the battery. When the lock mechanism is unlocked in an attempt to rice the bicycle, the switch is turned off in operative relation with this movement to discontinue the supply of current to the battery. Accordingly, no current is supplied to the battery during riding, hence safety.

With the charging system of the invention for electrically movable vehicles, the battery can be charged by positioning the energy input portion of the secondary charging device in proximity to the energy output portion of the primary charging device. This obviates the need for the conventional connecting procedure with use of a cable.

BRIEF DESCRIPTION OF THE DRAWINGS

FIG. 1 is a diagram showing the overall construction of a first embodiment of battery charging system for a bicycle equipped with an electric motor;

FIG. 2 is a diagram of a primary coil unit and a secondary coil unit included in the system;

FIG. 9 is a block diagram showing the construction of the system;

DETAILED DESCRIPTION

Figure 3:
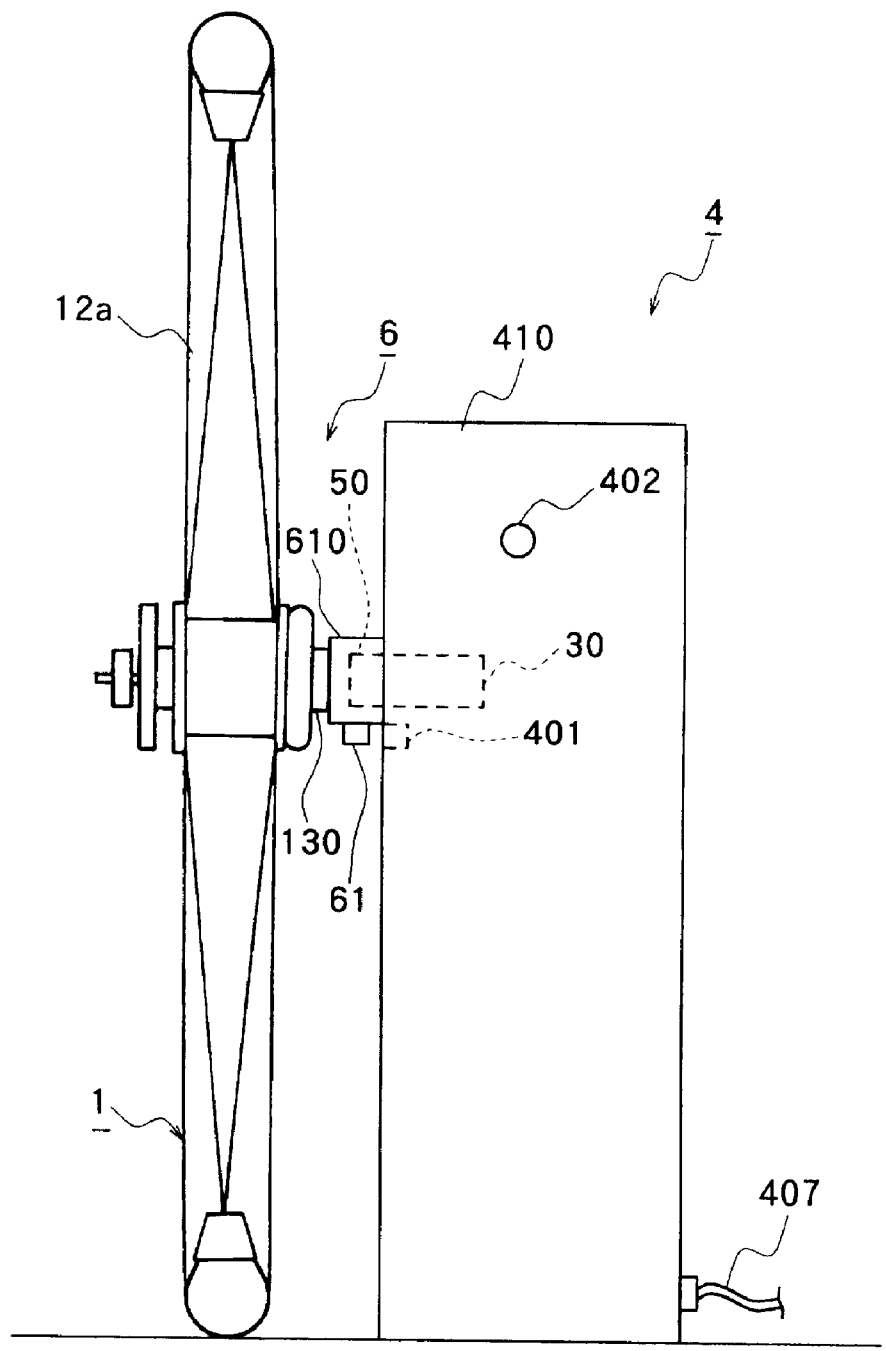
FIG. 3 is a rear view partly broken away and showing the system in charging operation as it is seen from the front.

First to fourteenth embodiments are applications of the present invention to an electrically assisted bicycle as shown in FIG. 1. The charging systems of these embodiments comprise a primary charging device 4 to be installed at a specified location in a house or parking lot, and a secondary charging device 6 to be mounted on the body 1 of the bicycle. In the following description, the direction in which the bicycle body 1 advances when the pedals are stepped on will be referred to as "front," and the terms "right" and "left" are used for the bicycle body as it is seen from behind toward the front.

First Embodiment

With reference to FIG. 1, the bicycle body 1 is provided with a battery 20 serving as the power source for an electric motor 2.

The charging system of the present embodiment comprises a secondary charging device 6 which is mounted on the left end of axle 130 of a front wheel 12a. The charging device 6 has incorporated therein a secondary coil unit 50, rectifying circuit (not shown) and charging control circuit (not shown) which are housed in a casing 610. The secondary coil unit 50 is connected to the battery 20 by a connecting code (not shown) extending along the axle 130, front fork 11 and frame 13. As shown in FIG. 2, the coil unit 50 comprises a secondary coil 502 provided around a barlike iron core 501. The end face of the core 501 toward the primary charging device 4 is left exposed to outside from the casing 610. The core 501 is, for example, a ferrite core.

The casing 610 has a magnet 61 fixed to its rear side by a resin molding as seen in FIGS. 1 and 3.

The bicycle of the present embodiment can be set in a charging mode for charging the battery 20, stop mode for stopping the bicycle body 1 without charging, and a riding mode to be set for riding. A manual change-over switch 24 for selecting one of these modes is mounted on the front fork 11.

On the other hand, the primary charging device 4 has incorporated therein a primary coil unit 30, switch 401 and charging circuit (not shown) which are housed in a casing 410. The primary coil unit 30 is disposed at the same level as the axle of the front wheel 12a. The switch 401 is disposed below the coil unit 30. Extending from the casing 410 is a power source cord 407 connectable to a receptacle of commercial power source 8 of 100 V. As shown in FIG. 2, the coil unit 30 comprises a primary coil 302 provided around a barlike iron core 301. The end face of the core 301 to be opposed to the bicycle body 1 is left exposed to outside from the casing 410. The core 301 is, for example, a ferrite core. The switch 401 is turned on when brought close to the magnet 61 or is turned off when moved away therefrom. The casing 410 is provided with a light-emitting diode 402 which is turned on during charging.

Figure 4:
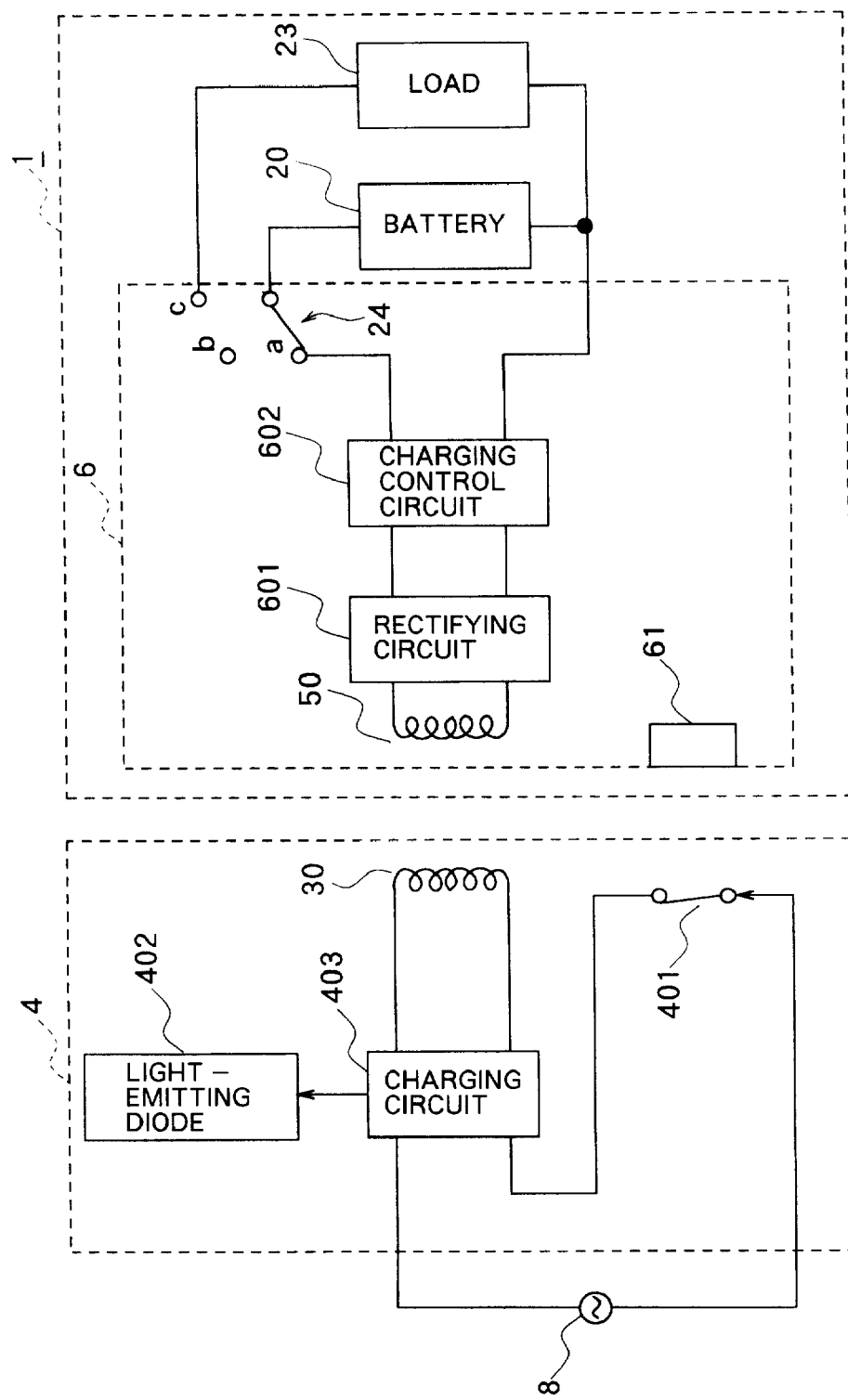
FIG. 4 is a block diagram showing the construction of the system.

FIG. 4 shows the overall construction of the charging system of the present embodiment.

As illustrated, the primary charging device 4 comprises the primary coil unit 30, switch 401, charging circuit 403 comprising a rectifying circuit and high-frequency inverter, and light-emitting diode 402. The charging circuit 403 is connected to the commercial power source 8 via the switch 401.

The switch 401 is turned on when the magnet 61 on the bicycle body 1 is brought close to the switch to supply alternating current from the power source 8 to the charging circuit 403. When the magnet 61 is conversely moved away from the switch 401, the switch is turned off to discontinue the supply of current from the power source 8 to the charging circuit 403.

The light-emitting diode 402 goes on when supplied with current from the charging circuit 403 and is turned off when the current supply is discontinued.

On the other hand, the secondary charging unit 6 comprises the secondary coil unit 50, rectifying circuit 601, charging control circuit 602, magnet 61 and change-over switch 24. The charging control circuit 602 ceases the charging operation when the battery 20 is fully charged, with the voltage across the terminals thereof reaching at least a predetermined threshold value.

The charging control circuit 602 is connected to the battery 20 and a load 23 by the switch 24. When the switch 24 is connected to a terminal a, the system is set in the charging mode, with a closed loop formed by the secondary coil unit 50, rectifying circuit 601, charging control circuit 602 and battery 20. Alternatively when the switch 24 is connected to a terminal b, the system is set in the stop mode with a closed loop formed by the secondary coil unit 50, rectifying circuit 601 and charging circuit 602. Further alternatively when the switch 24 is connected to a terminal c, the system is set in the riding mode with a closed loop formed by the secondary coil unit 50, rectifying circuit 601, charging control circuit 602 and load 23.

When the battery 20 of the bicycle body 1 is to be charged by the system of the present embodiment, the secondary coil unit 50 of the secondary charging device 6 is brought into contact with the primary coil unit 30 of the primary charging device as shown in FIGS. 1 to 3 by advancing the bicycle body 1, and the switch 24 is changed over to set the system in the charging mode. The switch 401 is turned on by the magnet 61 brought close thereto. The switch 24 is closed at the terminal a.

The alternating current available from the commercial power source 8 is supplied to the charging circuit 403, converted to a high-frequency current and then fed to the primary coil unit 30. This causes the primary coil 302 of the unit 30 to produce lines of magnetic force, which penetrate through the secondary coil 502 of the secondary coil unit 50, whereby the primary and secondary coils 302, 502 are electromagnetically coupled to each other to provide a high-frequency transformer. With the core 301 of the primary coil unit 30 in contact with the core 501 of the secondary coil unit 50, the lines of magnetic force emanating from the core 301 of the unit 30 almost wholly impinge on the core 501 of the unit 50 to pass through the secondary coil 502.

Consequently, the secondary coil unit 50 affords a high-frequency current, which is converted by the rectifying circuit 601 to a direct current, then set to a predetermined current value by the charging control circuit 602 and fed to the battery 20, whereby the battery 20 is charged.

The alternating current available from the power source 8 is also supplied via the charging circuit 403 to the light-emitting diode 402, which is turned on by the supply of current.

When the battery 20 has been fully charged with the voltage across the terminals thereof reaching at least the predetermined threshold value, the charging control circuit 602 functions to discontinue the charging operation. At this time, the charging circuit 403 discontinues the supply of current to the diode 402, whereby the diode 402 is turned off.

With the charging system of the present embodiment, the battery 20 can be charged merely by bringing the secondary coil unit 50 of the secondary charging device 6 into contact with the primary coil unit 30 of the primary charging device 4.

Further because the iron core 501 of the secondary coil unit 50 is held in contact with the iron core 301 of the primary coil unit 30 during charging, the battery 20 can be charged efficiently.

Furthermore, the switch 401 of the primary charging device 4 is closed only when the coil units 30, 50 are brought close to each other, permitting the pour source 8 to supply current to the primary coil unit 30. This assures safety and diminishes power consumption.

No current is supplied to the battery 20 while the system is set in the riding mode or stop mode in which charging is not intended. This also ensures safety.

Second Embodiment

Figure 5:
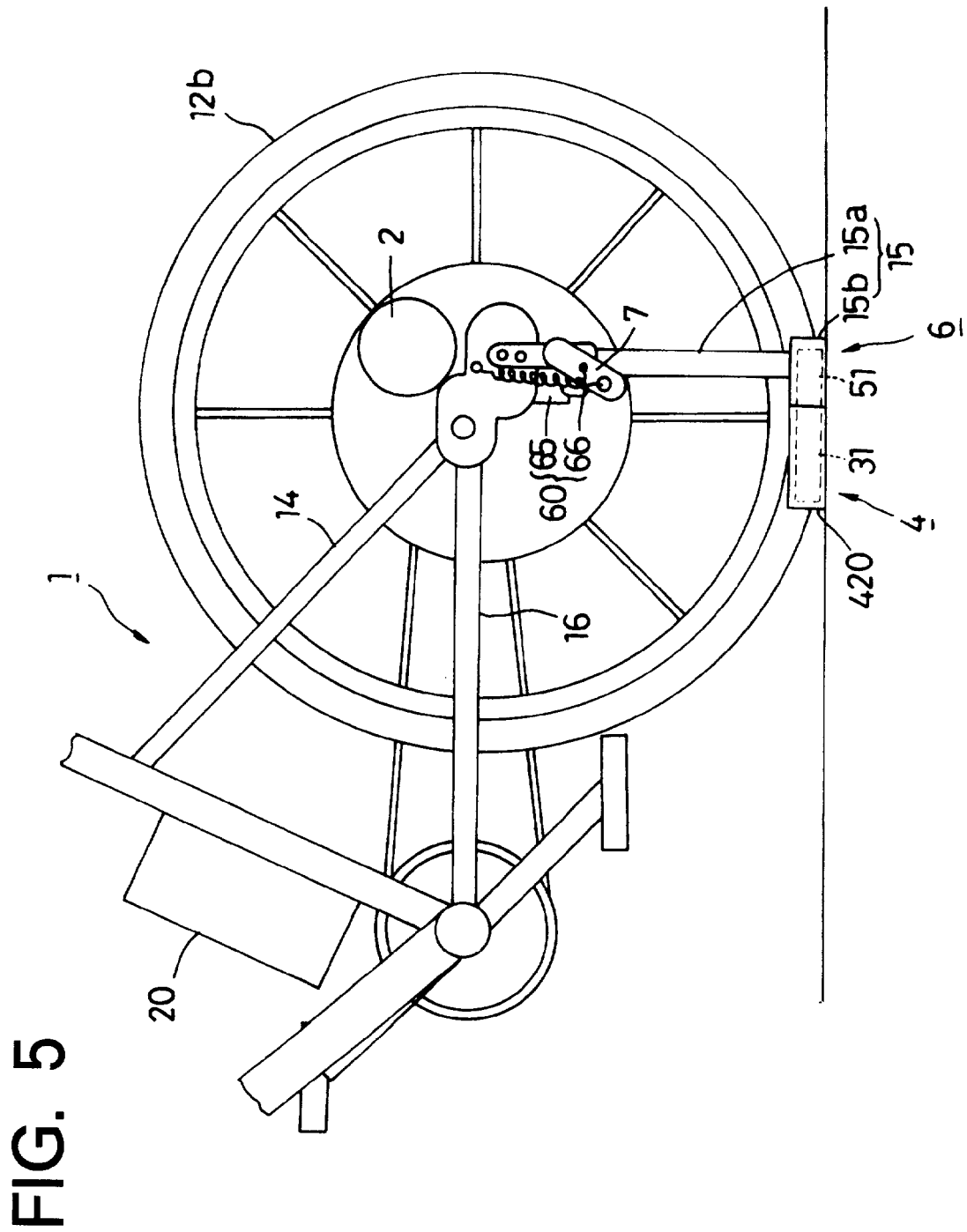
FIG. 5 is a side elevation of a second embodiment of battery charging system for a bicycle equipped with an electric motor to show the system in charging operation as it is seen from the left side.

FIG. 5 shows a bicycle equipped with an electric motor and having the charging system of this embodiment. With this system, the rear wheel 12b of the bicycle has a stand 15 for supporting the body 1 of the bicycle in an upright posture. The stand 15 comprises a leg portion 15a extending obliquely downward in the state of supporting the bicycle body 1 (hereinafter referred to merely as the "support state"), and a ground contact portion 15b in contact with the ground in the support states. The stand 15 is provided with a known lock mechanism 7 for locking the stand 15 in an upright position. When the body 1 of the present bicycle is to be supported by the stand 15, the stand 15 is positioned upright and then the lock mechanism 7 is set in a locked state. When the bicycle is to be ridden, the mechanism 7 is released from the locked state, and the stand 15 is forced up to a horizontal position.

Figure 6:
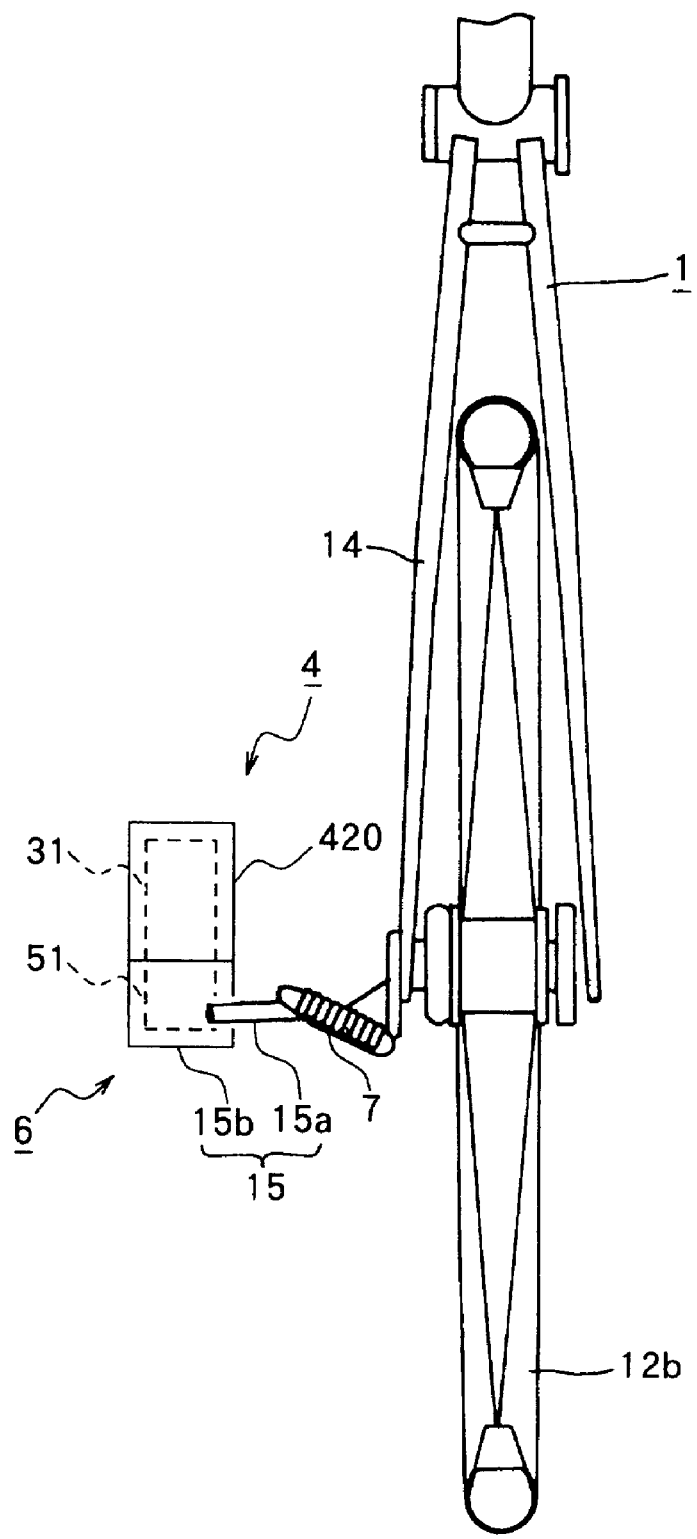
FIG. 6 is plan view partly broken away and showing this system in charging operation as it is seen from above.
Figure 7:
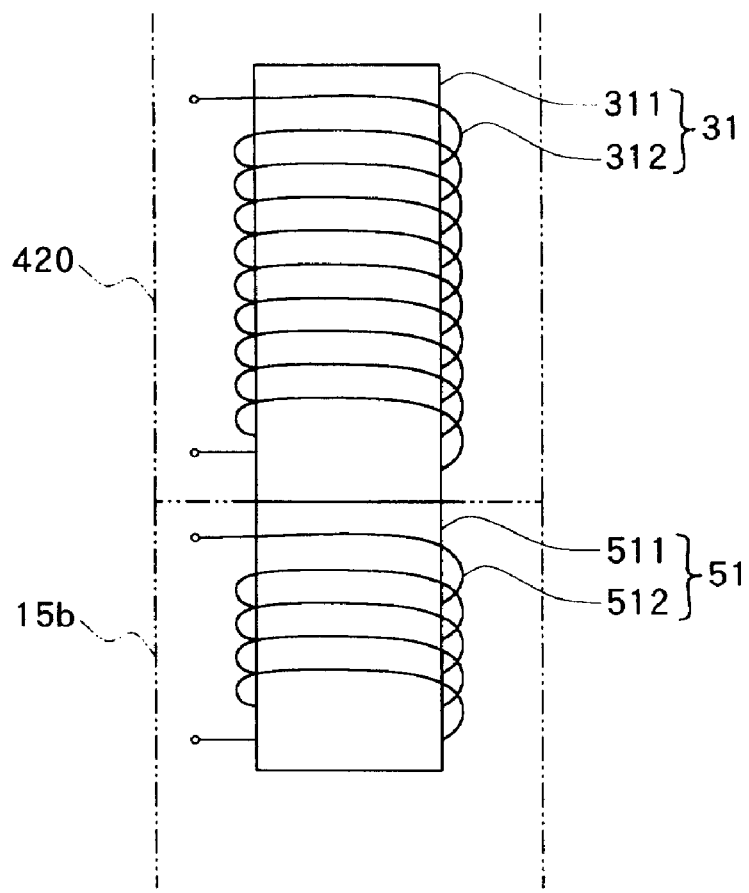
FIG. 7 is a diagram of a primary coil unit and a secondary coil unit included in the system.

The secondary charging device 6 of the present embodiment comprises a secondary coil unit 51, which is incorporated in the ground contact portion 15b of the stand 15 as seen in FIGS. 5 and 6. The coil unit 51 is connected to the battery 20 by a cable (not shown) which is embedded in the leg portion 15a of the stand 15 and a chain stay 16. As seen in FIG. 7, the secondary coil unit 51 comprises a secondary coil 512 provided around a barlike iron core 511. The core 511 has a front end face which is left exposed to the outside. The lock mechanism 7 of the stand 7 has a switch mechanism 60 comprising a switch 65 and a magnet 66. The operation of the switch mechanism 60 will be described later in detail. A battery unit (not shown) for housing the battery 20 has a rectifying circuit and a charging control circuit incorporated therein.

On the other hand, the primary charging device 4 comprises a primary coil unit 31 and a charging circuit (not shown) which are housed in a casing 420. Extending from the casing 420 is a power source cord (not shown) connectable to a receptacle of a commercial power source 8 of 100 V. The primary coil unit 31 comprises a primary coil 312 provided around a barlike iron core 311 as shown in FIG. 7. The core 311 has a rear end face exposed from the casing 420 to the outside.

FIG. 9 shows the overall construction of the charging system of the present embodiment.

As illustrated, the primary charging device 4 comprises the primary coil unit 31, and a charging circuit 403 comprising a rectifying circuit and a high-frequency inverter. The charging circuit 403 is connected to the commercial power source 8.

On the other hand, the secondary charging device 6 comprises the secondary coil unit 51, switch mechanism 60, rectifying circuit 601 and charging control circuit 602. When the battery 20 is fully charged with the voltage across the terminals thereof reaching at least a predetermined threshold value, the charging control circuit 602 discontinues the charging operation.

As illustrated, the switch mechanism 60 comprises the switch 65 and magnet 66. The switch 65 comprises a first switch 65a which is turned on when the magnet 66 is brought close thereto, and turned off when the magnet is moved away therefrom, and a second switch 65b which is operatively related with the on-off movement of the first switch 65a.

Figure 8:
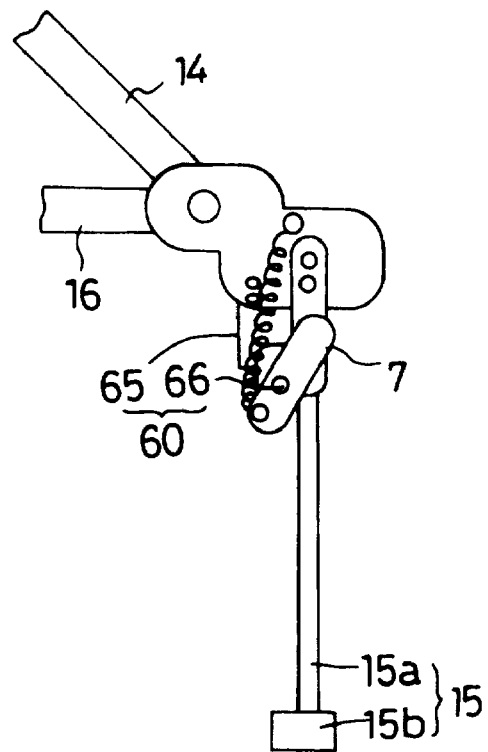
FIGS. 8(a) and 8(b) include diagrams showing a switch mechanism of the system.
Figure 8:
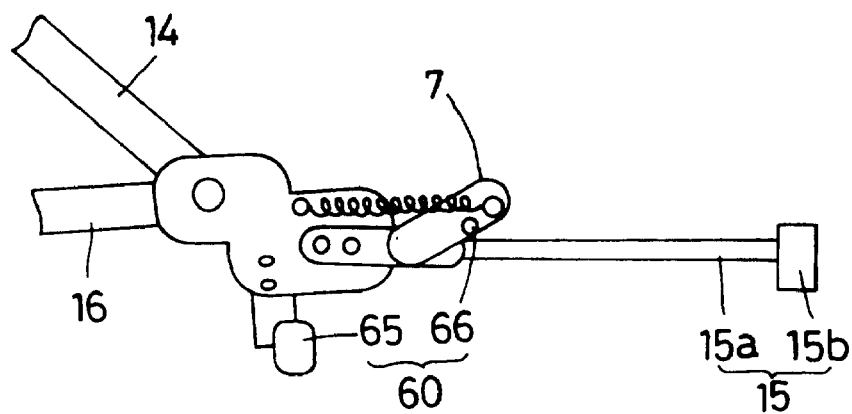

With reference to FIG. 8(a), when the stand 15 is positioned upright, and the lock mechanism 7 set in the locked state, the magnet 66 is brought close to the switch 65, whereby the first switch 65a is turned on. With this movement, the second switch 65b is turned on. Consequently, a closed loop is formed by the secondary coil unit 51, rectifying circuit 601, charging control circuit 602 and battery 20.

On the other hand, when the lock mechanism 7 is released from the locked state to position the stand horizontally as seen in FIG. 8(b), the magnet 66 moves away from the switch 65. This turns off the first switch 65a and also turns off the second switch 65b in operative relation with the first. Consequently, the loop is opened.

When the battery 20 on the bicycle body 1 is to be charged by the system of the present embodiment, the bicycle body 1 is advanced to bring the rear wheel 12b close to the right side of the primary charging device 4, whereupon the advancing bicycle body 1 is halted. The stand is then positioned upright to bring the secondary coil unit 51 of the secondary charging device 6 into contact with the primary coil unit 31 of the primary charging device 4 as seen in FIGS. 5 to 7, and the lock mechanism 7 is set in the locked state. This turns on the first and second switches 65a, 65b.

The alternating current available from the commercial power source 8 is supplied to the charging circuit 403, converted to a high-frequency current and then fed to the primary coil unit 31. This causes the primary coil 312 of the unit 31 to produce lines of magnetic force, which penetrate through the secondary coil 512 of the secondary coil unit 51, whereby the primary and secondary coils 312, 512 are electromagnetically coupled to each other.

Consequently, the secondary coil unit 51 affords a high-frequency current, which is converted by the rectifying circuit 601 to a direct current, then set to a predetermined current value by the charging control circuit 602 and fed to the battery 20, whereby the battery 20 is charged.

When the battery 20 has been fully charged with the voltage across the terminals thereof reaching at least the predetermined threshold value, the charging control circuit 602 functions to discontinue the charging operation.

While the lock mechanism 7 is left unlocked for riding, the switch mechanism 60 of the secondary charging device 6 of the present charging system is off, and no current is supplied to the battery 20 to assure safety.

When the lock mechanism 7 is unlocked, the switch mechanism 60 of the secondary charging device 6 is automatically turned off. This eliminates the cumbersome switching procedure need for the first embodiment when charging is to be effected or ended.

The switching mechanism 60 described can be replaced by a switch mechanism which is turned on by positioning the stand upright and turned off by forcing the stand upward.

Third Embodiment

Figure 10:
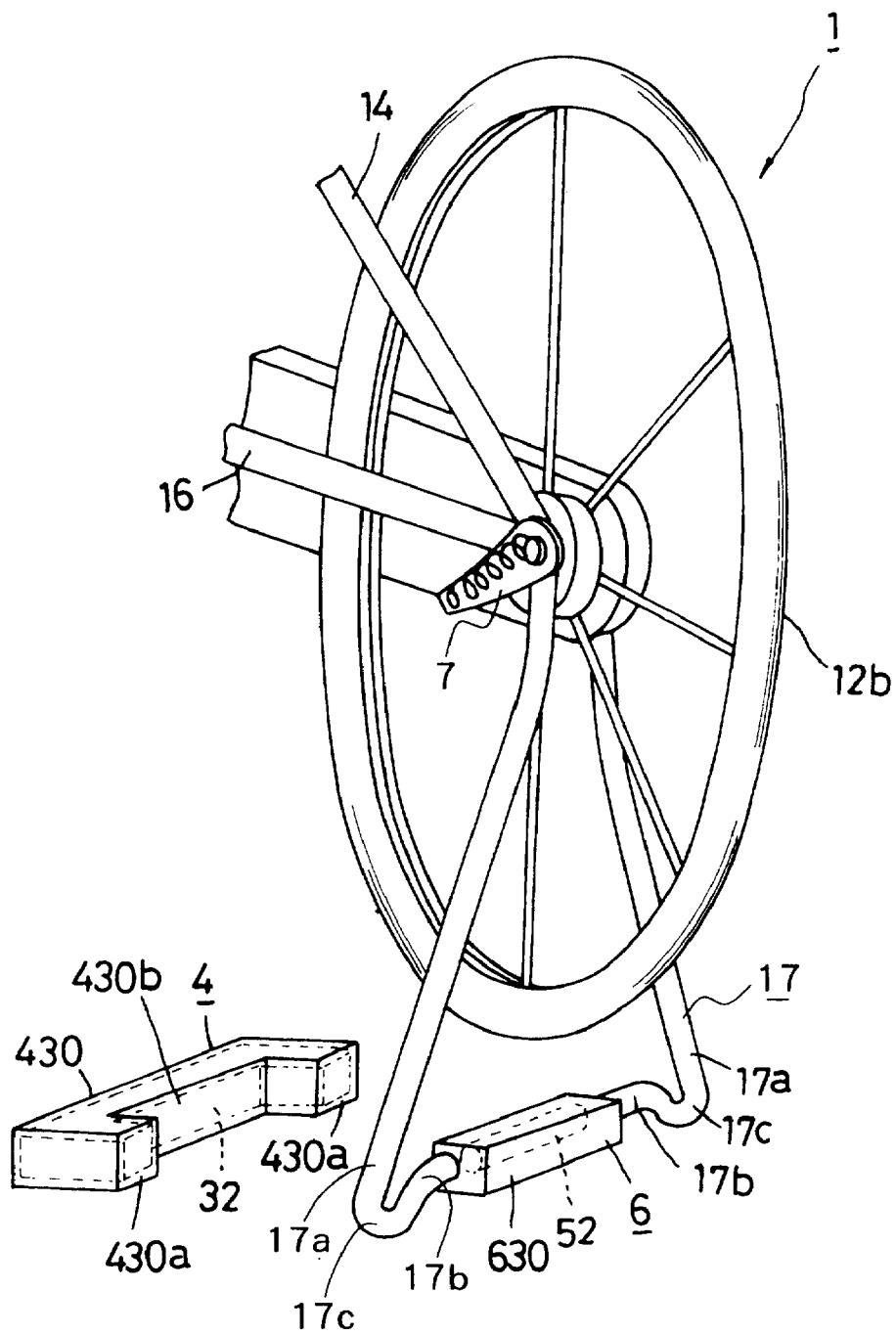
FIG. 10 is a perspective view showing the overall construction of a third embodiment of battery charging system for a bicycle equipped with an electric motor.

FIG. 10 shows a bicycle having an electric motor and the charging system of this embodiment. The rear wheel 12b of the bicycle is provided with a stand 17 for supporting the body 1 of the bicycle in an upright position. The stand 17 comprises a pair of left and right legs 17a, 17a extending obliquely downward in the support state, a pair of left and right horizontal portions 17b, 17b extending horizontally in the support state, and a pair of ground contact portions 17c, 17c to be in contact with the ground in the support state. The stand 17 is provided with a lock mechanism 7.

Figure 11:
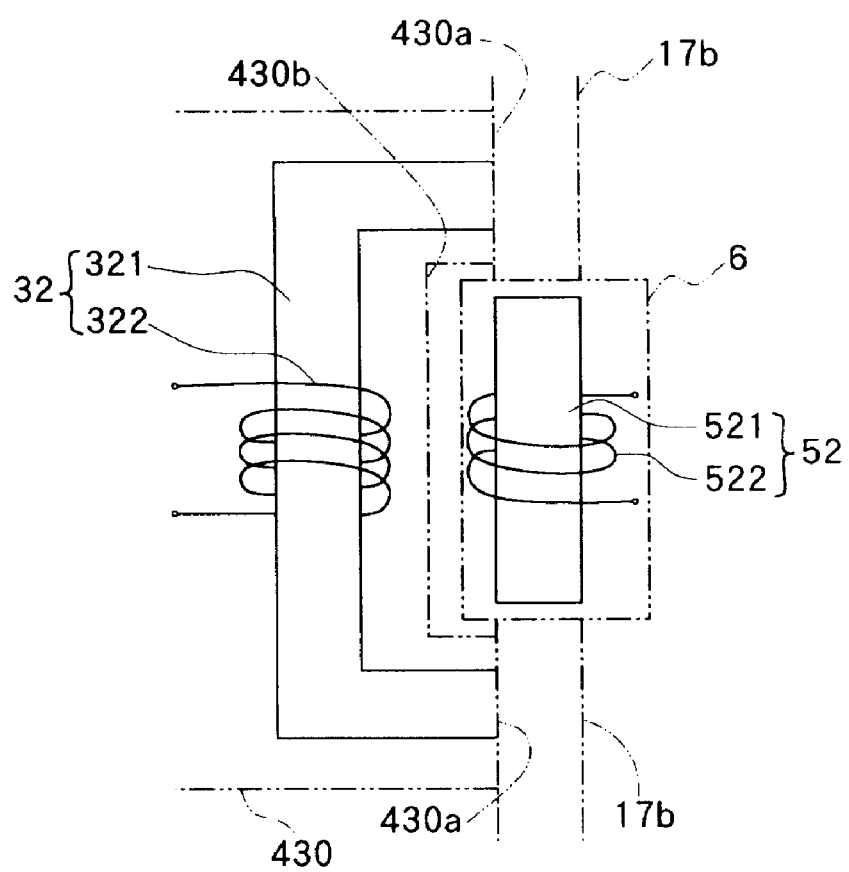
FIG. 11 is a diagram of a primary coil unit and a secondary coil unit included in the system.
Figure 12:
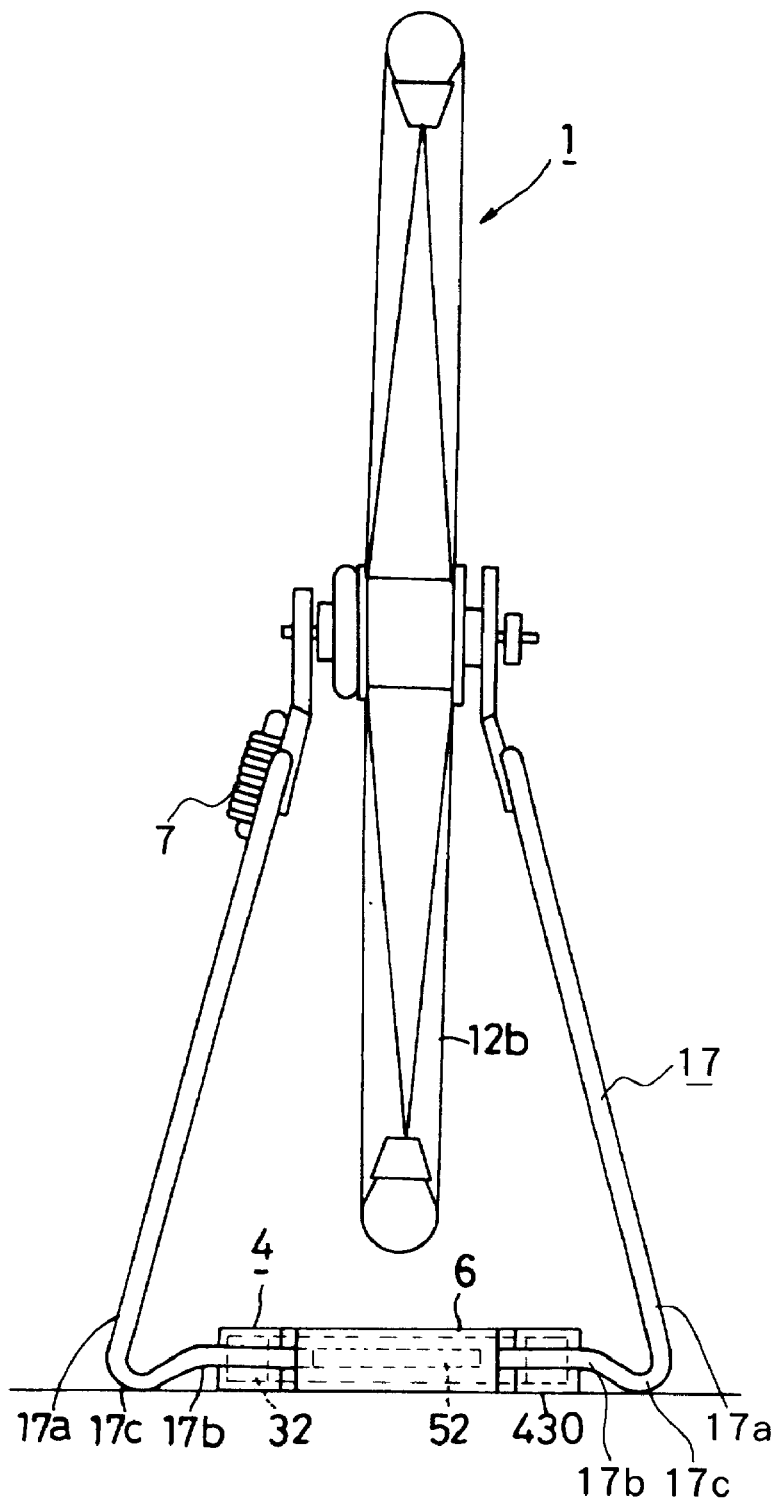
FIG. 12 is a rear view partly broken away and showing the system in charging operation as it is seen from the behind.

As shown in FIGS. 10 and 12, the secondary charging devices 6 of the present embodiment comprises a secondary coil unit 52 housed in a casing 630. The casing 630 is attached to the stand 17 between the two horizontal portions 17b, 17b thereof to interconnect these portions 17b, 17b. The secondary coil unit 52 is connected to the battery 20 by a cable (not shown) embedded in the stand horizontal portion 17b, ground contact portion 17c, leg 17a and chain stay 16. As seen in FIG. 11, the coil unit 52 comprises a secondary coil 522 provided around a barlike iron core 521.

A battery unit (not shown) including the battery 20 has a rectifying circuit and a charging control circuit incorporated therein.

The lock mechanism 7 on the stand 17 is provided with a switch mechanism for effecting or suspending the supply of current to the battery 20. The switch mechanism is exactly the same as the switch mechanism 60 of the second embodiment described in construction and operation and therefore will not be illustrated or described.

On the other hand, the primary charging device 4 comprises a primary coil unit 32 and a charging circuit (not shown) which are housed in a C-shaped casing 430. Extending from the casing 430 is a power source cord (not shown) which is connectable to a receptacle of 100-V commercial power source 8. As seen in FIG. 11, the coil unit 32 comprises a primary coil 322 provided around a C-shaped iron core 321, which has opposite end faces exposed from the casing 430 to the outside. The coil unit 32 is housed in the casing 430, as positioned in the same posture as the casing.

When the battery 20 on the bicycle body 1 is to be charged by the system of the present embodiment, the bicycle body 1 is advanced to bring the rear wheel 12b close to the rear of the primary charging device 4, whereupon the advancing bicycle body 1 is halted. The stand 17 is then positioned upright to bring the horizontal portions 17b, 17b of the stand 17 into contact with the respective rear faces 430a, 430a of the casing 430 of the primary charging device 4 as shown in FIGS. 11 and 12, whereby the casing 630 of the secondary charging device 6 is partly placed into the recessed portion 430b of the primary charging device 4. In this state, the secondary coil unit 52 is positioned in proximity with the primary coil unit 32. The lock mechanism (not shown) is then set in the locked state. Consequently, the battery 20 is charged in the same manner as by the second embodiment.

With the fourth to sixth embodiments to be described below the rear wheel 12b is provided with a stand 15 which has a secondary coil unit incorporated therein as in thus electrically assisted bicycle of the second embodiment shown in FIG. 5, and the primary charging devices 4 has a characteristic feature.

Fourth Embodiment

Figure 13:
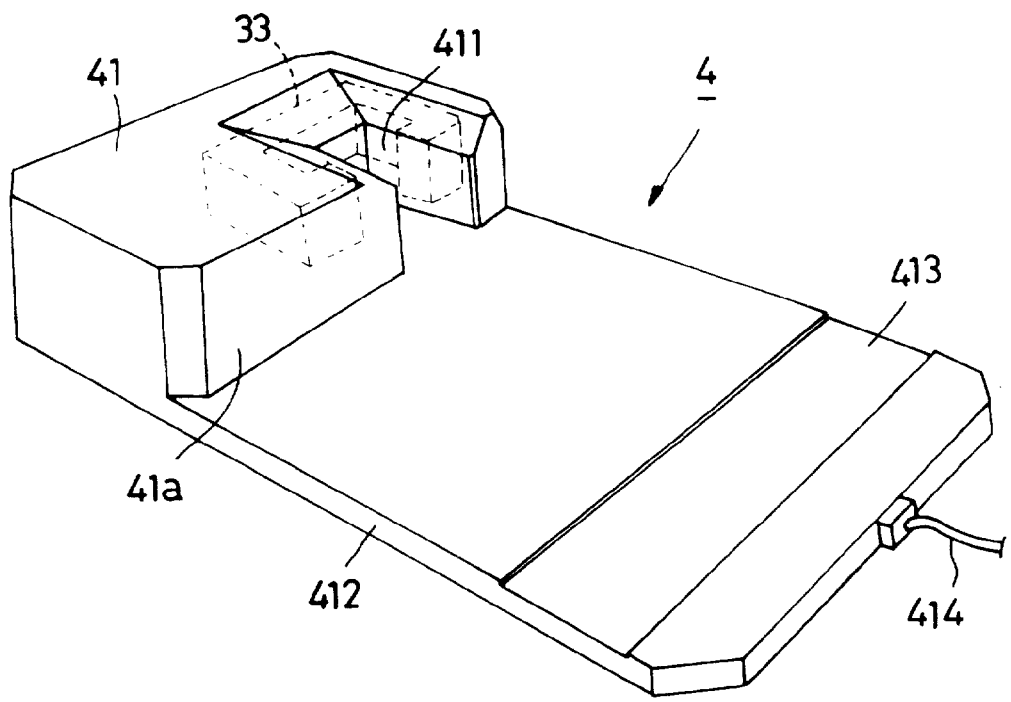
FIG. 13 is a perspective view showing a primary charging device included in a fourth embodiment of battery charging system for a bicycle equipped with an electric motor.

With reference to FIG. 13, the primary charging device 4 of this embodiment comprises a base 412 formed with a groove 413 extending in the direction of advance of the bicycle body 1 for positioning the rear wheel 12b of the body 1. Extending from the base 412 is a power source cord 414 connectable to a receptacle of the commercial power source.

Mounted on the base 412 are a primary coil unit 33 and a charging circuit (not shown) which are housed in a casing 41. The casing 41 is formed in its right side 41a with a recessed portion 411 for the ground engaging portion 15b of the stand 15 to engage in. The recessed portion 411 is open upward and rightward.

Figure 14:
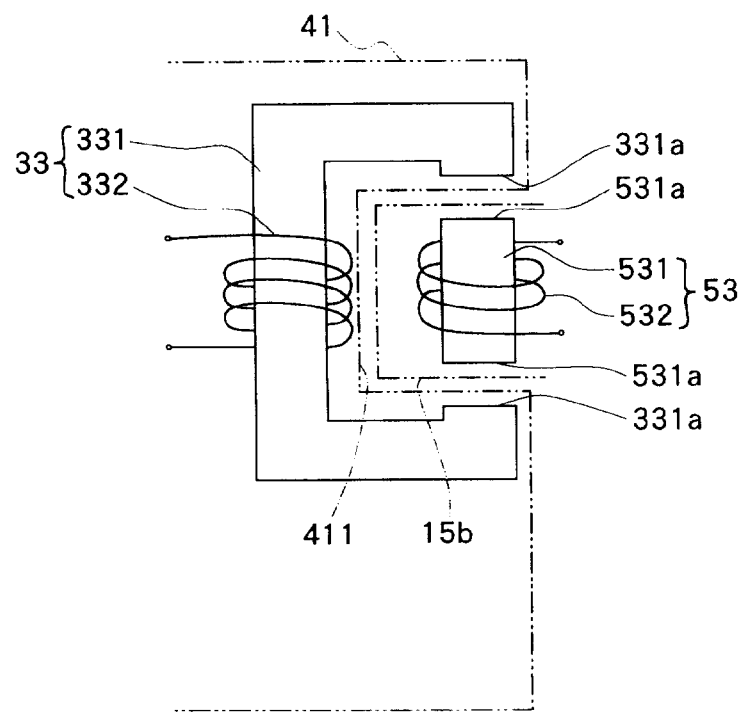
FIG. 14 is a diagram of a primary coil unit and a secondary coil unit included in the system.

As shown in FIG. 14, the primary coil unit 33 comprises a primary coil 332 provided around a C-shaped iron core 331. The primary coil 332 has an axis parallel to the direction of advance of the bicycle body 1. The coil unit 33 is provided at the left side of the recessed portion 411 to surround this portion, and is housed in the casing 41.

Figure 15:
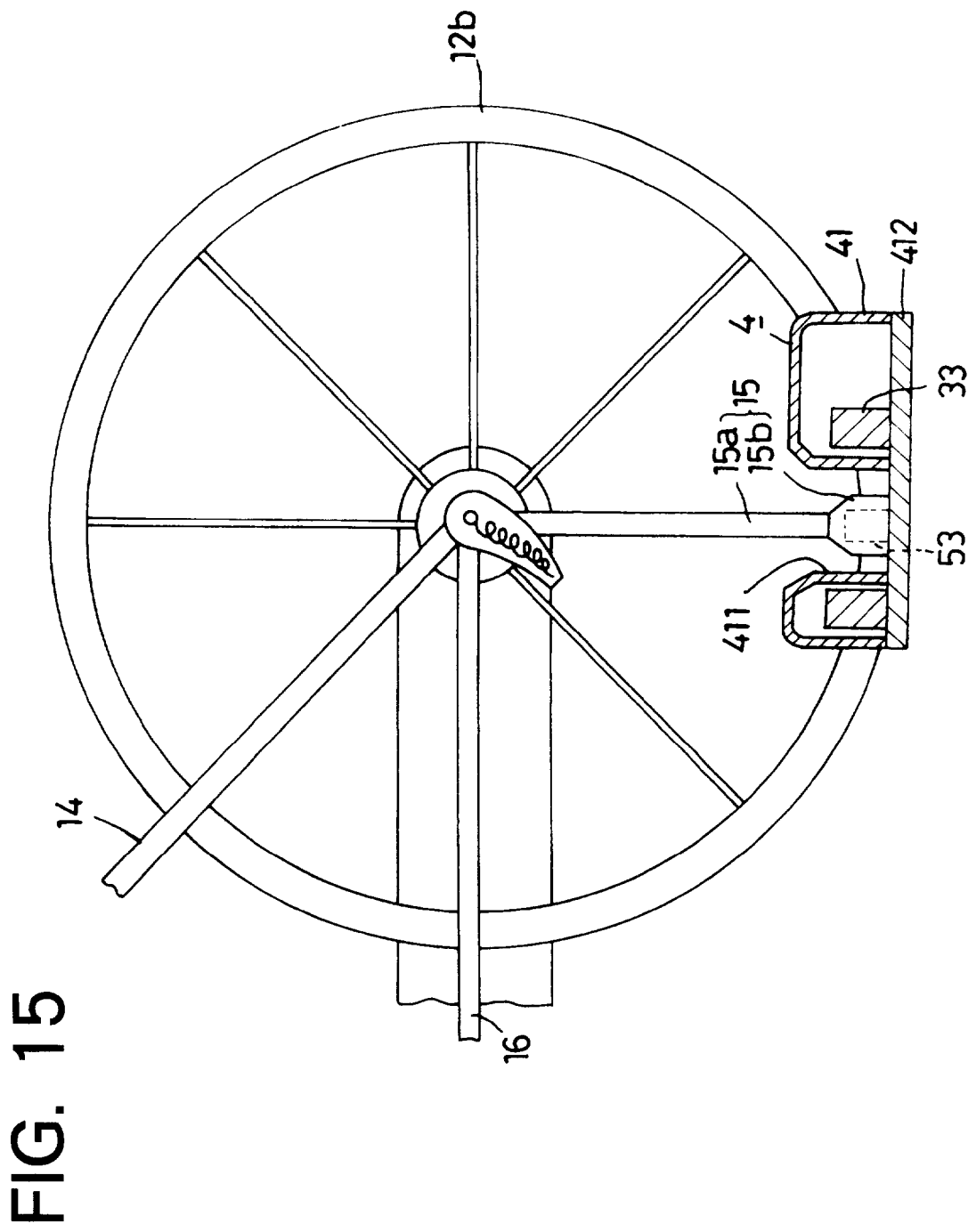
FIG. 15 is a side elevation partly broken away and showing the system in charging operation as it is seen from the left side.
Figure 16:
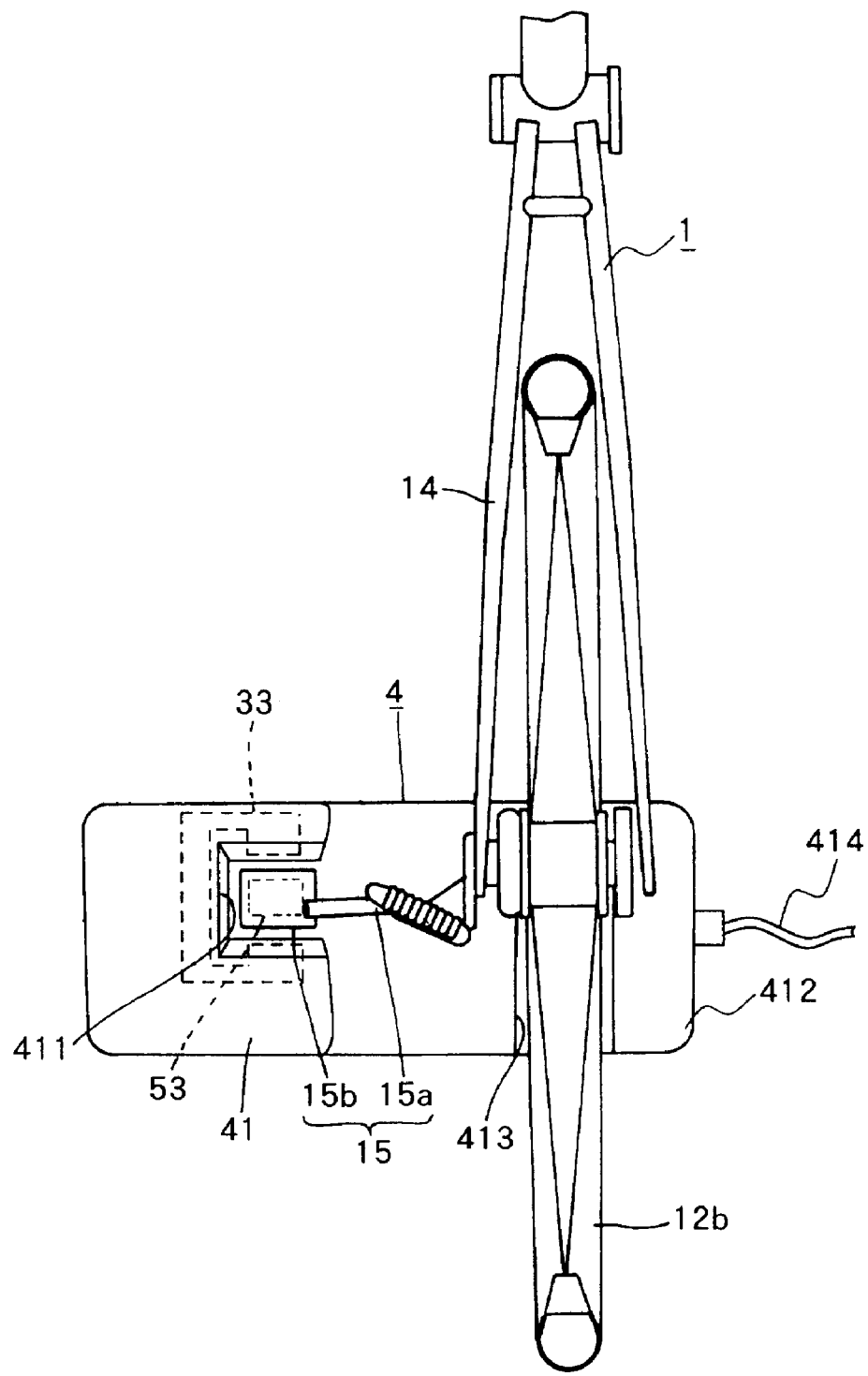
FIG. 16 is plan view partly broken away and showing the system in charging operation as it is seen from above.

On the other hand, the secondary charging device 6 comprises a secondary coil unit 53 housed in the ground contact portion 15b of the stand 15 as shown in FIGS. 15 and 16. With reference to FIG. 14, the secondary coil unit 53 comprises a secondary coil 532 provided around a barlike iron core 531. Like the primary coil 332, the secondary coil 532 has an axis parallel to the direction of advance of the bicycle body 1.

When the battery 20 on the bicycle body 1 is to be charged by the system of this embodiment, the bicycle body 1 is advanced to place the rear wheel 12b in the positioning groove 413, whereupon the advancing body 1 is halted. The stand 15 is then positioned upright, and the bicycle body 1 is thereafter shifted leftward to engage the ground contact portion 15b of the stand 15 in the recessed portion 411 of the primary charging device 4, whereby the secondary coil unit 53 incorporated in the ground contact portion 15b of the stand 15 is positioned as specified in proximity with the primary coil unit 33. Opposite ends 331a, 331a of the core 331 of the primary coil unit 33 are opposed to respective opposite ends 531a, 531a of the core 531 of the secondary coil unit 53, with a small clearance formed therebetween as seen in FIG. 14.

Consequently, the primary and secondary coils 332, 532 are electromagnetically coupled to each other, permitting the secondary coil unit 53 to afford a high-frequency current. The current is supplied to the battery 20 through a rectifying circuit and a charging control circuit, whereby the battery 20 is charged.

With the charging system of the present embodiment, the ground contact portion 15b of the stand 15 is engaged in the recessed portion 411 of the casing 41 of the primary charging device 4, with the rear wheel 12b placed in the positioning groove 413, whereby the secondary coil unit 53 can be accurately positioned in place, and the primary coil 332 and the secondary coil 532 can be electromagnetically coupled to each other reliably.

Further since the iron core 331 of the primary coil unit 33 and the iron core 531 of the secondary coil unit 53 are arranged in proximity with each other as seen in FIG. 14, the lines of magnetic forces emanating from the core 331 of the primary coil unit 33 almost wholly impinge on the core 531 of the secondary coil unit 53 to penetrate through the secondary coil 532.

As a result, the battery 20 can be charged efficiently.

The secondary coil unit 53 can be positioned in proximity with the primary coil unit 33 by engaging the ground contact portion 15b of the stand 15 in the recessed portion 411 of the primary charging device 4. The coil unit 53 can therefore be positioned in place easily for charging.

Fifth Embodiment

Figure 17:
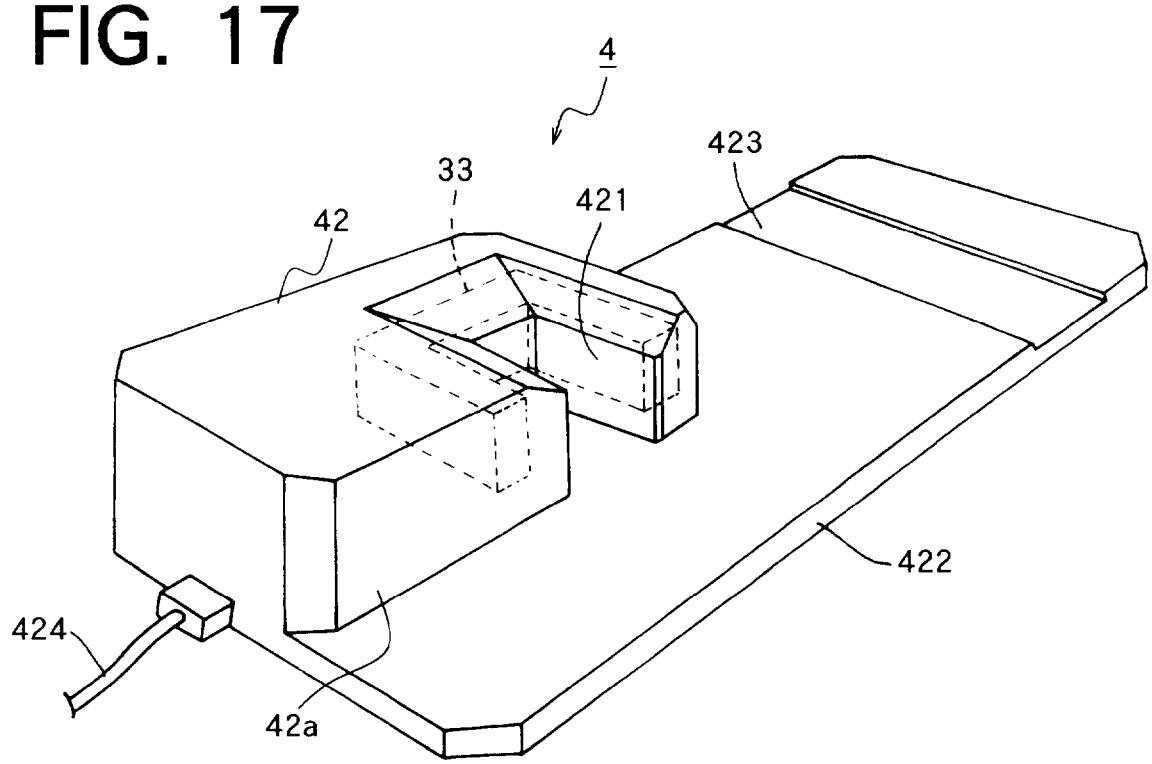
FIG. 17 is a perspective view showing a primary charging device included in a fifth embodiment of battery charging system for a bicycle equipped with an electric motor.

The portion 411 is recessed in a direction perpendicular to the direction of advance of the bicycle body 1 according to the fourth embodiment, whereas the primary charging device 4 of this embodiment has a portion 421 recessed in parallel to the direction of advance of the bicycle body 1 as seen in FIG. 17.

The primary charging device 4 of this embodiment comprises a base 422 formed with a groove 423 extending in the direction of advance of the bicycle body 1 for positioning the rear wheel 12b of the body 1 in place. Extending from the base 422 is a power source cord 424 connectable to a receptacle of the commercial power source.

Mounted on the base 422 are a primary coil unit 39 and a charging circuit (not shown) which are housed in a casing 42. The recessed portion 421 for the ground engaging portion 15b of the stand 15 to engage in is formed in the rear side 42a of the casing 42. The recessed portion 421 is open upward and rearward.

Figure 18:
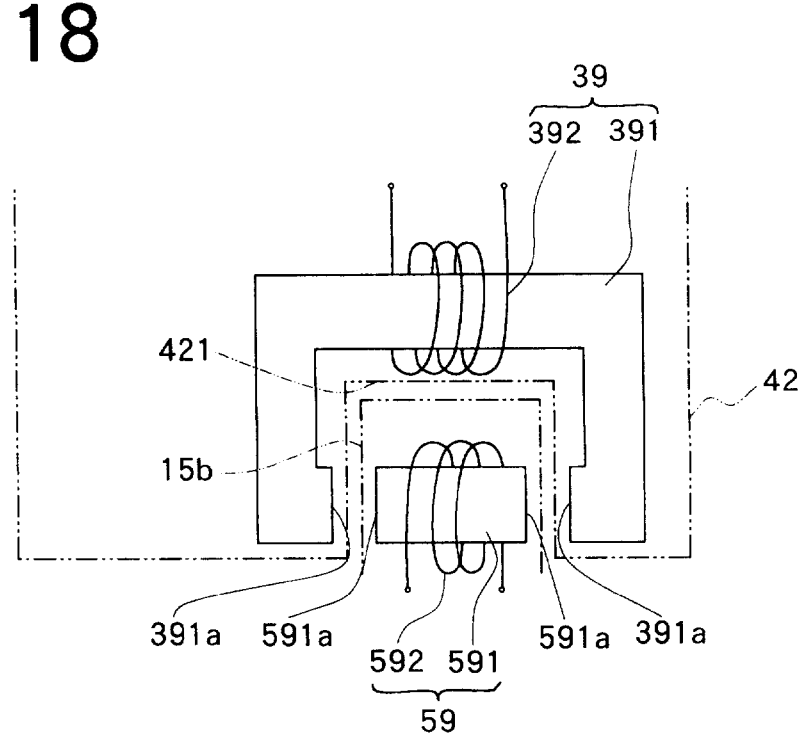
FIG. 18 is a diagram of a primary coil unit and a secondary coil unit included in the system.

As shown in FIG. 18, the primary coil unit 39 comprises a primary coil 392 provided around a C-shaped iron core 391. The primary coil 392 has an axis perpendicular to the direction of advance of the bicycle body 1. The coil unit 39 is provided at the front side of the recessed portion 421 to surround this portion, and is housed in the casing 42.

Figure 19:
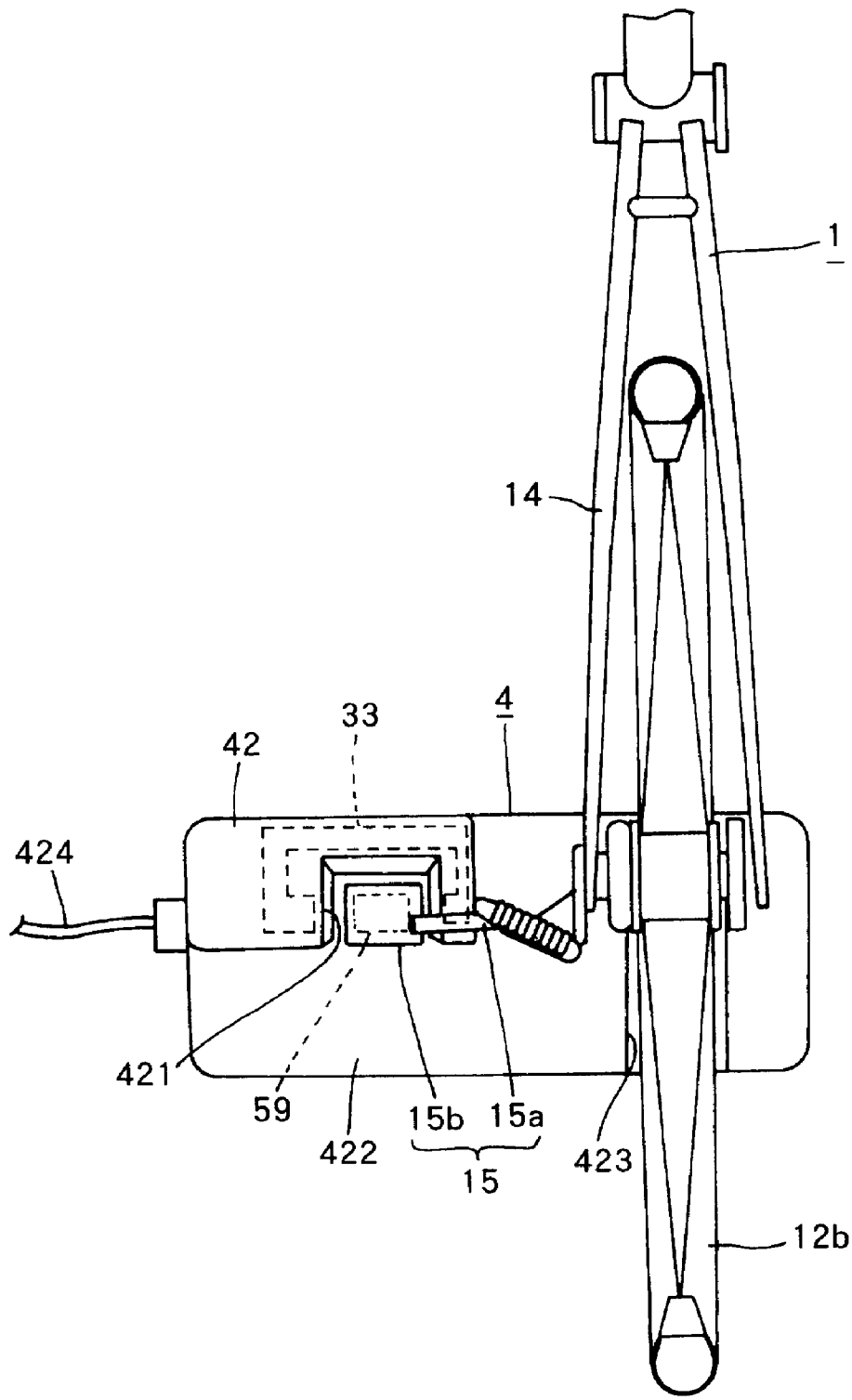
FIG. 19 is plan view partly broken away and showing the system in charging operation as it is seen from above.
Figure 20:
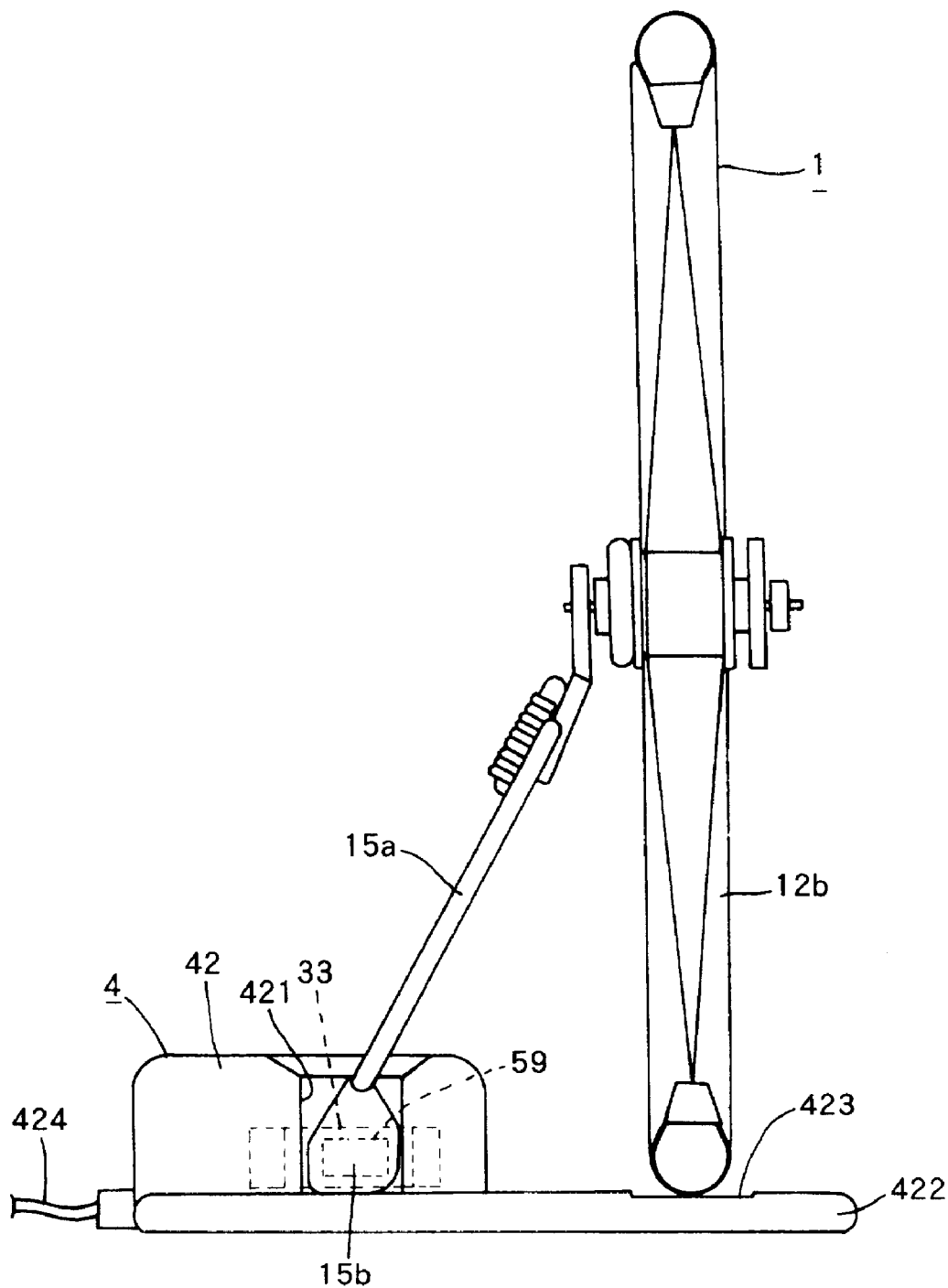
FIG. 20 is a rear view partly broken away and showing the system in charging operation as it is seen from the behind.

On the other hand, the secondary charging device 6 comprises a secondary coil unit 59 housed in the ground contact portion 15b of the stand 15 as shown in FIGS. 19 and 20. The secondary coil unit 59 comprises a secondary coil 592 provided around a barlike iron core 591 Like the primary coil 392, the secondary coil 592 has an axis perpendicular to the direction of advance of the bicycle body 1.

When the battery 20 on the bicycle body 1 is to be charged by the system of this embodiment, the bicycle body 1 is advanced to place the rear wheel 12b in the positioning groove 423, whereupon the advancing body 1 is halted. When the stand 15 is then positioned upright, the ground contact portion 15b of the stand 15 is placed into the recessed portion 421 from the rear side of casing 41 of the primary charging device 4 and accommodated in the recessed portion 421 as seen in FIG. 19, whereby the secondary coil unit 59 incorporated in the ground contact portion 15b of the stand 15 is positioned as specified in proximity with the primary coil unit 39. Opposite ends 391a, 391a of the core 391 of the primary coil unit 39 are opposed to respective opposite ends 591a, 591a of the core 591 of the secondary coil unit 59, with a small clearance formed therebetween as seen in FIG. 18.

Consequently, the battery 20 is charged in the same manner as in the fourth embodiment.

With the present embodiment, the ground contact portion 15b of the stand 15 is placed into the recessed portion 421 of the primary charging device 4 by positioning the stand 15 upright, with the rear wheel 12b placed in the positioning groove 423. This eliminates the procedure of shifting the bicycle body 1 leftward after positioning the stand 15 upright which procedure is required of the fourth embodiment.

Sixth Embodiment

Figure 21:
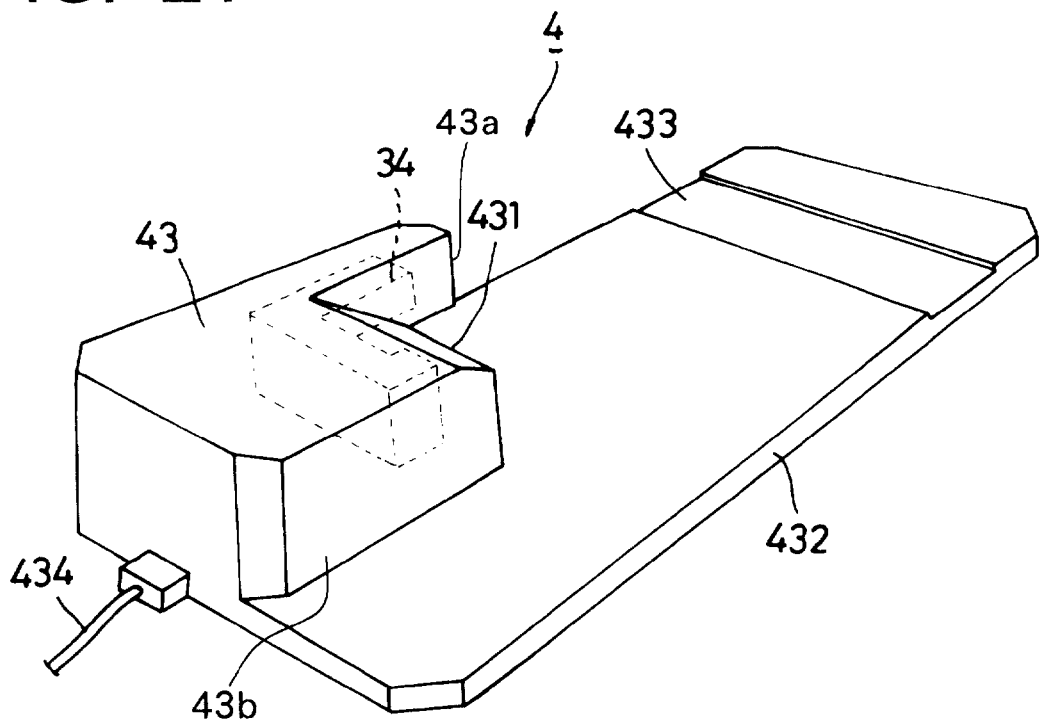
FIG. 21 is a perspective view showing a primary charging device included in a sixth embodiment of battery charging system for a bicycle equipped with an electric motor.

The fifth embodiment has the C-shaped casing 42, whereas the primary charging device 4 of this embodiment has an L-shaped casing 43 as seen in FIG. 21.

The primary charging device 4 of this embodiment comprises a base 432 formed with a groove 433 extending in the direction of advance of the bicycle body 1 for positioning the rear wheel 12b of the body 1 in place. Extending from the base 432 is a power source cord 434 connectable to a receptacle of the commercial power source.

Mounted on the base 432 are a primary coil unit 34 and a charging circuit (not shown) which are housed in a casing 43. A recessed portion 431 for the ground engaging portion 15b of the stand 15 to engage in is formed in the corner of the left side face 43a and the rear side face 43b of the casing 43. The recessed portion 431 is open upward and rearward.

Figure 22:
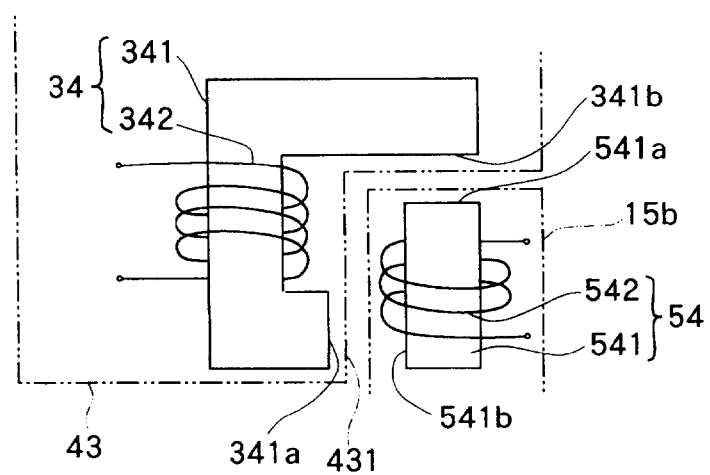
FIG. 22 is a diagram of a primary coil unit and a secondary coil unit included in the system.

As shown in FIG. 22, the primary coil unit 34 comprises a primary coil 342 provided around a substantially L-shaped iron core 341. The primary coil 342 has an axis parallel to the direction of advance of the bicycle body 1. The coil unit 34 is housed in the casing 43, with its core 341 positioned along the recessed portion 431.

Figure 23:
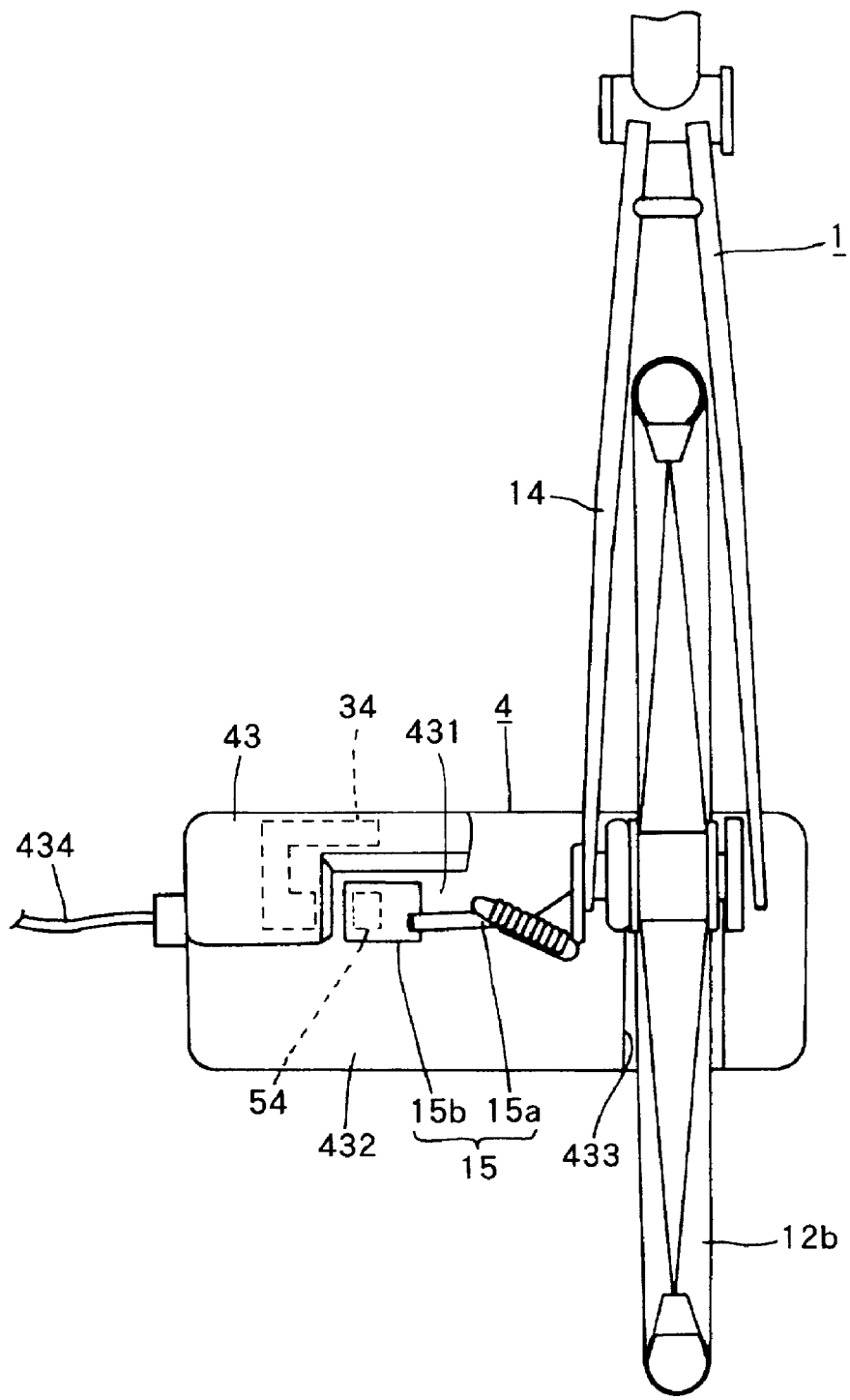
FIG. 23 is plan view partly broken away and showing the system in charging operation as it is seen from above.
Figure 24:
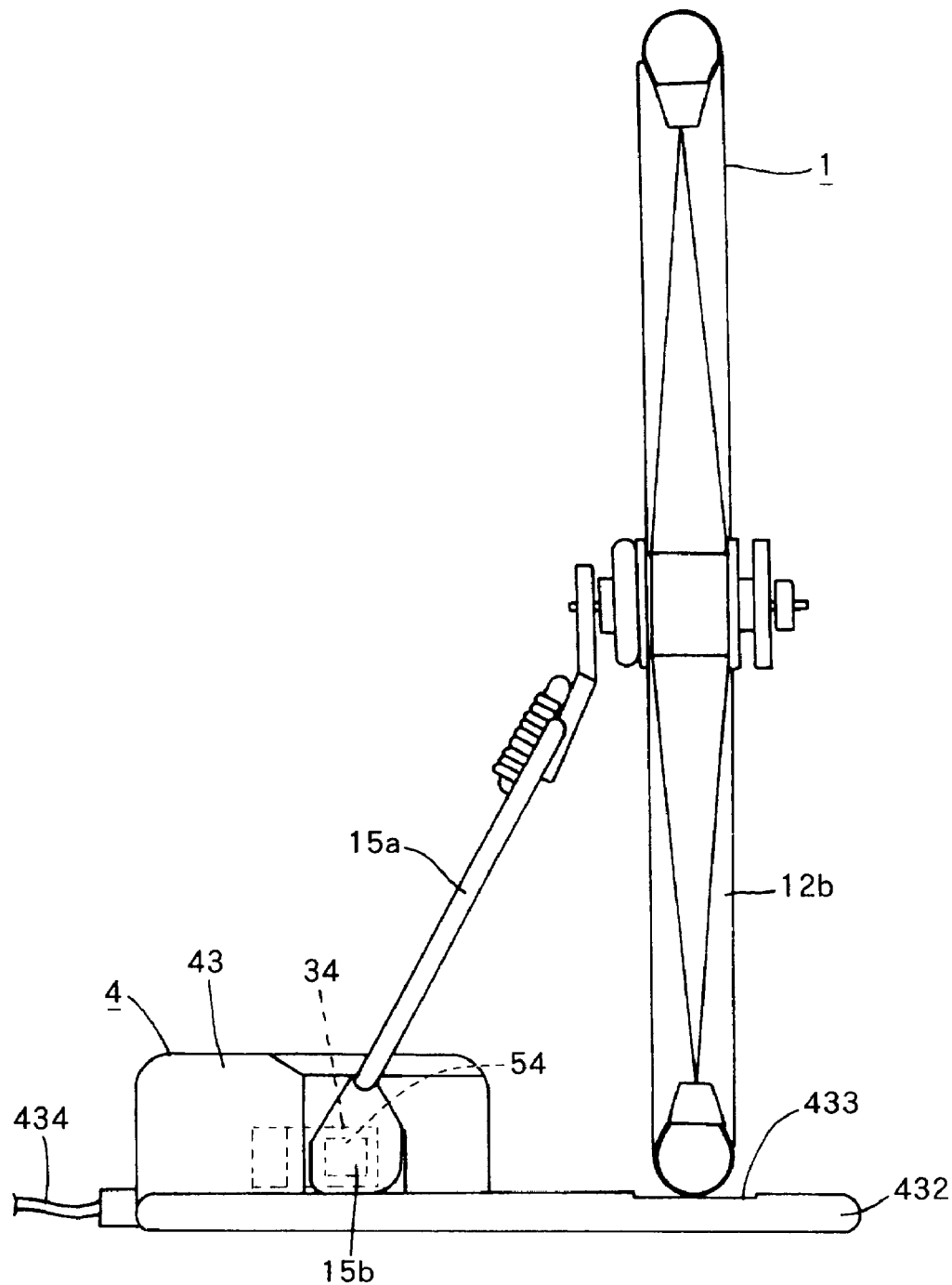
FIG. 24 is a rear view partly broken away and showing the system in charging operation as it is seen from the behind.

On the other hand, the secondary charging device 6 comprises a secondary coil unit 54 housed in the ground contact portion 15b of the stand 15 as shown in FIGS. 23 and 24. The secondary coil unit 54 of the device 6 comprises a secondary coil 542 provided around a barlike iron core 541. The secondary coil 542 has an axis parallel to the direction of advance of the bicycle body 1.

When the battery 20 on the bicycle body 1 is to be charged by the system of this embodiment, the bicycle body 1 is advanced to place the rear wheel 12b in the positioning groove 433, whereupon the advancing body 1 is halted. When the stand 15 is then positioned upright, the ground contact portion 15b of the stand 15 is placed into the recessed portion 431 from the rear side of casing 43 of the primary charging device 4 and accommodated in the recessed portion 431 as seen in FIG. 23, whereby the secondary coil unit 54 incorporated in the ground contact portion 15b of the stand 15 is positioned as specified in proximity with the primary coil unit 34. In this arrangement, one end face 341a of the core 341 of the primary coil unit 34 is opposed to a sides face 541b of one end portion of the core 541 of the secondary coil unit 54, and a side face 341b of the other end of the core 341 of the unit 34 is opposed to the face 541a of the core other end of the secondary coil unit 54, with a small clearance formed between each pair of opposed faces as seen in FIG. 22. Consequently, the battery 20 is charged.

With the present embodiment, the recessed portion 431 of the primary charging device 4 is open rightward as seen in FIG. 21, so that the ground contact portion 15b of the stand 15 can be placed into the recessed portion 431 with greater ease than is the case with the fifth embodiment.

Seventh Embodiment

Figure 25:
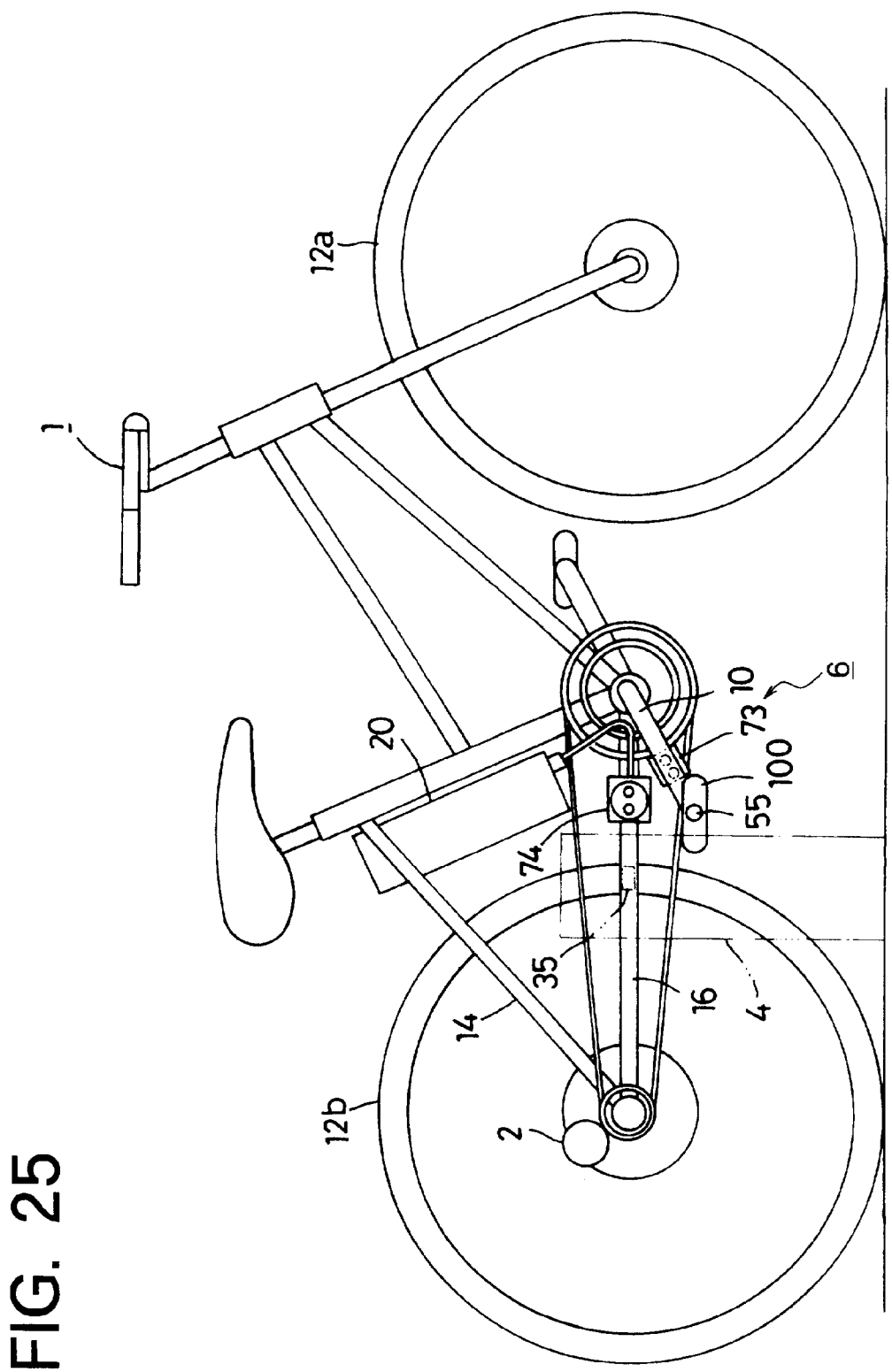
FIG. 25 is a perspective view showing the overall construction of a seventh embodiment of battery charging system for a bicycle equipped with an electric motor.
Figure 26:
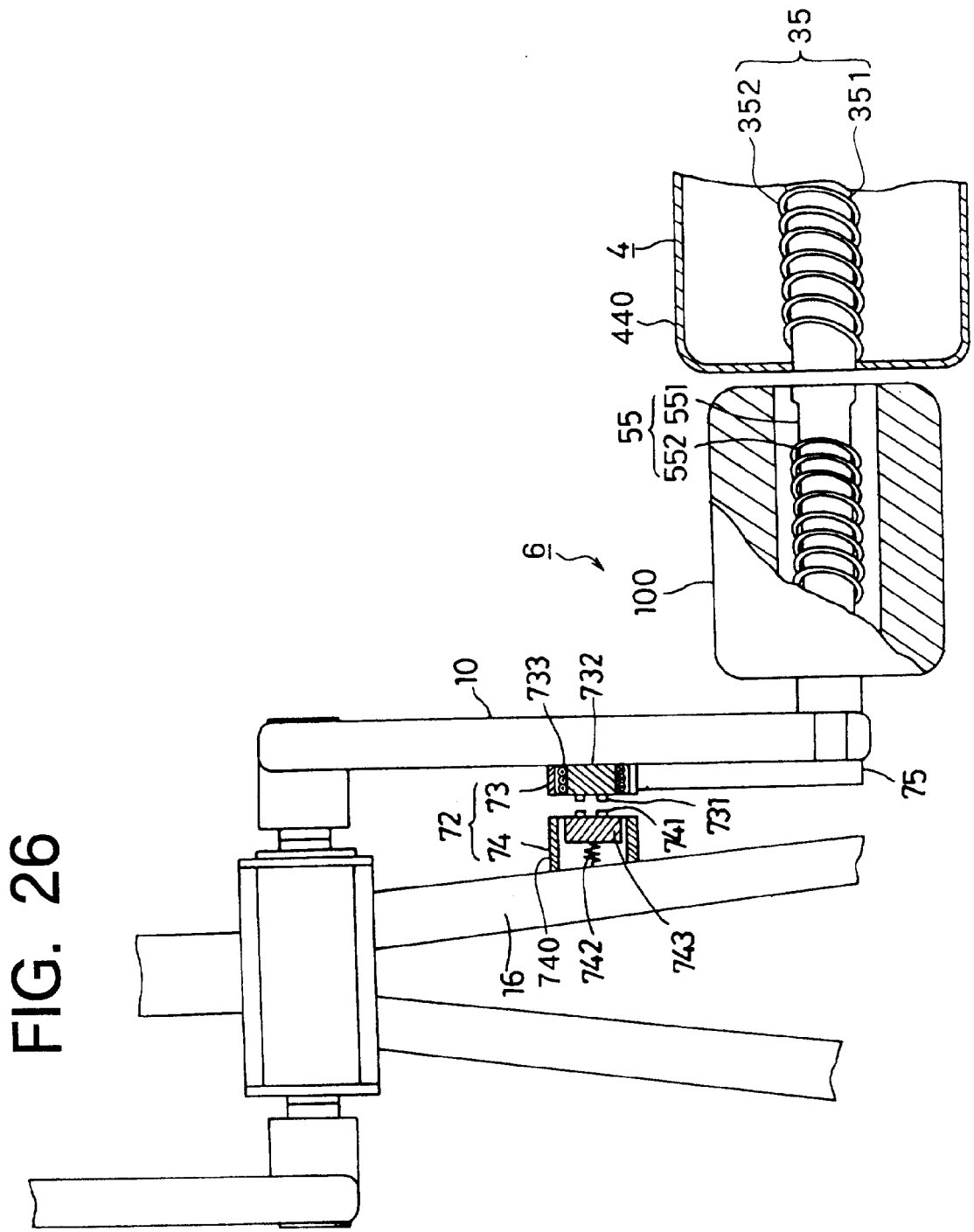
FIG. 26 is an enlarged fragmentary view partly broken away and showing the system.

With reference to FIGS. 25 and 26, the secondary charging device 6 of this embodiment comprises a secondary coil unit 55 incorporated in a pedal 100. The coil unit 55 comprises a secondary coil 552 provided around a barlike iron core 551 connected to the shaft of the pedal 100. The core 551 has an end exposed sideways of the bicycle body 1.

A crank 10 has a rectifying unit 75 facing the bicycle body 1 and is connected to the secondary coil unit 55 by conductors (not shown).

The bicycle body 1 has a coupling mechanism 72 for electrically connecting the secondary coil unit 55 and the battery 20 together or breaking the connection. The coupling mechanism 72 comprises a first assembly 73 attached to the crank 10 at the side thereof facing the bicycle body 1, and a second assembly 74 mounted on a chain stay 16 on the side thereof facing the petal 100. The first assembly 73 is opposed to the second assembly 74 when the crank 10 is brought to a position in which it is parallel to the chain stay 16.

The first assembly 73 comprises a coil 733 provided around an iron core 732. A pair of positive and negative electrodes 731, 731 are attached to the core 732 on the surface thereof to be opposed to the second assembly 74, and are electrically insulated from the cores 732.

On the other hand, the second assembly 74 has a tubular casing 740 secured to the stay with the axis thereof positioned perpendicular to the plane of rotation of the crank 10. An iron piece 743 is slidably fitted in the casing 740 and resiliently supported by a spring 742. Attached to the iron piece 743 on the surface thereof to be opposed to the first assembly 73 are a pair of positive and negative electrodes 741, 741 to be brought into contact with the pair of electrodes 731, 731 of the first assembly 73.

Figure 27:
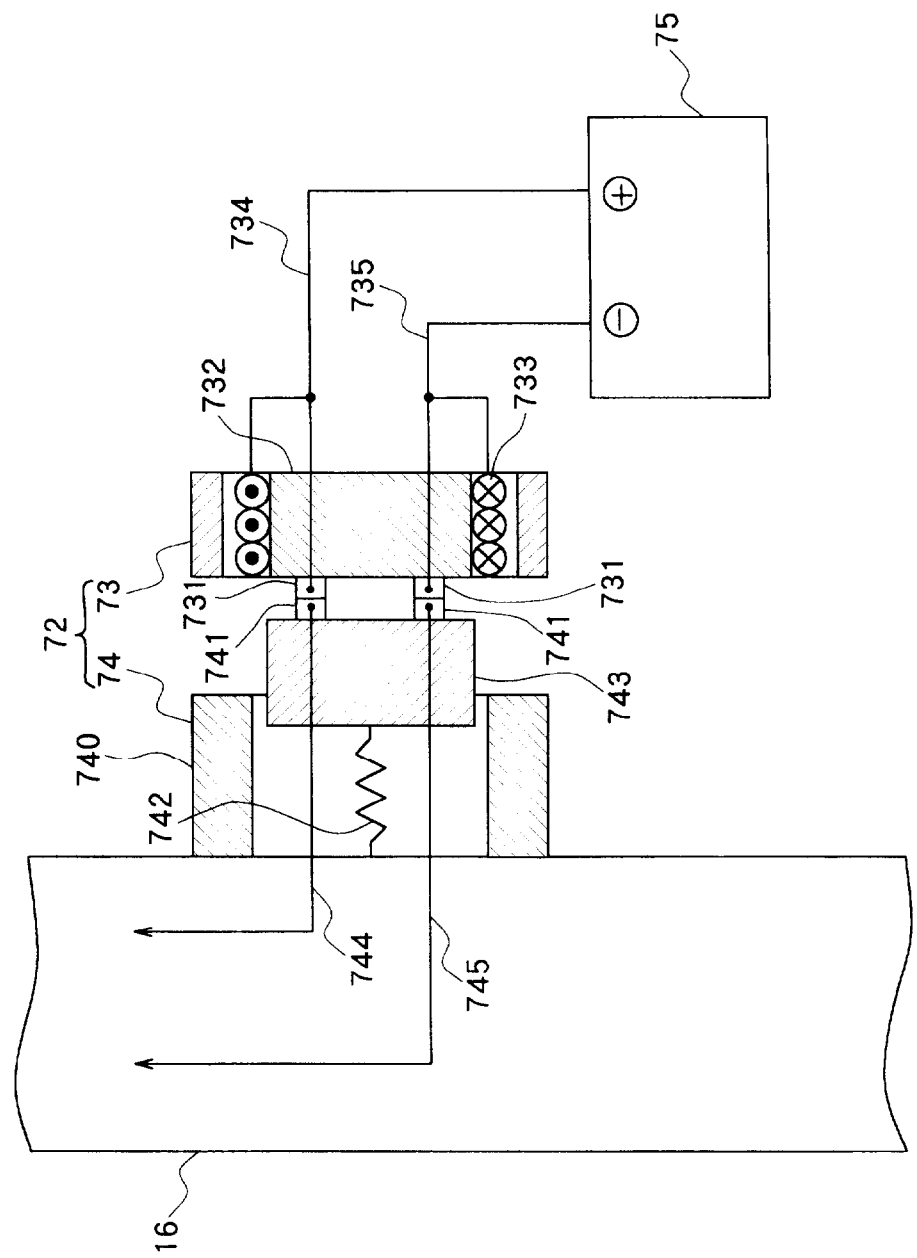
FIG. 27 is an enlarged diagram partly broken away and showing the system in charging operation.

With reference to FIG. 27, a positive wire 734 and a negative wire 735 extending from the rectifying unit 75 are connected to opposite ends of the coil 733 of the first assembly 73 and to the pair of positive and negative electrodes 731, 731. The pair of positive and negative electrodes 741, 741 of the second assembly 74 are connected to the battery by a positive wire 744 and a negative wire 745.

As shown in FIGS. 25 and 26, the primary charging device 4 comprises a primary coil unit 35 and a charging circuit (not shown) which are housed in a casing 440. The coil unit 35 is positioned at a level where the unit 35 is opposed to the secondary coil unit 55 on the pedal 100 when the crank 10 is positioned in parallel to the chain stay 16. The primary coil unit 35 comprises a primary coil 352 provided around a barlike iron core 351. The end face of the core 351 to be opposed to the secondary coil unit 55 is exposed from the casing 440 to the outside.

When the battery 20 is to be charged by the system of the present embodiment, the bicycle body 1 is advanced to bring the pedal 100 close to the primary charging unit 4, whereupon the advancing bicycle body 1 is halted. The crank 10 is then positioned by rotation in parallel to the chain stay 16 to oppose the first assembly 73 to the second assembly 74. The secondary coil unit 55 provided on the pedal 100 is further opposed to the primary coil unit 35.

The alternating current available from the commercial power source is converted to a high-frequency current by the charging circuit and then supplied to the primary coil unit 35. This causes the primary coil 352 of the primary coil unit 35 to generate lines of magnetic force, which penetrate through the secondary coil 552 of the secondary coil unit 55 to electromagetically couple the primary and secondary coils 352, 552 to each other.

Consequently, the secondary coil unit 55 affords a high-frequency current, which is then supplied to the rectifying unit 75 and rectified, and thereafter supplied to the coil 733 of the first assembly 73 through the positive wire and negative wire 735. The current causes the coil 733 to produce lines of magnetic force, which magnetize the iron core 732 to provide an electromagnet.

As a result, the iron piece 743 of the second assembly 74 is attracted to the iron core 732 of the first assembly, projecting toward the first assembly 73 against the spring 742 as shown in FIG. 27 and bringing the electrodes 741, 741 of the second assembly 74 into contact with the electrodes 731, 731 of the first assembly 73. This forms a current supply channel from the rectifying unit 75 to the battery to charge the battery.

With the eighth to thirteenth embodiments to be described below, the rear wheel 12b of a bicycle having an electric motor is provided with a stand 18 for supporting the body 1 of the bicycle 1 in an upright position, and the stand 18 comprises a leg 18a extending obliquely downward in the support state, and a ground contact portion 18b to be brought into contact with the ground in the support state.

Eighth to thirteenth embodiments have characteristics in the configuration of the casing of the primary charging device 4 and in the position where the secondary charging device 6 is mounted.

Eighth Embodiment

Figure 28:
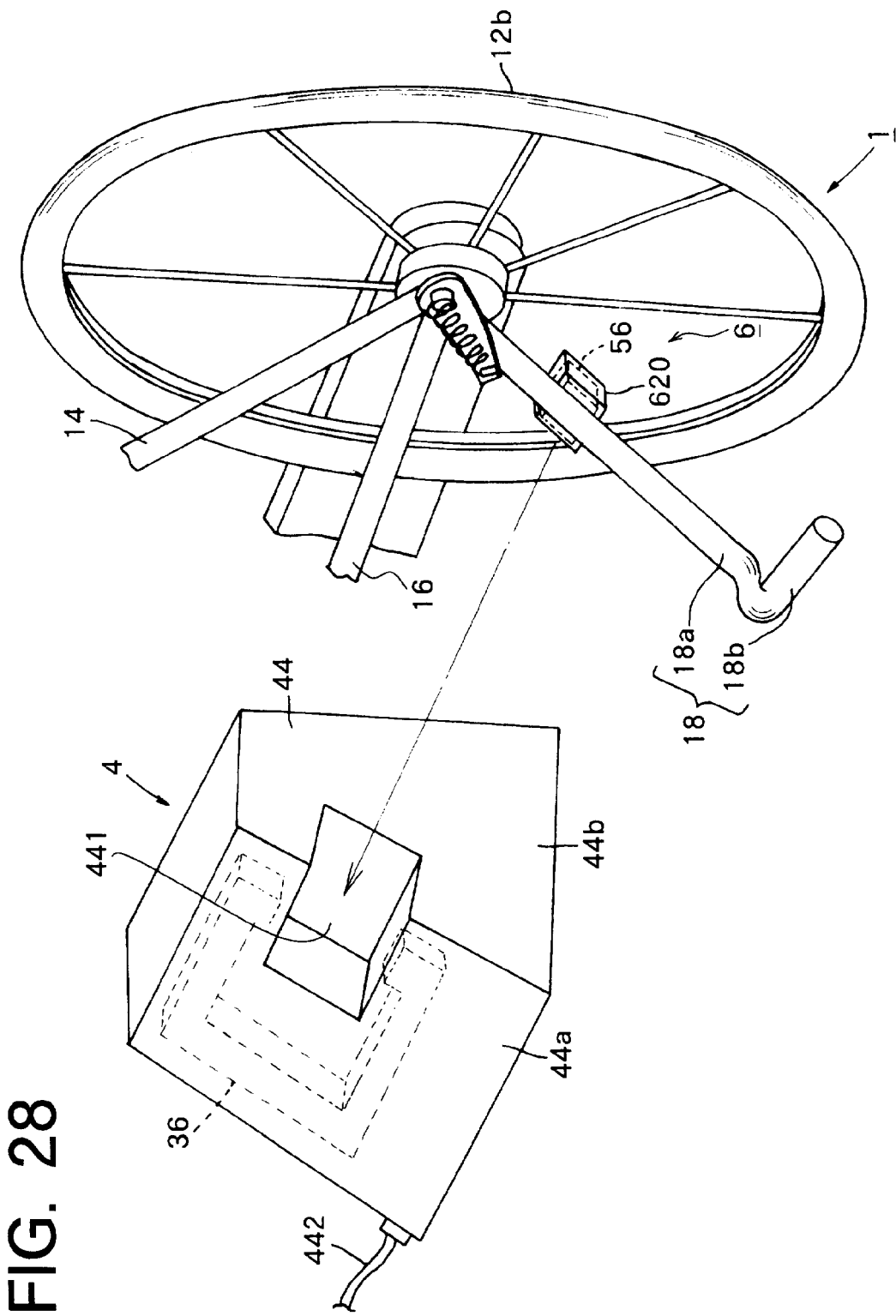
FIG. 28 is a perspective view showing the overall construction of an eighth embodiment of battery charging system for a bicycle equipped with an electric motor.
Figure 29:
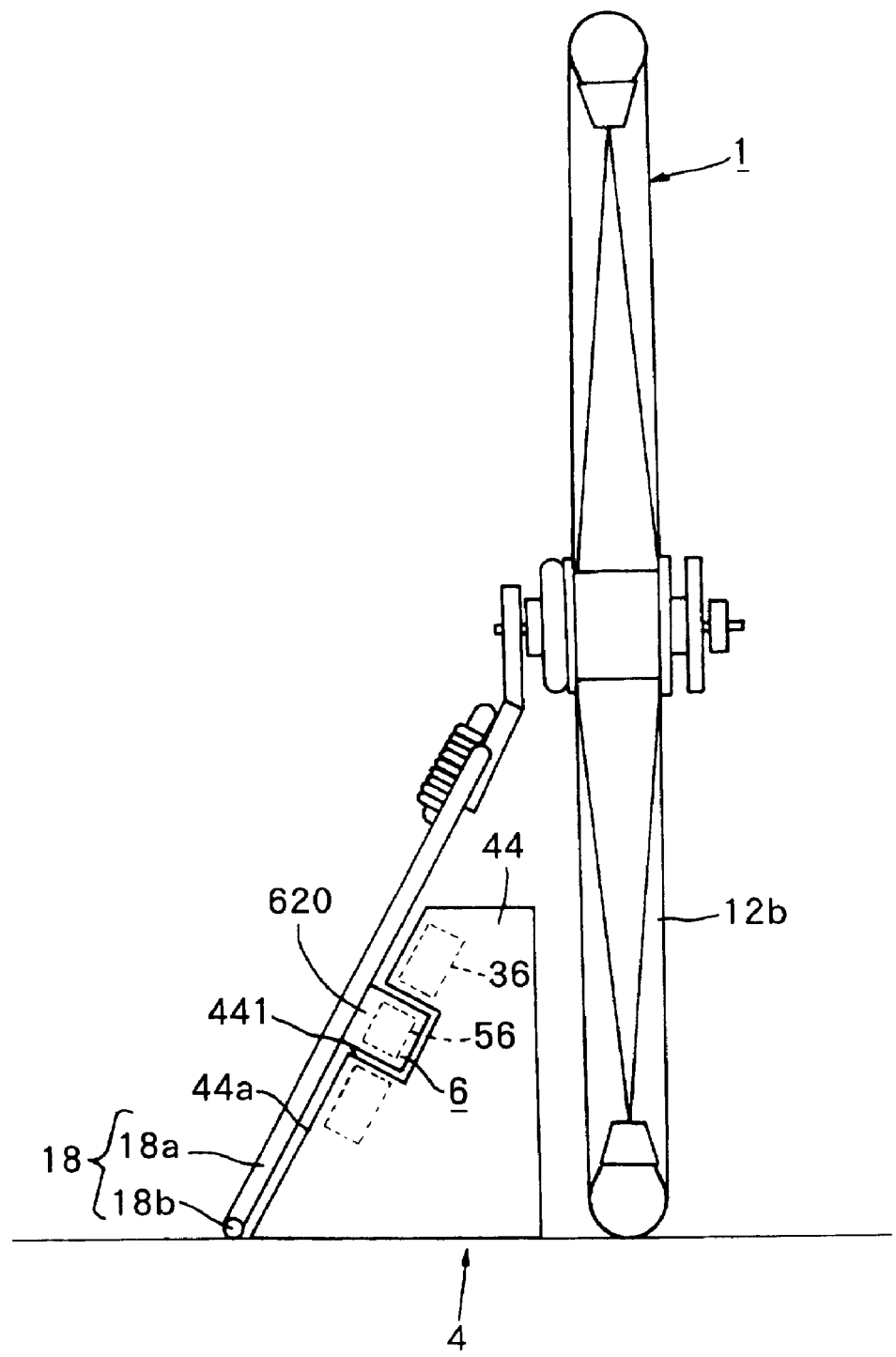
FIG. 29 is a rear view partly broken away and showing the system in charging operation as it is seen from the behind.

With reference to FIGS. 28 and 29, the secondary charging device of this embodiment comprises, as housed in a casing 620, a secondary coil unit 56 and a secondary charging circuit (not shown) comprising a rectifying circuit, and is mounted on an intermediate portion of leg 18a of the stand 18, the device facing toward the rear wheel 12b of the bicycle body 1.

Figure 30:
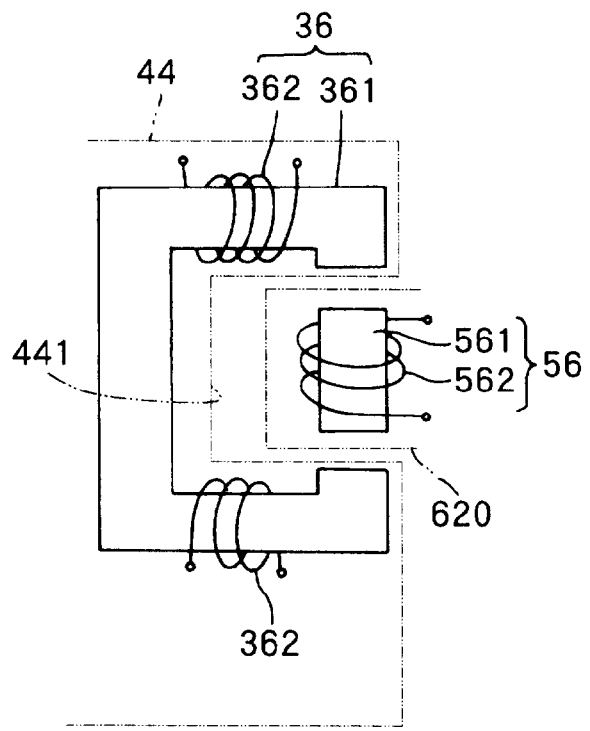
FIG. 30 is a diagram of a primary coil unit and a secondary coil unit included in the system.

The secondary coil unit 56 is connected to the battery 20 by a cable (not shown) extending along the leg 18a of the stand 18 and the chain stay 16. As seen in FIG. 30, the coil unit 56 comprises a secondary coil 562 provided around a barlike iron core 561.

On the other hand, the primary charging device 4 comprises, as housed in a casing 44, a primary coil unit 36 and a primary charging circuit (not shown) comprising a switching circuit as seen in FIGS. 28 and 29. Extending from the casing 44 is a power source cord 442 connectable to a receptacle of the commercial power source. The switching circuit has a switching frequency of 100 kHz.

The left side face of the casing 44 is in the form of a slope 44a having substantially the same inclination as the leg 18a in the support state. The slope 44a is formed with a recessed portion 441 for accommodating the secondary charging device 6. The recessed portion 441 has an opening in both the rear face 44b and slope 44a of the casing 44.

With reference to FIG. 30, the primary coil unit 36 comprises primary coils 362, 362 provided around a C-shaped iron core 361, and is housed in the casing 44, as disposed at the front side of the recessed portion 441 to surround this portion and positioned in parallel to the slope 44a.

When the battery 20 on the bicycle body 1 is to be charged by the system of the present embodiment, the bicycle body 1 is advanced to move the secondary charging device 6 from behind the rear face 44b of casing 44 of the primary charging device 4 toward the recessed portion 441. When the bicycle body 1 is further advanced, the leg 18a of the stand 18 moves forward along the slope 44a, while the secondary charging device 6 moves forward within the recessed portion 441 and is placed in position inside the recessed portion 441, whereby the secondary coil 562 of the secondary coil unit 56 is brought to a predetermined position in proximity to the primary coils 362 of the primary coil unit 36. In this state, a high-frequency current flows through the primary coils 362, causing the coils 362 to generate lines of magnetic force, which in turn penetrate through the secondary coil 562, electromagnetically coupling the primary coils 362 to the secondary coil 562. Consequently, the secondary coil 562 affords a high-frequency current. The current is converted to a direct current by the secondary charging circuit and then supplied to the battery 20 to charge the battery 20.

Ninth Embodiment

Figure 31:
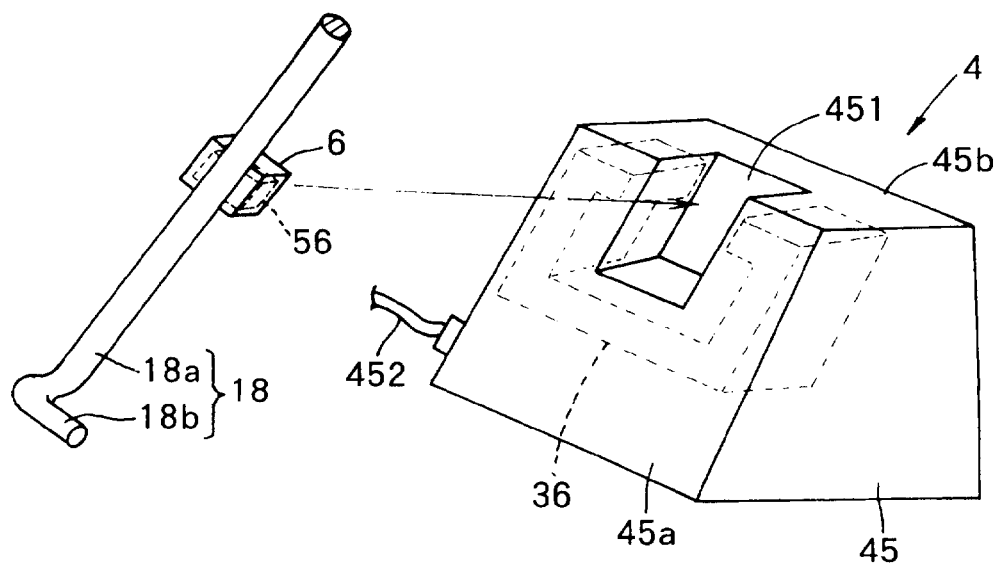
FIG. 31 is a perspective view showing the overall construction of a ninth embodiment of battery charging system for a bicycle equipped with an electric motor.
Figure 32:
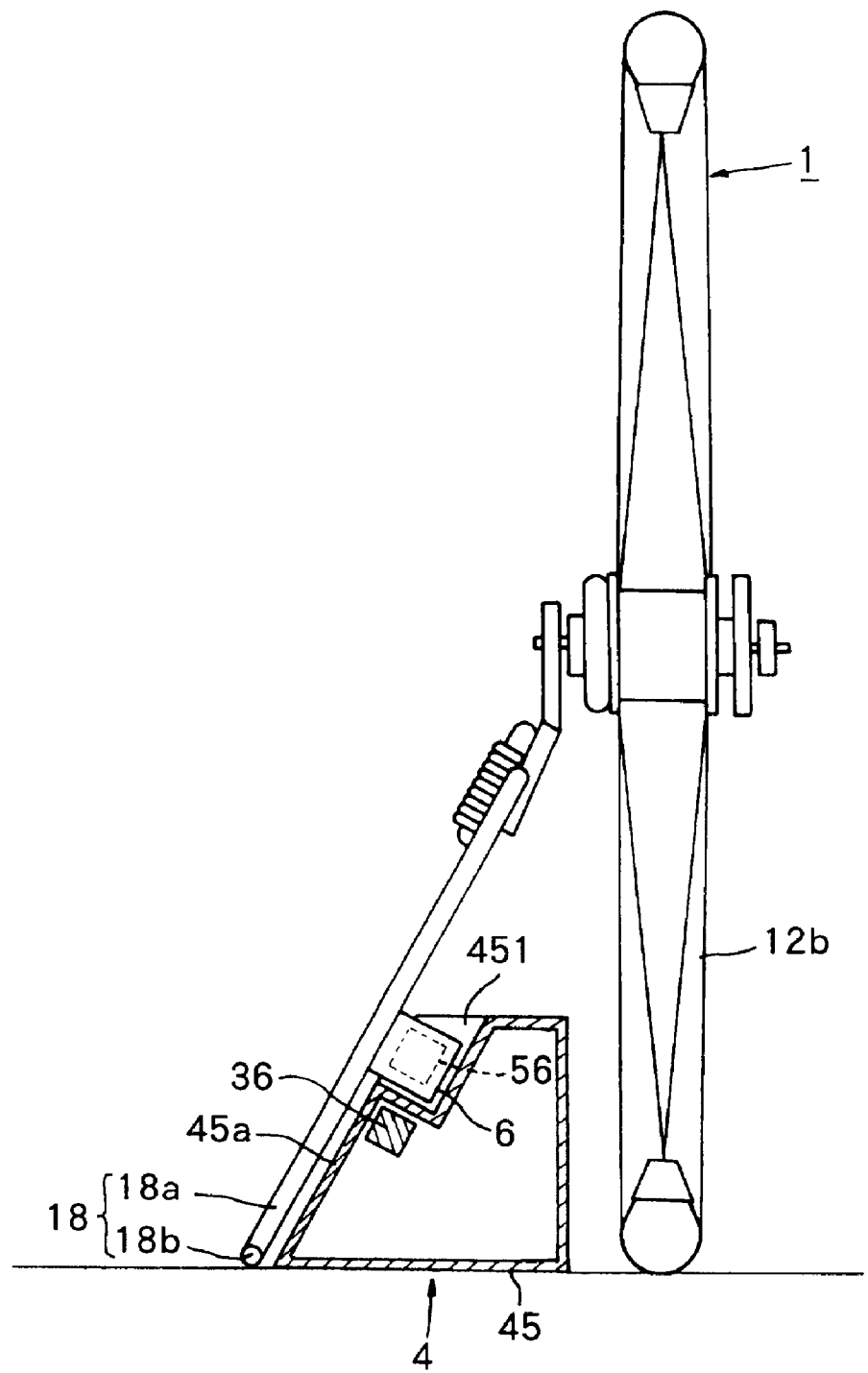
FIG. 32 is a rear view partly broken away and showing the system in charging operation as it is seen from the behind.

With reference to FIGS. 31 and 32, the secondary charging device 6 of the present embodiment is opposed to the rear wheel 12b of the bicycle body 1 and attached to an intermediate portion of a leg 18a of the stand 18, and has the same construction as the secondary charging device of the first embodiment shown in FIG. 30.

On the other hand, the primary charging device 4 comprises a primary coil unit 36 and primary charging circuit (not shown) which are housed in a casing 45 as shown in FIGS. 31 and 32 and are identical in construction with those of the eighth embodiment described. Extending from the casing 45 is a power source cord 452 connectable to a receptacle of the commercial power source.

The left side face of the casing 45 is in the form of a slope 45a having substantially the same inclination as the leg 18a of the stand 18 in the support state. The slope 45a is formed with a recessed portion 451 for accommodating the secondary charging device 6. The recessed portion 451 has an opening in both the slope 45a and upper face 45b of the casing 45.

The primary coil unit 36 is housed in the casing 45, surrounding the recessed portion 451 from below, as positioned in parallel to the slope 45a.

When the battery 20 of the bicycle body 1 is to be charged by the system of this embodiment, the bicycle body 1 is advanced, with the primary charging device 4 positioned between the rear wheel 12b and the stand 18. With this movement, the leg 18a of the stand 18 moves forward along the slope 45a, and the secondary charging device 6 moves forward. The advancing bicycle body 1 is halted when the device 6 is brought to a position opposed to the recessed portion 451 of the casing 45 of the primary charging device 4. The bicycle body 1 is then moved rightward to place the secondary charging device 6 into the recessed portion 451 from the slope (45a) side. As a result, the battery 20 can be charged.

Tenth Embodiment

Figure 33:
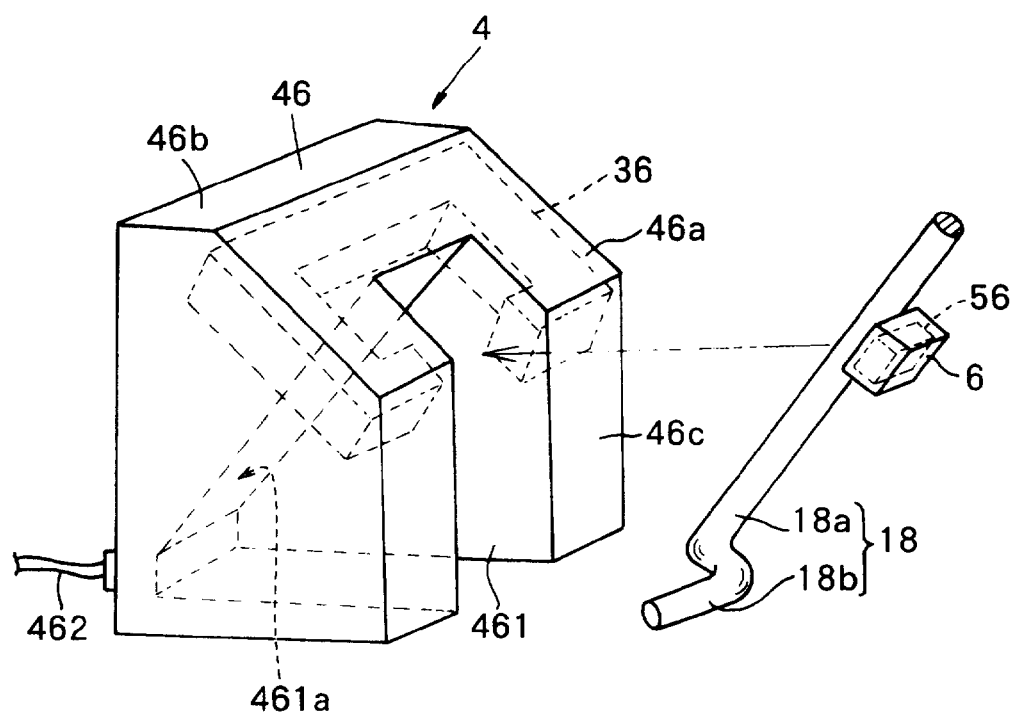
FIG. 33 is a perspective view showing the overall construction of a tenth embodiment of battery charging system for a bicycle equipped with an electric motor.
Figure 34:
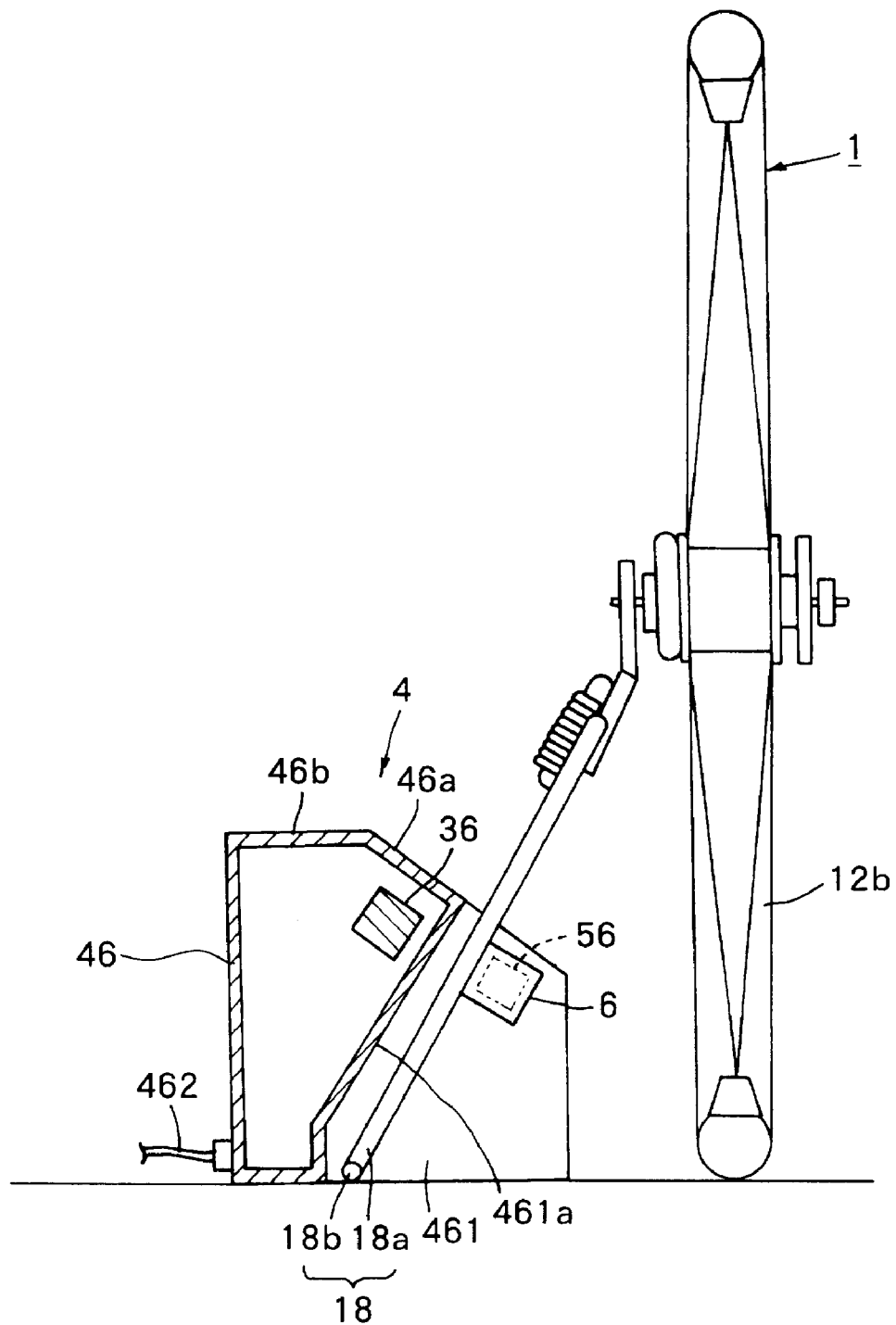
FIG. 34 is a rear view partly broken away and showing the system in charging operation as it is seen from the behind.

With reference to FIGS. 33 and 34, the secondary charging device 6 of the present embodiment is opposed to the rear wheel 12b of the bicycle body 1 and attached to an intermediate portion of a leg 18a of the stand 18, and has the same construction as the secondary charging device of the eighth embodiment shown in FIG. 30.

On the other hand, the primary charging device 4 comprises a primary coil unit 36 and a primary charging circuit (not shown) which are housed in a casing 46 as shown in FIGS. 33 and 34 and are identical in construction with those of the eighth embodiment described. Extending from the casing 46 is a power source cord 462 connectable to a receptacle of the commercial power source.

The casing 46 has a slope 46a extending from an upper face 46b to a right side face 46c. A recessed portion 461 for accommodating the stand 18 is formed in both the slope 46a and the right side face 46c. The recessed portion 461 has a slanting face 461a with approximately the same inclination as the leg 18a of the stared 18 in the support state.

The primary coil unit 36 housed in the casing 461 is positioned at the left of the recessed portion 461 to surround this portion from above downward and is in parallel to the slope 46a.

When the battery 20 of the bicycle body 1 is to be charged by the system of this embodiment, the bicycle body 1 is advanced at the right side of the primary charging device 4. With this movement, the leg 18a of the stand 18 moves forward, and the secondary charging device 6 moves forward. The advancing bicycle body 1 is halted when the secondary charging device 6 is brought to a position opposed to the recessed portion 461 of the casing 46 of the primary charging device 4. The bicycle body 1 is then shifted leftward to place the stand 18 and the device 6 into the recessed portion 461 from the right side 46c of the casing 46. The leg 18a of the stand 18 is placed in as positioned along the slanting face 461a of the recessed portion 461. As a result, the battery 20 can be charged.

Eleventh Embodiment

Figure 35:
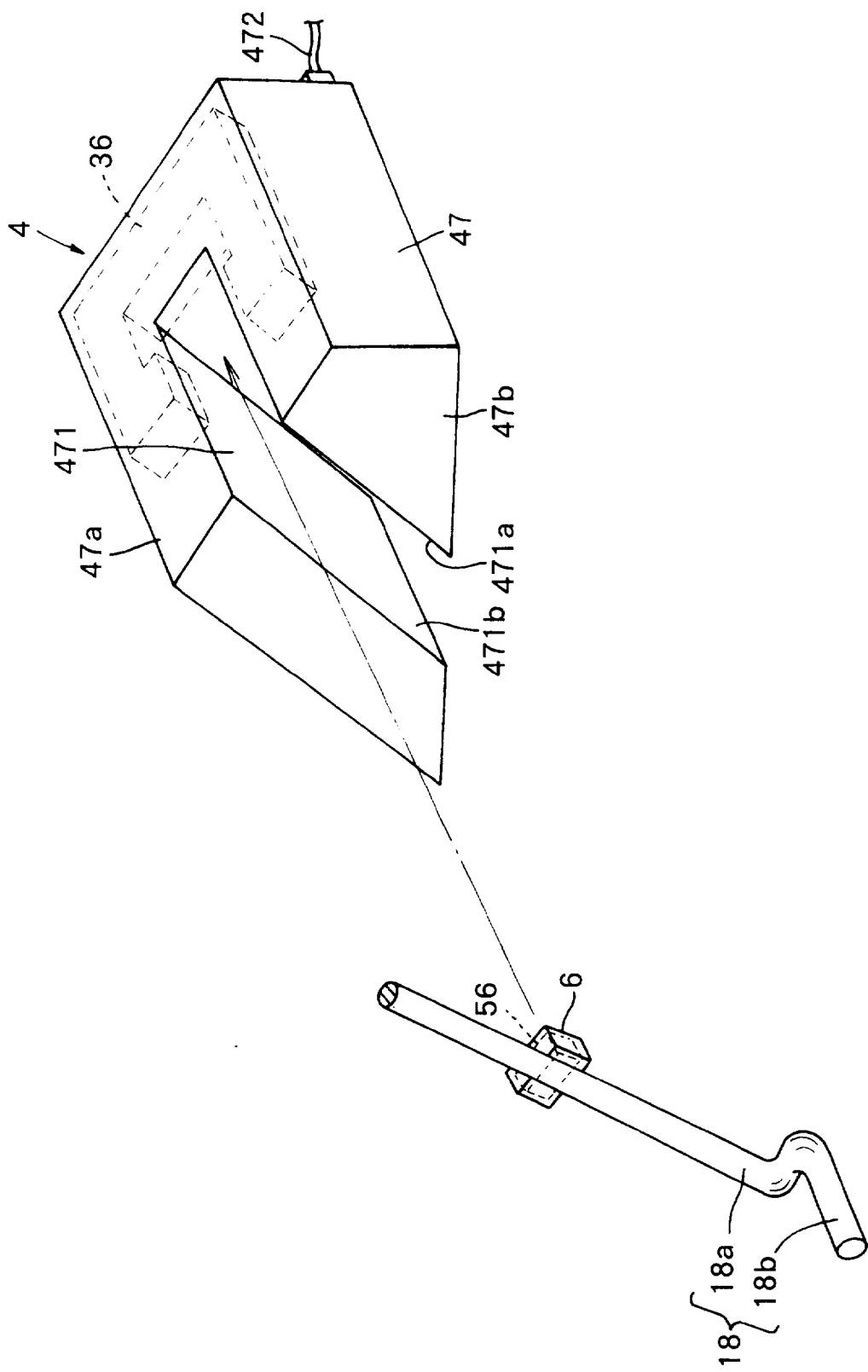
FIG. 35 is a perspective view showing the overall construction of an eleventh embodiment of battery charging system for a bicycle equipped with an electric motor.
Figure 36:
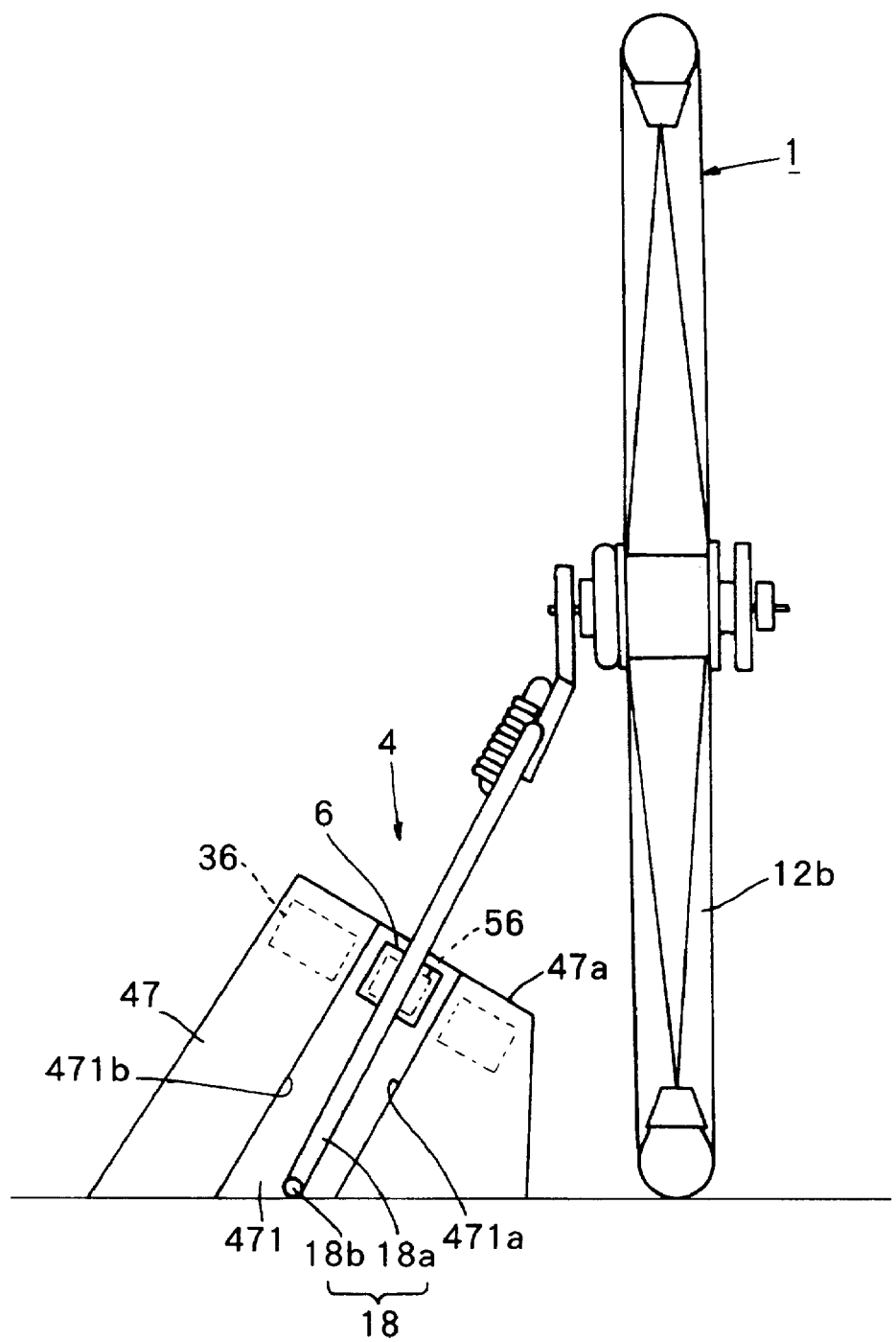
FIG. 36 is a rear view partly broken away and showing the system in charging operation as it is seen from the behind.

With reference to FIGS. 35 and 36, the secondary charging device 6 of the present embodiment faces toward the front of the bicycle body 1, is attached to an intermediate portion of a leg 18a of the stand 18, and has the same construction as the secondary charging device of the eighth embodiment shown in FIG. 30.

On the other hand, the primary charging device 4 comprises a primary coil unit 36 and a primary charging circuit (not shown) which are housed in a casing 47 as shown in FIGS. 35 and 36 and are identical in construction with those of the eighth embodiment described. Extending from the casing 47 is a power source cord 472 connectable to a receptacle of the commercial power source.

The casing 47 has an upper face in the form of a slope 47a slanting rightward to a lower level. The casing 47 has a rear face 47b formed with a recessed portion 471 extending forward for accommodating the stand 18. The recessed portion 471 has an opening in both the slope 47a and the rear face 47b of the casing 47. The recessed portion 471 has a right slanting face 471a and a left slanting face 471b with substantially the same inclination as the leg 18a of the stand 18 in the support state.

The primary coil unit 36 housed in the casing 47 surrounds the recessed portion 471 from the front side thereof and is positioned in parallel to the slope 47a.

When the battery 20 on the bicycle body 1 is to be charged by the system of this embodiment, the bicycle body 1 is advanced to move the stand 18 and the secondary charging device 6 from behind the rear face 47b of the casing 47 of the primary charging device 4 toward the recessed portion 471. When the bicycle body 1 is further advanced, the leg 18a of the stand 18 moves forward along the right slanting face 471a and the left slanting face 471b of the recessed portion 471, and the secondary charging device 6 moves forward within the recessed portion 471 and is placed in position as shown in FIG. 36. Consequently, the battery 20 can be charged.

Twelfth Embodiment

Figure 37:
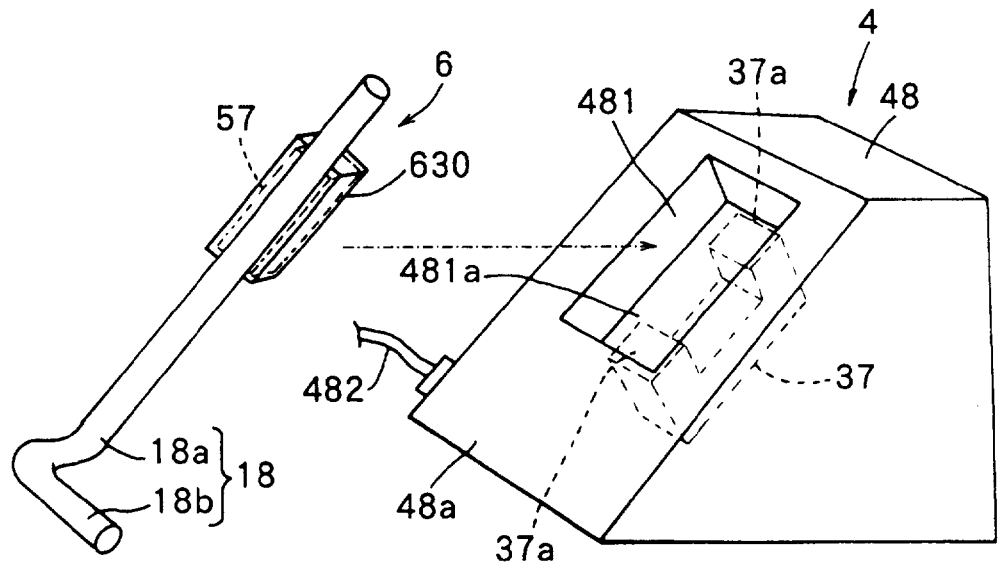
FIG. 37 is a perspective view showing the overall construction of a twelfth embodiment of battery charging system for a bicycle equipped with an electric motor.
Figure 39:
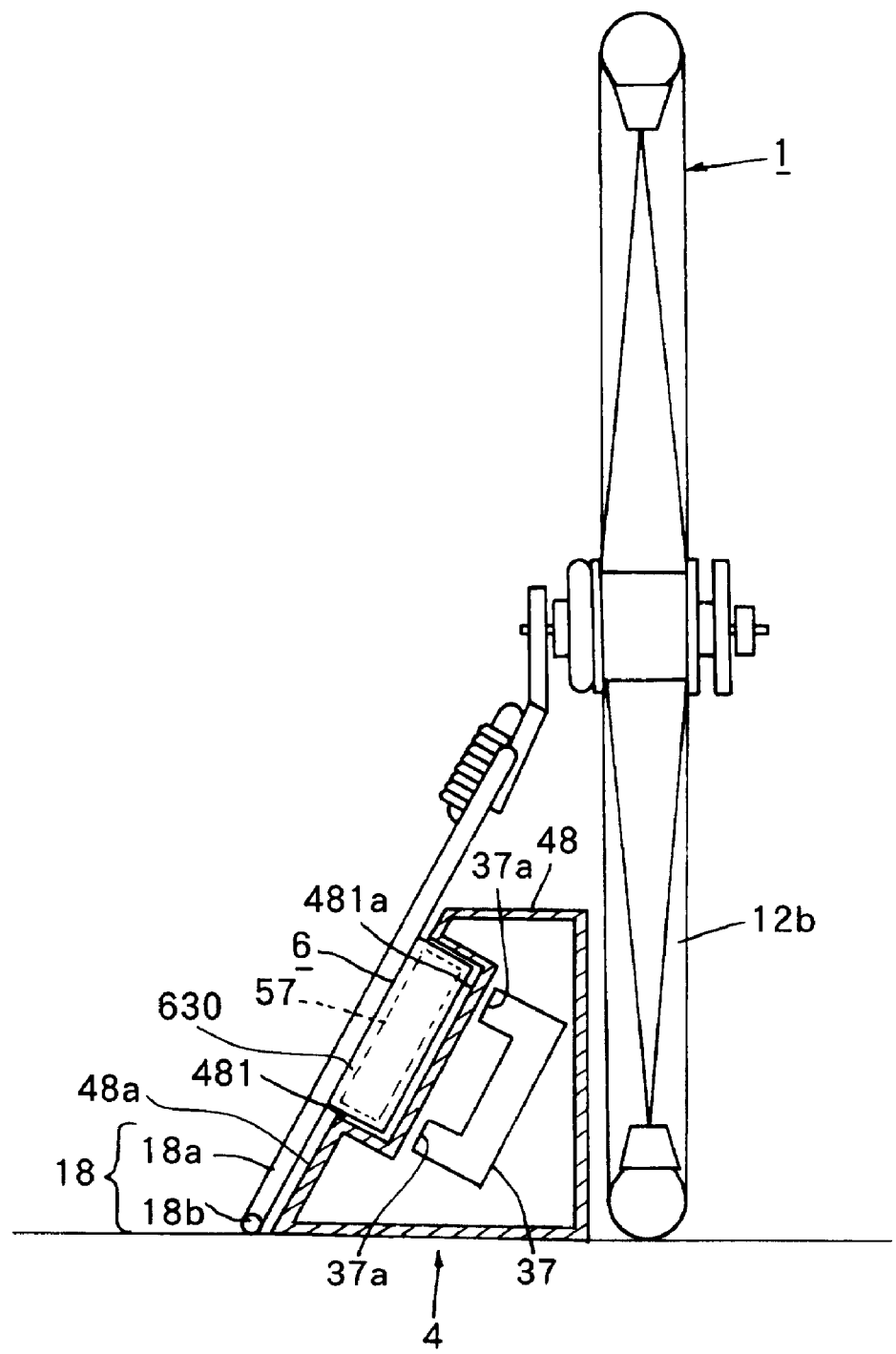
FIG. 39 is a rear view partly broken away and showing the system in charging operation as it is seen from the behind.

With reference to FIGS. 37 and 39, the secondary charging device 6 of the present embodiment faces the rear wheel 12b of the bicycle body 1 and is attached to an intermediate portion of a leg 18a of the stand 18.

Figure 38:
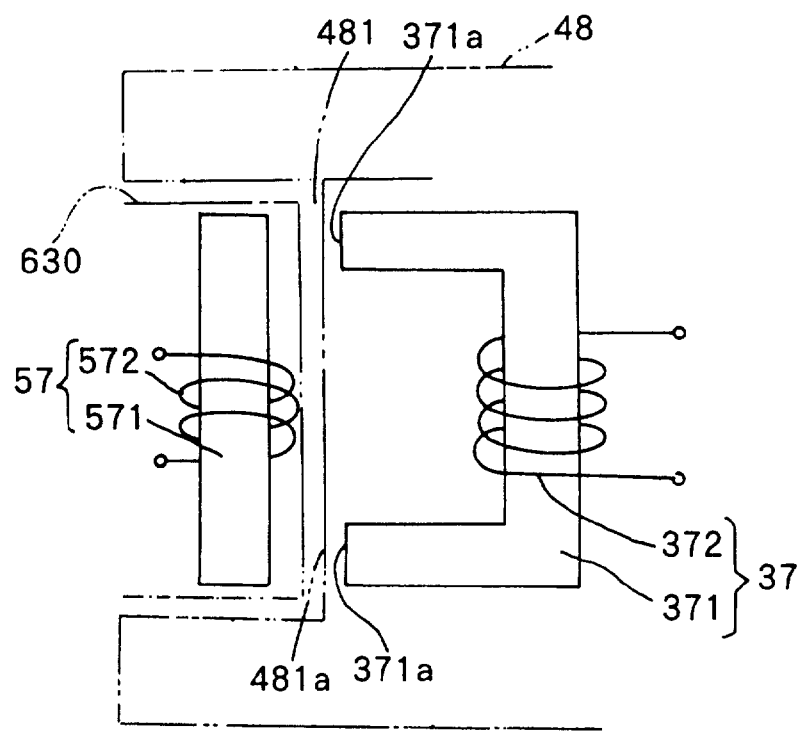
FIG. 38 is a diagram of a primary coil unit and a secondary coil unit included in the system.

The device 6 comprises a secondary coil unit 57 and a secondary charging circuit (not shown) which are housed in a casing 639. The coil unit 57 is connected to the battery 20 by a cable (not shown) extending along he leg 18a of the stand 18 and the chain stay 16. As seen in FIG. 38, the secondary coil unit 57 comprises a secondary coil 572 provided around a barlike iron core 571.

With reference to FIGS. 37 and 39, the primary charging device 4 comprises a primary coil unit 37 and a primary charging circuit (not shown) which are housed in a casing 48. Extending from the casing 48 is a power source cord 482 connectable to a receptacle of the commercial power source.

The casing 48 has a left side face in the form of a slope 48a with approximately the same inclination as the leg 18a of the stand 18 in the support state. The slope 48a is formed with a recessed portion 481 for accommodating the secondary charging device 6.

As seen in FIG. 38, the primary coil unit 37 comprises a primary coil 372 provided around a C-shaped iron core 371, and is housed in the casing 48, with the end faces 371a, 371a of the core 371 opposed to the bottom face 481a of the recessed portion 481.

When the battery 20 on the bicycle body 1 is to be charged by the system of this embodiment, the bicycle body 1 is advanced with the primary charging device 4 positioned between the rear wheel 12b and the stand 18. With this movement, the leg 18a of the stand 18 moves forward along the slope 48a of the casing 48 of the primary charging device 4, and the secondary charging device 6 moves forward. The advancing bicycle body 1 is halted when the secondary charging device 6 is brought to a position opposed to the recessed portion 481 of the casing 48. The bicycle body 1 is then shifted rightward to place the device 6 into the recessed portion 481 from the slope (48a) side of the casing 48 as seen in FIG. 39, whereby the secondary coil 572 of the secondary coil unit 57 is positioned in place in proximity to the primary coil 372 of the primary coil unit 37 as shown in FIG. 38. As a result, the battery 20 is charged.

Thirteenth Embodiment

Figure 40:
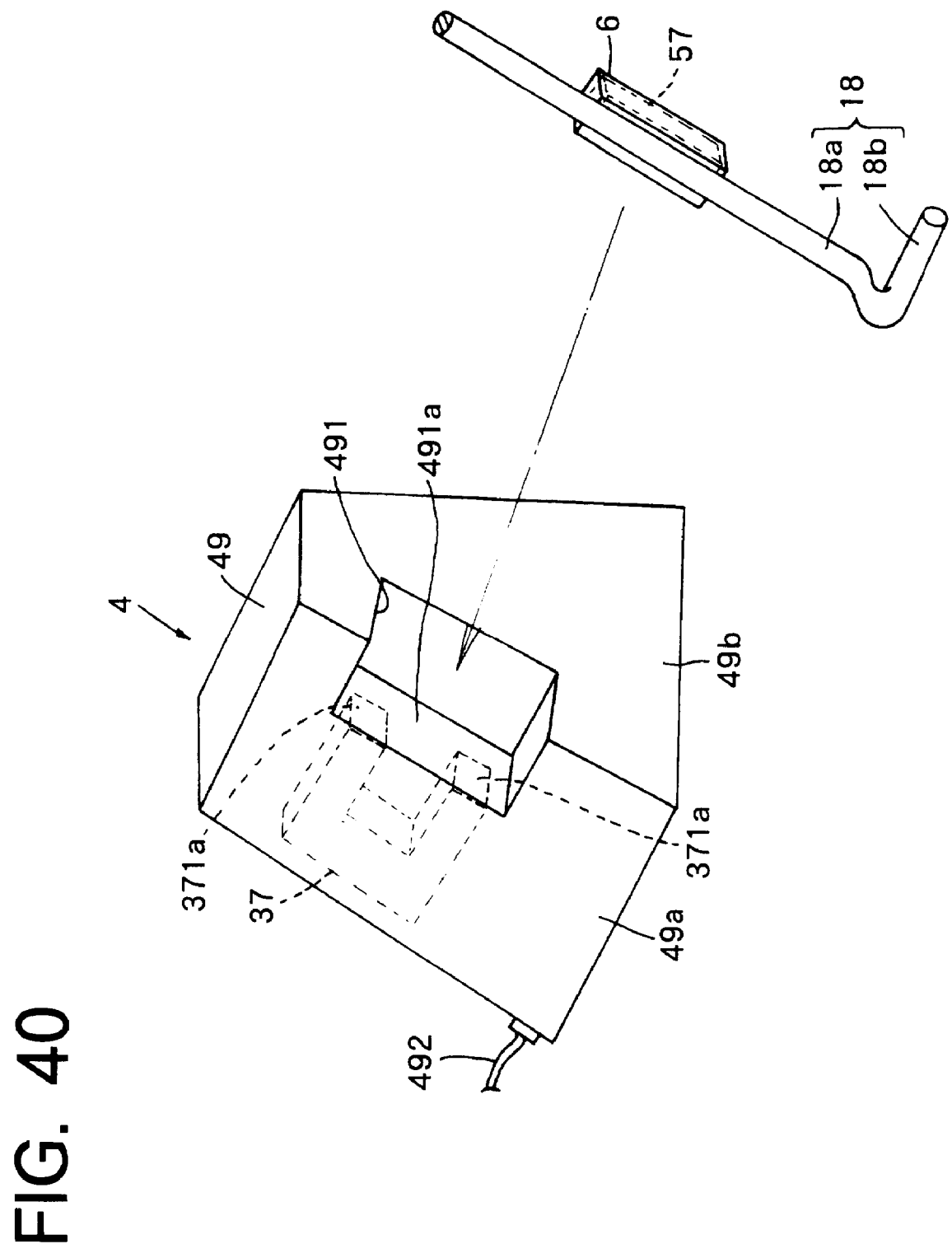
FIG. 40 is a perspective view showing the overall construction of a thirteenth embodiment of battery charging system for a bicycle equipped with an electric motor.
Figure 41:
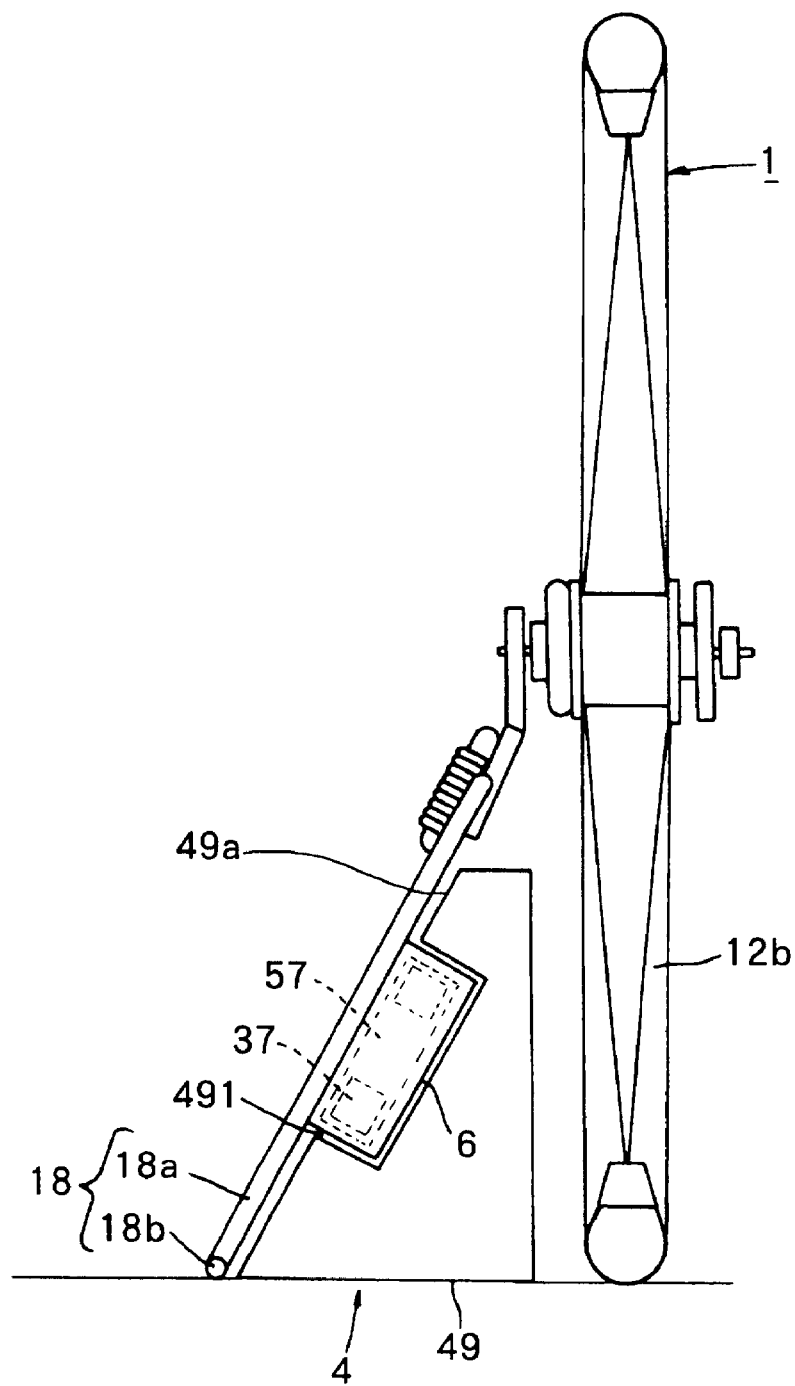
FIG. 41 is a rear view partly broken away and showing the system in charging operation as it is seen from the behind.

With reference to FIGS. 40 and 41, the secondary charging device 6 of the present embodiment faces the rear wheel 12b of the bicycle body 1 and is attached to an intermediate portion of a leg 18a of the stand 18.

On the other hand, the primary charging device 4 comprises a primary coil unit 37 and a primary charging circuit (not shown) which are housed in a casing 49 as shown in FIGS. 40 and 41 and are identical in construction with those of the twelfth embodiment described. Extending from the casing 49 is a power sources cord 492 connectable to a receptacle of the commercial power source.

The casing 49 has a left side face in the form of a slope 49a with approximately the same inclination as the leg 18a of the stand 18 in the support state. A recessed portion 491 for accommodating the secondary charging device 6 is formed in both the slope 49a and the rear face 49b.

The primary coil unit 37 is housed in the casing 49, with end faces 371a, 371a of an iron core 371 thereof opposed to a front face 491a of the recessed portion 491.

When the battery 20 on the bicycle body 1 is to be charged by the system of this embodiment, the bicycle body 1 is advanced to move the secondary charging device 6 from behind the rear face 49b of the casing 49 of the primary charging device 4 toward the recessed portion 491. When the bicycle body 1 is further advanced, the leg 18a of the stand 18 moves forward along the slope 49a, and the secondary charging device 6 moves forward within the recessed portion 491 and is placed in position within the recessed portion 491 as shown in FIG. 41. Consequently, the battery 20 can be charged.

The battery 20 can be charged by any of the charging systems according to the eighth to thirteenth embodiments merely by engaging the ground contact portion 18b of the stand 18 in the casing recessed portion of the primary charging device 4.

The secondary charging device 6 is attached the leg 18a of the stand 18 at an intermediate portion thereof and therefore unlikely to come into direct striking contact with the ground when the bicycle body 1 is supported by the stand 18, and the impact acting on the secondary charging device 6 is small. Accordingly, there is no need to provide special means for protecting the secondary charging device 6 from impact, rendering the device compact and lightweight.

When to ride the electrically assisted bicycle, the user kicks up a lower portion of the leg 18a of the stand 18 from the front side thereof rearward to position the stand leg 18a approximately horizontally. Since the secondary charging device 6 is attached to an intermediate portion of the leg 18a, it is unlikely that the user will kick the device 6 inadvertently.

Fourteenth Embodiment

Figure 42:
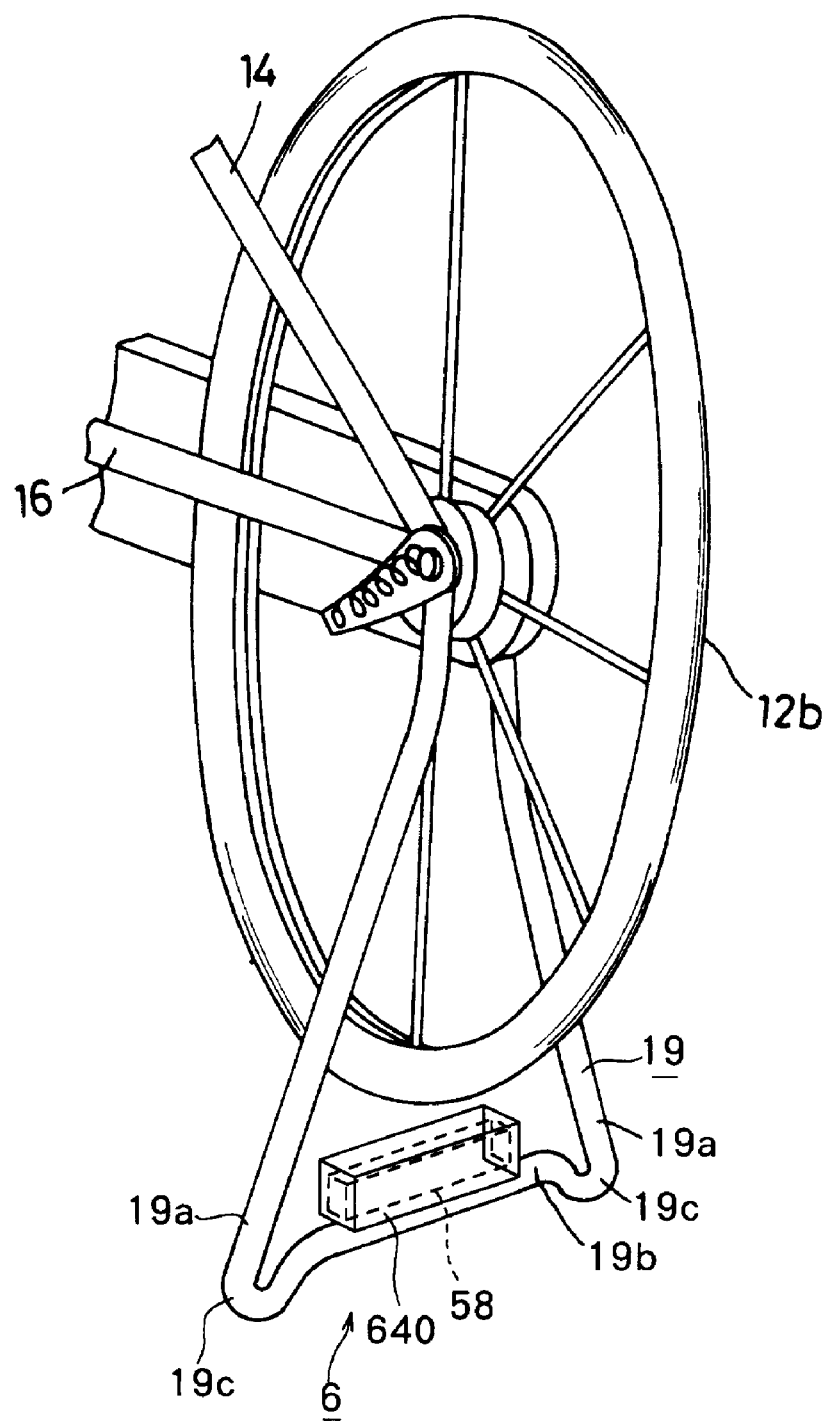
FIG. 42 is a perspective view showing a secondary charging device included in a fourteenth embodiment of battery charging system for a bicycle equipped with an electric motor.

With the charging system of the present embodiment, the rear wheel 12b of the electrically assisted bicycle shown in FIG. 42 is provided with a stand 19 for supporting the bicycle body 1 in an upright position. The stand 19 comprises a pair of left and right legs 19a, 19a extending obliquely downward in the support state, a horizontal portion 19b extending horizontally at a level away from the ground in the support state, and a pair of left and right ground contact portions 19c, 19c to be in contact with the ground in the support state. The two legs 19a, 19a are interconnected by the horizontal portion 19b and the two ground contact portions 19c, 19c.

Like the secondary charging device of the eighth embodiment, the secondary charging device 6 of this embodiment comprises, as housed in a casing 640, a secondary coil unit 58 and a secondary charging circuit (not shown) comprising a rectifying circuit. The device 6 is mounted on the upper side of the horizontal portion 19b of the stand 19 as shown in FIG. 42.

The secondary coil unit 58 is connected to the battery 20 by a cable (not shown) extending along the horizontal portion 19b, ground contact portion 19c and leg 19a of the stand 19, and the chain stay 16. The coil unit 58 comprises a secondary coil 582 provided around a barlike iron core 581 as seen in FIG. 44.

Figure 43:
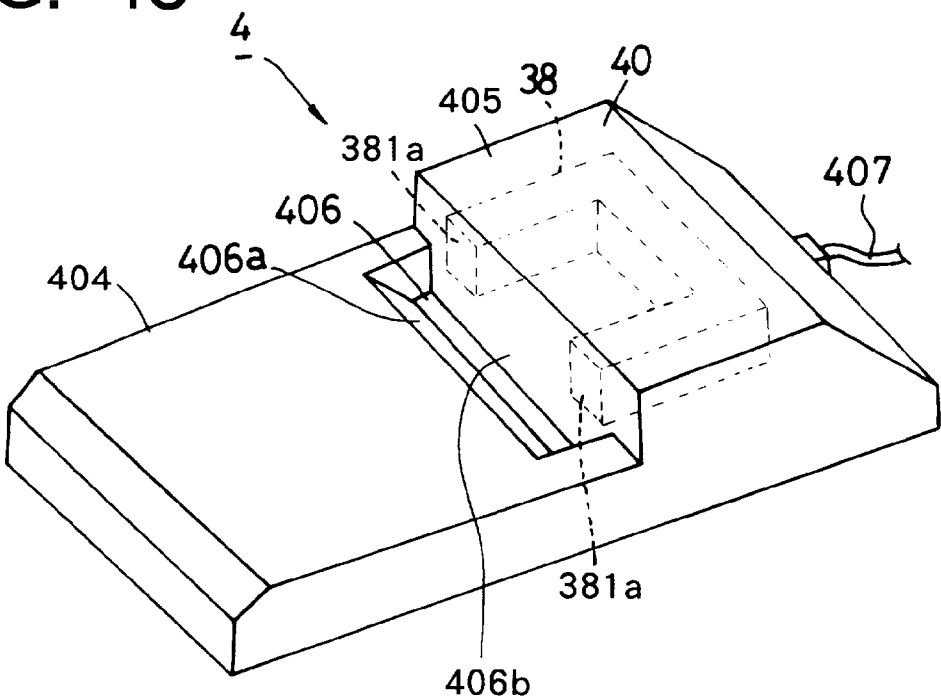
FIG. 43 is a perspective view showing a primary charging device included in the system.
Figure 45:
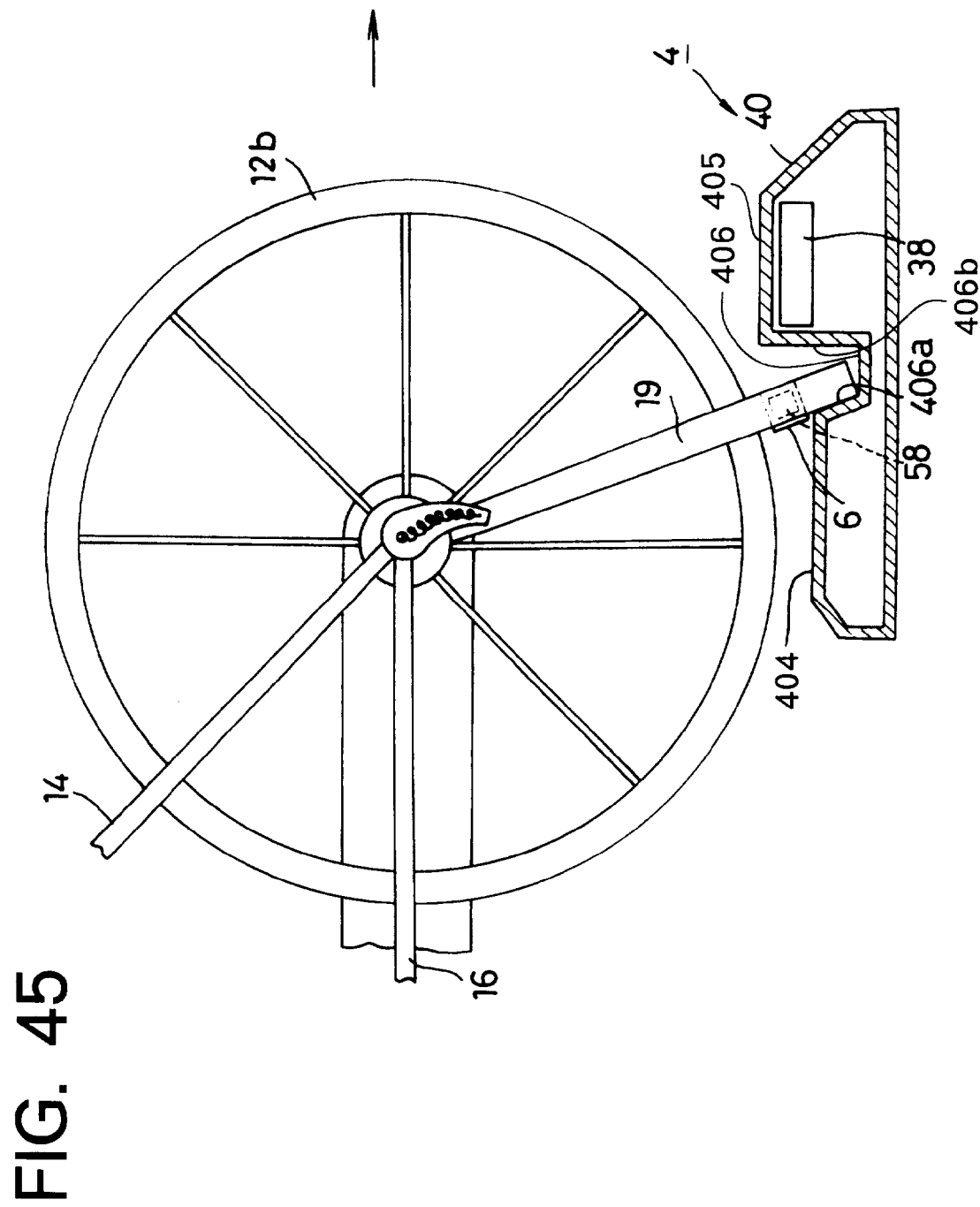
FIG. 45 is a side elevation for illustrating the engagement of a stand in a recessed portion of the primary charging device for charging.

With reference to FIGS. 43 and 45, the primary charging device 4 comprises, as housed in a casing 40, a primary coil unit 38, and a primary charging circuit (not shown) comprising a switching circuit. Extending from the casing 40 is a power source cord 407 connectable to a receptacle of the commercial power source.

The casing 40 has first and second horizontal surfaces 404, 405 which are different in level and arranged in front and rear, respectively, the first surface 404 being lower than the second surface 405. The first horizontal surface 404 is formed at its rear end with a recessed portion 406 for the lower end of the stand 19 to engage in. The recessed portion 406 has a slope 406a slanting rearward from the surface 404 to a lower level, and a vertical face 406b extending vertically downward from the second horizontal surface 405.

Figure 44:
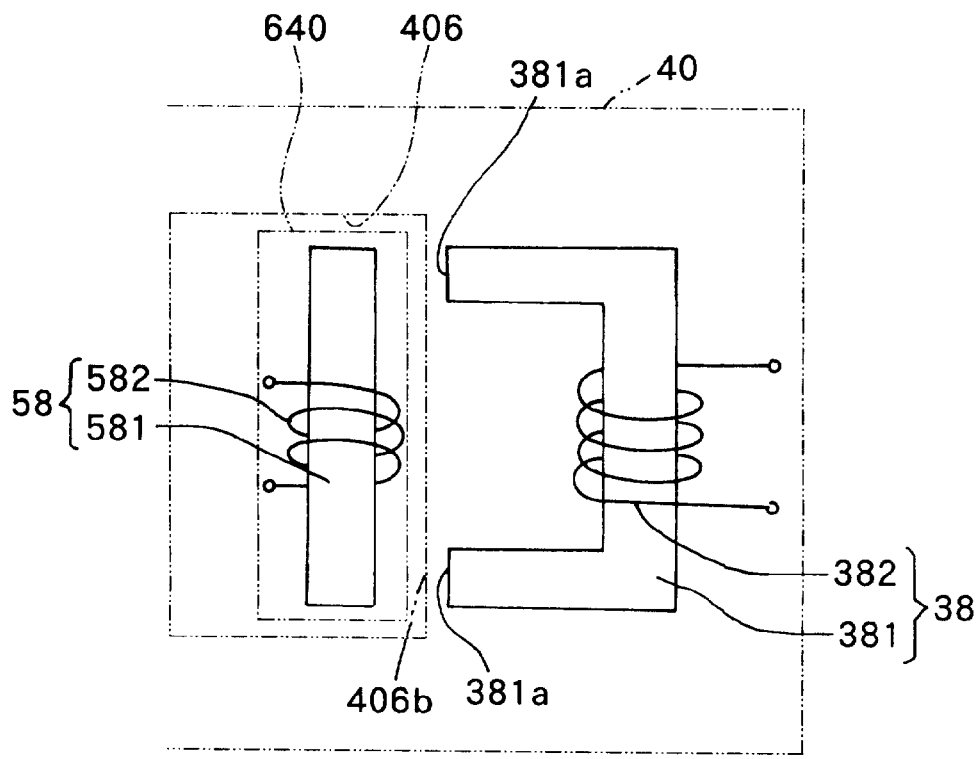
FIG. 44 is a diagram of a primary coil unit and a secondary coil unit included in the system.

As shown in FIG. 44, the primary coil unit 38 comprises a primary coil 382 provided around a C-shaped iron core 381, and is housed in the casing 40, with opposite end faces 381a, 381a of the core 381 opposed to the vertical face 406b of the recessed portion 406.

Figure 46:
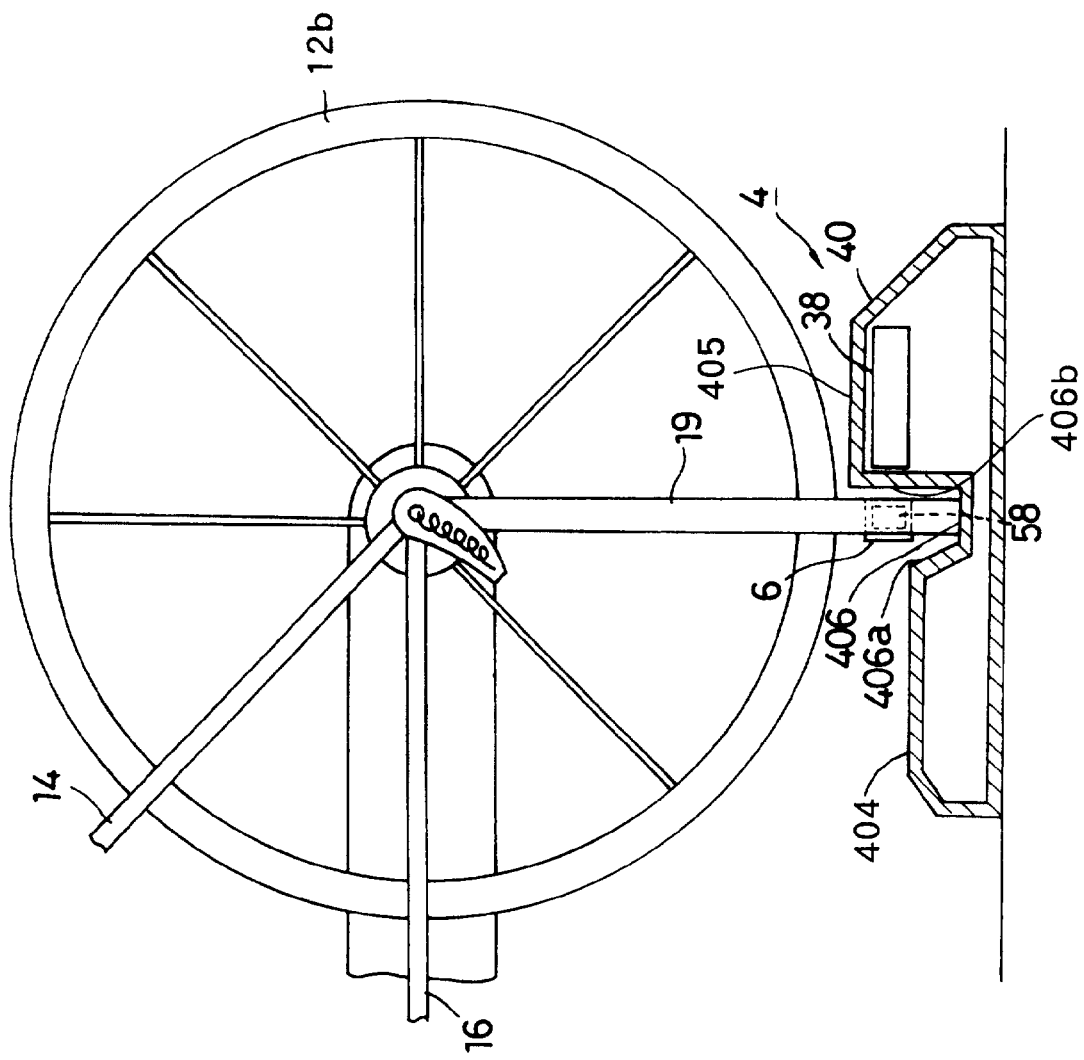
FIG. 46 is a side elevation showing the system in charging operation as it is seen from the left side.

When the battery 20 is to be charged by the system of the present embodiment, the bicycle body 1 with its rear wheel 12b positioned to the front of the primary charging device 4 is retracted while depressing the stand 19 to an inclined position at the same time to insert the lower end of the stand 19 into the recessed portion 406 of the device 4 as seen in FIG. 45. In this step, there is no likelihood that the secondary charging device 6 will come into contact with the casing 40 of the primary charging device 4. When the bicycle body 1 is further pulled rearwardly upward, the stand 19 is pivotally moved to a vertical position as seen in FIG. 46, with its lower end portion bearing on the vertical face 406b of the recessed portion 406, to support the bicycle body 1. In this state, the secondary coil unit 58 of the device 6 is positioned in place in proximity to the primary coil unit 38 of the device 4. Consequently, the primary coil unit 38 and the secondary coil unit 58 are electromagnetically coupled together, starting to charge the battery 20.

When the body 1 of the electrically assisted bicycle is pushed forward from the supported position shown in FIG. 46, the stand 19 is forced upward to a horizontal position by coming into contact with the slope 406a of the recessed portion 406. Accordingly there is no need to assist the stand 19 with the end of the foot in forcing up the stand.

The battery 20 can be charged by the system of the invention merely by engaging the lower end of the stand 19 in the recessed portion 406 of the casing 40 of the primary charging device 4.

The secondary charging device 6 is mounted on the upper side of the stand horizontal portion 19b and is therefore unlikely to come into direct striking contact with the ground when the bicycle body 1 is supported by the stand 19, and the impact acting on the device 6 is smell. The secondary charging device 6 can accordingly be made compact and lightweight.

According to the second to fourteenth embodiments, the primary charging device 4 can be provided with a light-emitting diode 402 which is turned on during charging as in the first embodiment.

Further as in the first embodiment, the secondary charging device 6 can be made selectively settable in one of the charging mode, stop mode and riding mode, with the bicycle body 1 equipped with a manual change-over switch for mode changes.

As in the first embodiment, it is possible to provide a magnet 61 on the secondary charging device 6 and a switch 401 in the primary charging device 4 which switch is turned on or off by the movement of the magnet toward or away from the switch.

Figure 47:
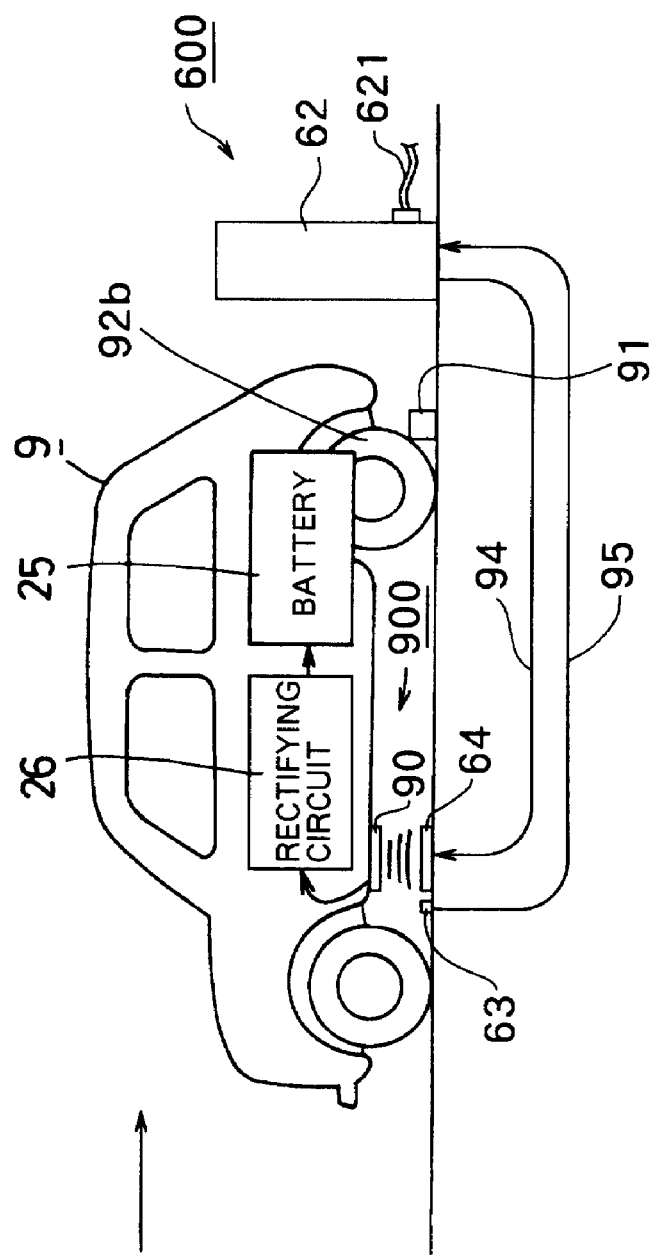
FIG. 47 is a diagram schematically showing the construction of a fifteenth embodiment of charging system for an electric motor vehicle.
Figure 48:
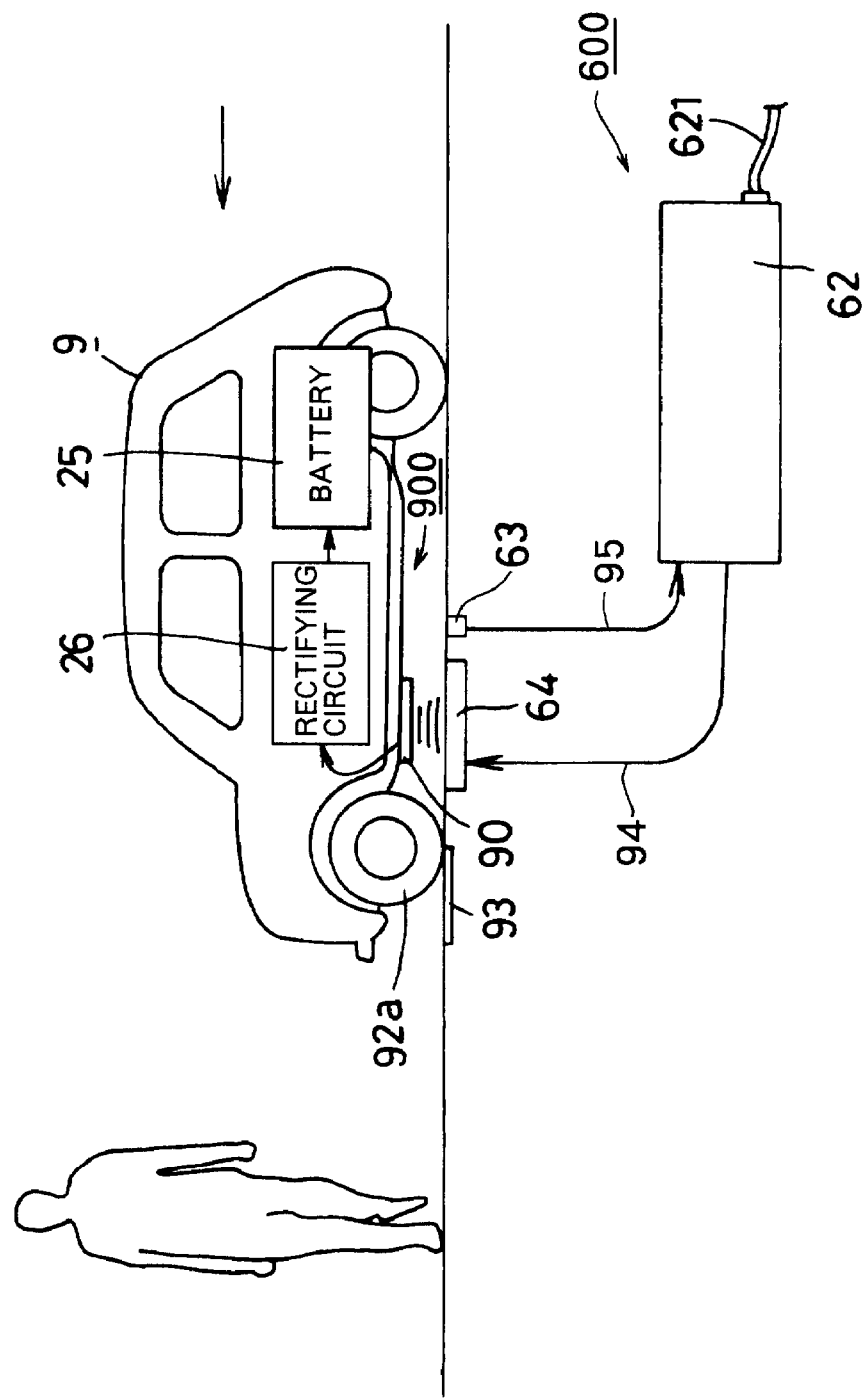
FIG. 48 is a diagram schematically showing the construction of a sixteenth embodiment of charging system for an electric motor vehicle.
Figure 49:
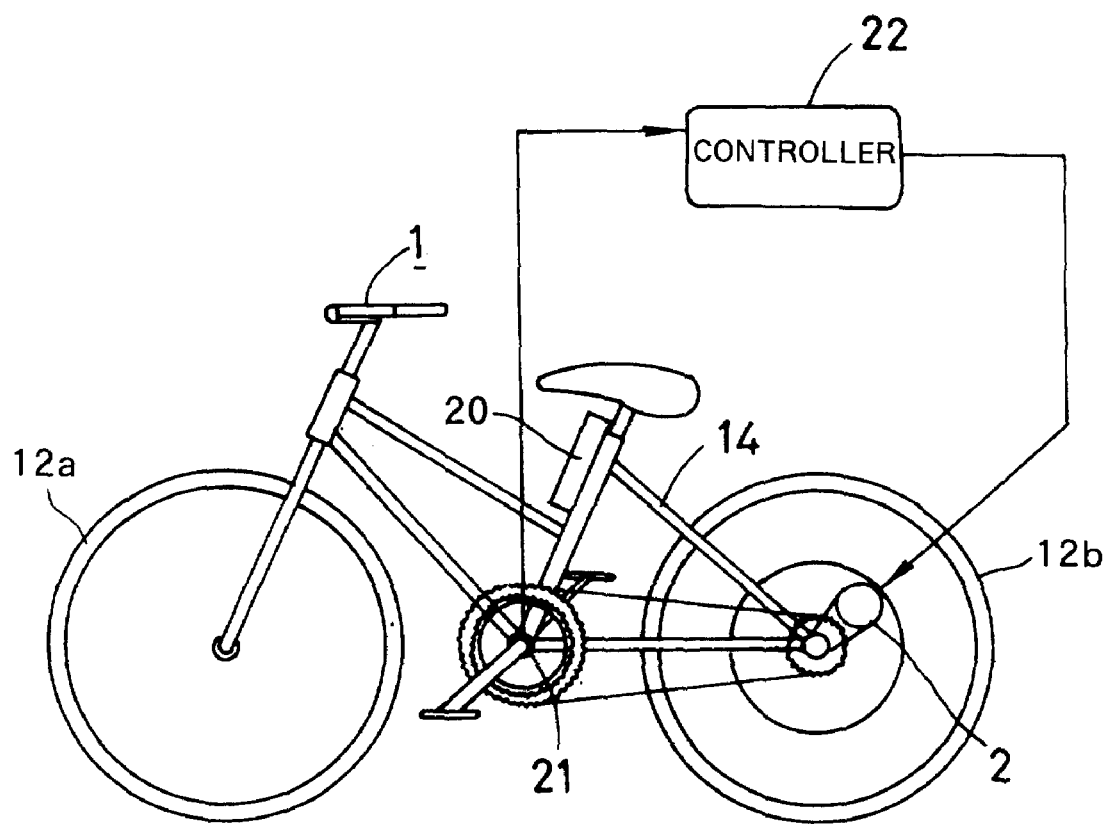
FIG. 49 is a diagram showing the overall construction of a conventional bicycle equipped with an electric motor.

The fifteenth and sixteenth embodiments to be described below are application of the present invention to electric motor vehicles. As shown in FIGS. 47 and 48, the body 9 of the motor vehicle carries a battery 25 serving as the power source for ene electric motor (not shown).

The charging system of these embodiments comprise a primary charging device 600 to be installed at a predetermined location, and a secondary charging device 900 to be mounted on the electric motor vehicle.

Fifteenth Embodiment

The secondary charging device 900 of this embodiment comprises a secondary coil unit 90 attached to the bottom of the body 9 of the motor vehicle as seen in FIG. 47. The coil unit 90 comprises a secondary coil provided around an iron core. The secondary coil unit 90 is connected to the battery 25 via a rectifying circuit 26 which is incorporated in the vehicle body 9. On the other hand, the primary charging device 600 comprises a charging unit 62 installed in a parking lot. The charging unit 62 has a charging circuit (not shown) incorporated therein. Extending from the charging unit 62 is a power source cord 621 connectable to a receptacle of the commercial power source.

A primary coil unit 64 is installed also in the parking lot. The coil unit 64 comprises a primary coil provided around an iron core, and is connected to the charging unit 62 by an underground cable 94.

Disposed in the vicinity of the primary coil unit 64 is a vehicle stop sensor 63 for detecting the electric motor vehicle as stopped at a specified parking position. The sensor 63 is connected to the charging unit 62 by an underground cable 95. A stop block 91 is provided at a position a predetermined distance rearwardly away from the primary coil unit 64. The secondary coil unit 90 is opposed to the primary coil unit 64, with the vehicle stopped by the contact of the rear wheels 92b thereof with the stop block 91.

When the battery 25 is to be charged by the system of this embodiment, the vehicle body 9 to the front of the charging unit 62 is retracted as indicated by an arrow in the drawing to bring the rear wheels 92b into contact with the stop block 91, whereupon the vehicle body 9 is halted. This positions the secondary coil unit 90 in proximity to the primary coil unit 64, as opposed thereto.

At this time, the vehicle stop sensor 63 delivers a detection signal to the charging unit 62. In response to the signal, the charging unit 62 converts the alternating current from the commercial power source to a high-frequency current and supplies the current to the primary coil unit 64. This causes the primary coil (not shown) of the primary coil unit 64 to generate lines of magnetic force, which penetrate through the secondary coil (not shown) of the secondary coil unit 90, electromagnetically coupling the primary and secondary coils to each other.

Consequently, the secondary coil unit 90 affords a high-frequency current, which is converted to a direct current and rectified by the rectifying circuit 26. The current is thereafter supplied to the battery 25 to charge the battery 25.

The battery 25 can be charged by the system of the present embodiment merely by stopping the electric motor vehicle at the specified position in the parking lot.

Sixteenth Embodiment

The secondary charging device 900 of this embodiment comprises a secondary coil unit 90 and a rectifying circuit 26 which are identical in construction with those of the fifteenth embodiment and which are incorporated in the body 9 of the motor vehicle as shown in FIG. 48.

On the other hand, the primary charging device 600 comprises an underground primary coil unit 64 having the same construction as in the fifteenth embodiment and positioned a predetermined distance rearwardly away from a vehicle stop line 93 at an intersection, and an underground charging unit 62 of the same construction as in the fifteenth embodiment and disposed in the vicinity of the coil unit 64. The primary coil unit 64 is connected to the charging unit 62 by an underground cable 94. The secondary coil unit 90 is opposed to the primary coil unit 64 when the vehicle is halted, with the front wheels 92*a* thereof positioned along the stop line 93.

Disposed in the vicinity of the primary coil unit 64 is an underground vehicle stop sensor 63 for detecting the electric motor vehicle as stopped with the front wheels 92*a* positioned along the stop line 93 at the intersection. The sensor 63 is connected to the charging unit 62 by an underground cable 95.

In the case of the charging system of the present embodiment, the secondary coil unit 90 is positioned in the vicinity of, and as opposed to, the primary coil unit 64 when the vehicle stops with its front wheels 92*a* arranged on the stop line 93.

At this time, the sensor 63 outputs a detection signal to the charging unit 62. In response to the signal, the charging unit 62 converts the alternating current from the commercial power source to a high-frequency currant and supplies the current to the primary coil unit 64. As a result, the battery 25 is charged in the same manner as in the fifteenth embodiment.

The battery 25 can be charged by the system of the present embodiment, effectively utilizing the time during which the vehicle is at a halt at the intersection. Since the primary charging device 600 of the present embodiment is installed in the ground at the intersection, any electric motor vehicle can be charged when stopped at the intersection insofar as the vehicle is equipped with the secondary charging device 900.

According to the fifteenth and sixteenth embodiments, a microwave transmitter and microwave receiver are usable in place of the primary coil unit 64 and secondary coil unit 90 to adopt an energy transmission system with use of microwaves.

Furthermore, the fifteenth and sixteenth embodiments can be provided with means for checking whether magnetic energy is input to the secondary coil unit 90, and means for blocking the supply of current to the primary coil unit 64 of the charging unit when no magnetic energy is found to be input to the coil unit 90. If vehicles of other type having no secondary coil unit 90 come to a stop at the parking lot or intersection, the current will no longer be supplied to the primary coil unit 64 when the system has these means, hence safety.

According to the first to sixteenth embodiments, the primary coil unit comprises a primary coil provided around an iron core, and the secondary coil unit comprises a secondary coil provided around an iron core, whereas these cores can be dispensed with; the primary coil unit can be provided by the primary coil only, and the secondary coil unit by the secondary coil only.

What is claimed is:

1. A system for charging a battery serving as a power source for an electric motor mounted on an electrically assisted bicycle, the battery charging system comprising:

a primary charging device having a primary coil unit disposed in the vicinity of a predetermined position where the bicycle is to be stopped, and current supply means for supplying an alternating current to the primary coil unit, and a secondary charging device having a secondary coil unit attached to an axle of a front wheel or rear wheel of the bicycle and to be magnetically coupled to the primary coil unit, and charging means for converting an alternating current available from the secondary coil unit to a direct current and supplying the direct current to the battery.

2. A system for charging a battery serving as a power source for an electric motor mounted on an electrically assisted bicycle, the battery charging system comprising:

a primary charging device having a primary coil unit disposed in the vicinity of a predetermined position where the bicycle is to be stopped, and current supply means for supplying an alternating current to the primary coil unit, and a secondary charging device having a secondary coil unit attached to a pedal of the bicycle and to be magnetically coupled to the primary coil unit, and charging means for converting an alternating current available from the secondary coil unit to a direct current and supplying the direct current to the battery.

3. A system for charging a battery serving as a power source for an electric motor mounted on an electrically assisted bicycle, the battery charging system comprising:

a primary charging device having a primary coil unit disposed in the vicinity of a predetermined position where the bicycle is to be stopped, and current supply means for supplying an alternating current to the primary coil unit, and a secondary charging device having a secondary coil unit attached to a stand for supporting a body of the bicycle in an upright position and to be magnetically coupled to the primary coil unit, and charging means for converting an alternating current available from the secondary coil unit to a direct current and supplying the direct current to the battery.

4. A battery charging system according to claim 3 wherein the secondary coil unit of the secondary charging device is attached to the stand at a position away from a ground contact portion thereof.

5. A battery charging system according to claim 3 or 4 wherein the primary charging device has a casing housing the primary coil unit therein, the casing being formed with a recessed portion for the secondary coil unit of the secondary charging device to engage in, and the primary coil unit and the secondary coil unit are opposed to each other and can be magnetically coupled together, with the secondary coil unit engaged in the recessed portion.

6. A battery charging system according to claim 5 wherein the primary coil unit comprises a primary coil provided around a C-shaped or L-shaped iron core, and the secondary coil unit comprises a secondary coil provided around a barlike iron core, opposite ends of the iron core of the primary coil unit being positioned in proximity to or in contact with respective opposite ends of the iron core of the secondary coil unit, with the secondary coil unit engaged in the recessed portion of the primary charging device.

7. A battery charging system according to claim 5 wherein the primary charging device comprises a positioning mechanism for placing thereon a rear wheel of the bicycle as stopped at the predetermined position, and the secondary coil unit of the secondary charging device engages in the recessed portion of the primary charging device with the rear wheel placed on the positioning mechanism.

8. A battery charging system according to claim 3 or 4 wherein the primary charging device has a casing housing the primary coil unit therein, the casing being formed with a recessed portion for the stand to engage in, and the primary coil unit and the secondary coil unit are opposed to each other and can be magnetically coupled together, with the stand engaged in the recessed portion.

9. A battery charging system according to claim 8 wherein the stand comprises a leg extending from one side portion of the bicycle body and is pivotally movable between a first position for supporting the bicycle body and a second position to which the stand is forced up from the first position, the leg being at least partly engageable in the recessed portion of the primary charging device.

10. A battery charging system according to claim 8 wherein the stand comprises a pair of opposite legs extending respectively from opposite sides of the bicycle body and a connecting portion interconnecting forward ends of the legs and is pivotally movable between a first position for supporting the bicycle body and a second position to which the stand is forced up from the first position, the connecting portion being engageable in the recessed portion of the primary charging device.

11. A battery charging system according to any one of claims 2 or 3 wherein the primary charging device comprises a switch for energizing or deenergizing the primary coil unit, and the secondary charging device comprises on/off means for turning on or off the switch with the movement of the secondary coil unit toward or away from the primary coil unit.

12. A battery charging system according to any one of claims 2 or 3 wherein the secondary charging device comprises a manual change-over switch for effecting or suspending supply of current through the battery.

13. A battery charging system according to any one of claims 3 or 4 wherein the stand is provided with a lock mechanism for locking the stand in an upright position, and the secondary charging device comprises a switch for effecting or suspending passage of current through the battery and on/off means operatively connected to the lock mechanism for turning on the switch when the lock mechanism is in a locked state or turning off the switch when the lock mechanism is in an unlocked state.

14. A battery charging system according to claim 2 wherein the secondary charging device comprises a coupling mechanism provided at an intermediate portion of a current supply channel from the battery to the secondary coil unit, the coupling mechanism comprising;

a first assembly attached to a crank for producing a magnetic attracting force with current supplied by the battery, and a second assembly attached to a specified position on a body of the bicycle to which position the first assembly is to be opposed when the crank is rotated through an angle to position the secondary coil unit as opposed to the primary coil unit, the second assembly being connectable to the first assembly when subjected to the magnetic attracting force of the first assembly, the current supply channel being closable by the connection of the second assembly to the first assembly.

* * * * *

UNITED STATES PATENT AND TRADEMARK OFFICE
CERTIFICATE OF CORRECTION

PATENT NO. : 6,150,794
DATED : November 21, 2000
INVENTOR(S) : Makoto Yamada, Hiroshi Kutsuyama, Hideaki Aoki, Seigou Torita, Kazishige Kakutami, Seiji Murakami, Keiji Kishimoto and Masahiro Maekawa It is certified that error appears in the above-identified patent and that said Letters Patent is hereby corrected as shown below:

Column 23,
Line 28, after "claims" insert -- 1, --.

Column 24,
Line 2, after "claims" insert -- 1, --.

Signed and Sealed this

Sixth Day of November, 2001

Attest:

NICHOLAS P. GODICI
*Attesting Officer*    *Acting Director of the United States Patent and Trademark Office*